United States Patent
Okazaki et al.

(10) Patent No.: US 11,926,485 B2
(45) Date of Patent: Mar. 12, 2024

(54) PROCESSING SYSTEM AND ARTICLE MANUFACTURING METHOD

(71) Applicant: CANON KABUSHIKI KAISHA, Tokyo (JP)

(72) Inventors: Ryota Okazaki, Yamato (JP); Satoshi Shioda, Toda (JP); Akihiro Hayashi, Yokohama (JP); Takeshi Akehi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 16/996,637

(22) Filed: Aug. 18, 2020

(65) Prior Publication Data

US 2021/0061577 A1 Mar. 4, 2021

(30) Foreign Application Priority Data

Sep. 3, 2019 (JP) ................. 2019-160755

(51) Int. Cl.
*B65G 43/10* (2006.01)
*B65G 17/06* (2006.01)

(52) U.S. Cl.
CPC ............ *B65G 43/10* (2013.01); *B65G 17/06* (2013.01)

(58) Field of Classification Search
CPC ........ B65G 43/10; B65G 17/06; B65G 37/00; B65G 43/00; B23Q 17/22; B23Q 7/1447
See application file for complete search history.

(56) References Cited

U.S. PATENT DOCUMENTS

| | | | |
|---|---|---|---|
| 4,424,616 A | 1/1984 | Numano | |
| 4,882,999 A | 11/1989 | Azukizawa | |
| 5,164,905 A * | 11/1992 | Iwasaki | H01L 21/6838 705/28 |
| 5,884,746 A * | 3/1999 | Leisner | B65G 37/02 198/370.1 |
| 10,618,742 B2 * | 4/2020 | Wahrén | B65G 43/10 |

(Continued)

FOREIGN PATENT DOCUMENTS

| | | |
|---|---|---|
| CN | 101024270 A | 8/2007 |
| CN | 101075098 A | 11/2007 |

(Continued)

OTHER PUBLICATIONS

Zhou Jiping et al, Automation Technology of Mechanical Manufacturing, Machinery Industry Press, Sep. 30, 2001, pp. 122-123.

(Continued)

*Primary Examiner* — Patrick H Mackey
(74) *Attorney, Agent, or Firm* — Canon U.S.A., Inc. I.P. Divison

(57) ABSTRACT

A processing system includes a conveyance path including a plurality of conveyance modules configured to convey a carriage, the plurality of conveyance modules being disposed to convey the carriage to a plurality of positions, a processing apparatus configured to perform processing on a work mounted on the carriage, and a control unit configured to control the plurality of conveyance modules and the processing apparatus, wherein the control unit is configured to, in performing the processing on the work at the plurality of positions by the processing apparatus, move the work to the plurality of positions by moving the carriage using the conveyance modules.

23 Claims, 28 Drawing Sheets

(56) References Cited

U.S. PATENT DOCUMENTS

| | | | | |
|---|---|---|---|---|
| 11,358,249 B2* | 6/2022 | Schneider | ........ | B29D 11/00423 |
| 2011/0144799 A1* | 6/2011 | Toshima | ............. | H01L 21/6776 |
| | | | | 414/800 |
| 2013/0313071 A1* | 11/2013 | Kasuya | ............... | H01L 21/6773 |
| | | | | 198/375 |
| 2016/0355350 A1* | 12/2016 | Yamamoto | ............. | B65G 37/00 |

FOREIGN PATENT DOCUMENTS

| | | | |
|---|---|---|---|
| CN | 102437076 A | | 5/2012 |
| CN | 103383526 A | | 11/2013 |
| CN | 106170422 A | | 11/2016 |
| CN | 109551219 A | | 4/2019 |
| CN | 109720789 A | | 5/2019 |
| JP | S57-043936 U | | 3/1982 |
| JP | H01-247327 A | | 10/1989 |
| JP | H01-271133 A | | 10/1989 |
| JP | 03272907 A | * | 12/1991 |
| JP | H03-272907 A | | 12/1991 |
| JP | 2000-100856 A | | 4/2000 |
| JP | 2005-218203 A | | 8/2005 |
| JP | 2009-147240 A | | 7/2009 |
| JP | 2013-102562 A | | 5/2013 |

OTHER PUBLICATIONS

Cui Junming et al., "Machining Technology of NC General Milling Machine", China Railway Publishing House, Dec. 31, 2011, p. 156-p. 157.

\* cited by examiner

FIG.7
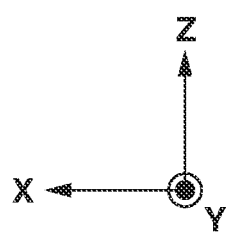
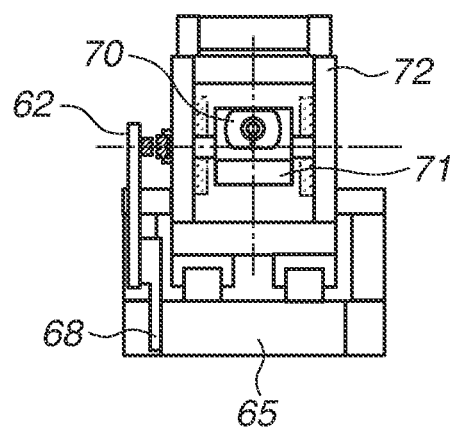
SECTION A-A
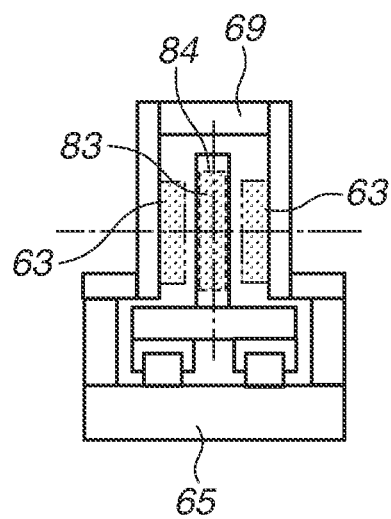
SECTION B-B

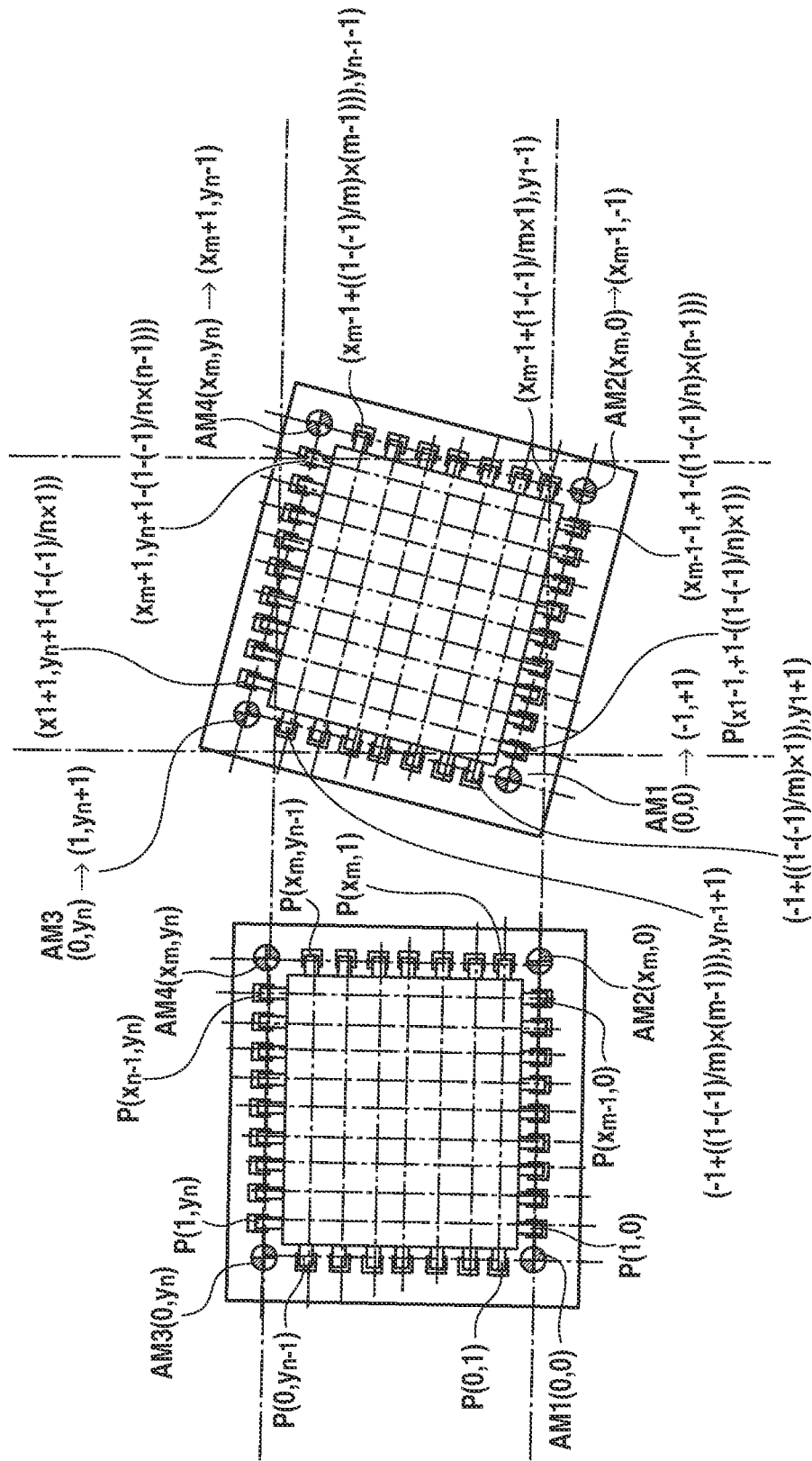

PROCESSING SYSTEM AND ARTICLE MANUFACTURING METHOD

BACKGROUND

Field of the Disclosure

The present disclosure relates to a processing system and an article manufacturing method for manufacturing an article by processing a work while conveying the work between operation processes of production apparatuses.

Description of the Related Art

A processing system that conveys and processes a work includes a plurality of processing apparatuses for performing predetermined operation processes. The plurality of processing apparatuses is installed at a predetermined distance between each other, and a work conveyance apparatus is arranged between the processing apparatuses. After predetermined processing in each operation process is applied to the work, the work is conveyed by the conveyance apparatus to the processing apparatuses for the subsequent operation processes in order.

To apply precise processing such as parts assembly in each operation process, the processing system precisely aligns the work with the processing apparatuses. After the work is conveyed by the conveyance apparatus to a processing apparatus for an operation process, the work is aligned or the work position is recognized by an alignment apparatus or image processing apparatus disposed for the operation process. After position correction, the processing apparatus processes the work. Since precise alignment takes a long time, an issue of long cycle time is raised.

A direct assembly method has been widely known as a method for reducing cycle time. The direct assembly method includes aligning a work onto a conveyance carriage for conveying the work, and then moving the conveyance carriage to a teaching position for each operation process and immediately processing the work.

To apply precise processing by the direct assembly method, stop position accuracy of the conveyance carriage with respect to the teaching positions is important. As discussed in Japanese Patent Laid-Open No. 2013-102562, linear actuators having high stop position accuracy are often used as actuators of the work conveyance apparatus.

According to Japanese Patent Laid-Open No. 2000-100856, in the case of processing a work having a plurality of processing points, actuators included in the processing apparatus for that operation process move the processing tool to each processing point to apply predetermined processing.

High accuracy, high acceleration and deceleration performance, and a large stroke may be desirable, for example, in processing a large-sized work where a plurality of processing points is arranged at narrow pitches.

SUMMARY

One aspect of the present disclosure provides a processing system comprising: a conveyance path including a plurality of conveyance modules configured to convey a carriage, the plurality of conveyance modules being disposed to convey the carriage to a plurality of positions; a processing apparatus configured to perform processing on a work mounted on the carriage; and a control unit configured to control the plurality of conveyance modules and the processing apparatus, wherein the control unit is configured to, in performing the processing on the work at the plurality of positions by the processing apparatus, move the work to the plurality of positions by moving the carriage using the plurality of conveyance modules.

Further features of the present disclosure will become apparent from the following description of exemplary embodiments with reference to the attached drawings.

BRIEF DESCRIPTION OF THE DRAWINGS

FIG. 7 is a sectional view illustrating the configuration of the processing apparatus according to the first exemplary embodiment.

FIG. 28 is a diagram for describing correction of teaching points.

DESCRIPTION OF THE EMBODIMENTS

The following exemplary embodiments provide a processing system and an article manufacturing method advantageous in reducing the moving time of a tool to a plurality of processing points on a work and applying precise processing to the work.

Conventional techniques have difficulty in moving a tool (or conveying a work) in a short time. For example, Japanese Patent Laid-Open No. 2013-102562 discusses a technique of using a linear conveyor to highly precisely align a work on a conveyance carriage to various operation processes. However, no consideration has been given to movement within each operation process. In a case where a work is processed a plurality of times in each operation process, each processing apparatus includes a plurality of actuators capable of high speed movement so that the tool can be moved to a plurality of processing points on the work by using the actuators of the processing apparatus.

Japanese Patent Laid-Open No. 2000-100856 discusses an apparatus that moves a work by using an XY table apparatus capable of high-speed movement in X and Y directions within a horizontal plane. However, providing actuators capable of high-speed movement in the X and Y directions increases the weight of the moving table itself.

The exemplary embodiments will be described below with reference to the drawings.

Figure 1:
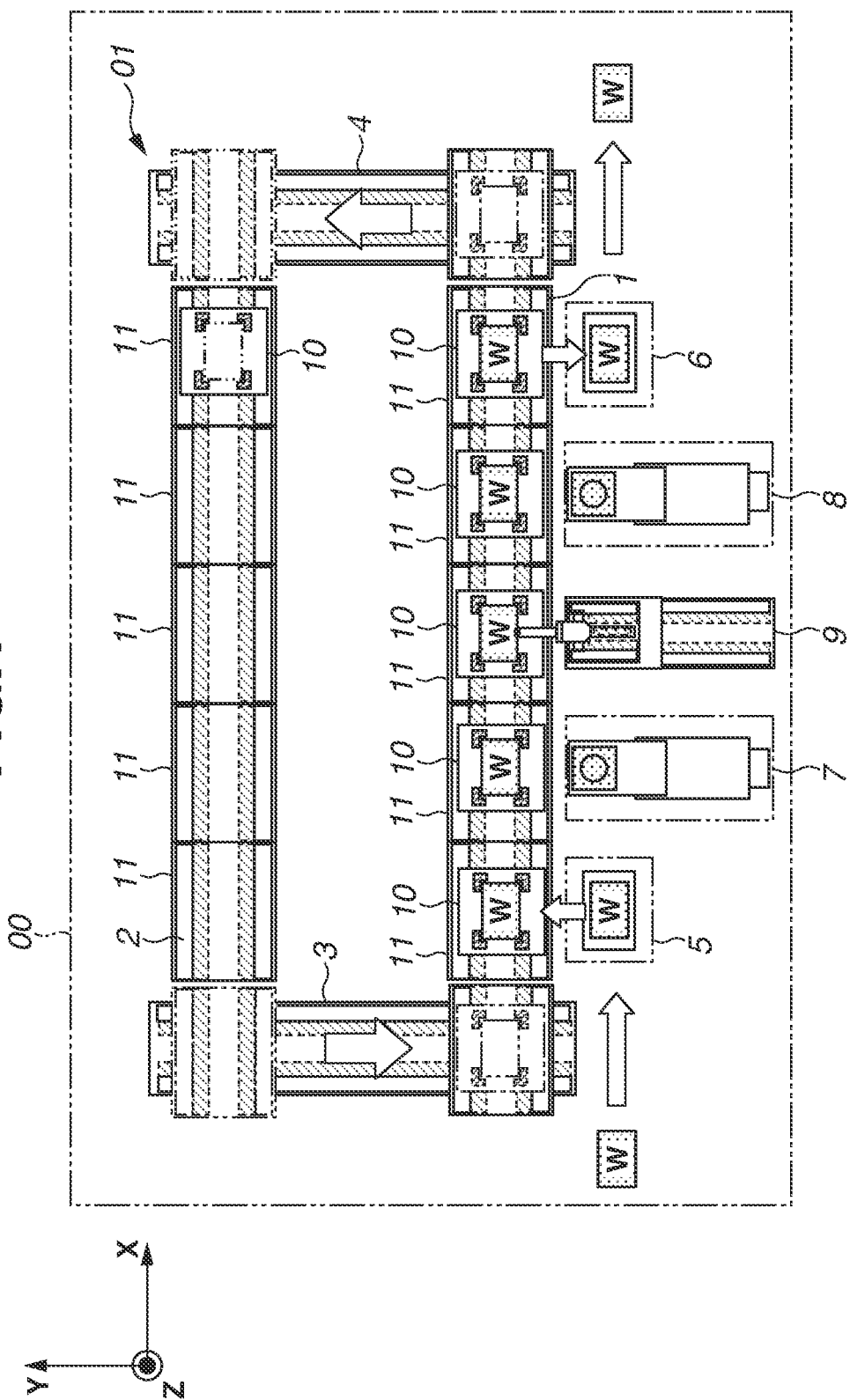
FIG. 1 is a schematic diagram illustrating an overall configuration of a processing system according to a first exemplary embodiment.

An overall configuration of a processing system according to an exemplary embodiment will initially be described with reference to FIG. 1. FIG. 1 is a schematic diagram illustrating the overall configuration of the processing system according to the present exemplary embodiment. FIG. 1 is a schematic top view of the entire processing system.

As illustrated in FIG. 1, a processing system 00 according to the present exemplary embodiment includes a carriage moving mechanism for moving a carriage along a conveyance path, a carriage 10 (may be referred to as a conveyance carriage) on which a work can be mounted, and a processing tool.

Specifically, the processing system 00 includes a conveyance apparatus forward path 1 (may be referred to as a conveyance forward path), a conveyance apparatus return path 2 (may be referred to as a conveyance return path), a carriage transfer apparatus 3, and a carriage transfer apparatus 4 as the conveyance path capable of conveying the carriage 10 to a plurality of positions by the carriage moving mechanism. The processing system 00 also includes a work submission apparatus 5 and a work discharge apparatus 6 that are disposed at predetermined positions adjoining the conveyance path. The work submission apparatus 5 is intended to mount a work on the carriage 10. The work discharge apparatus 6 is intended to discharge the work from the carriage 10. The processing system 00 further includes a pre-processing inspection apparatus 7, a post-processing inspection apparatus 8, and a processing apparatus 9 that are disposed at predetermined positions adjoining the conveyance path. One inspection apparatus may be used as both the pre- and post-processing inspection apparatuses 7 and 8. In this specification document, the pre-processing inspection apparatus 7 may be referred to as a first inspection apparatus, and the post-processing inspection apparatus 8 as a second inspection apparatus. The processing system 00 according to the present exemplary embodiment includes a conveyance system 01 that conveys a work W to be processed and performs alignment of the work W on the conveyance carriage 10. The conveyance system 01 that is the carriage moving mechanism includes at least the conveyance apparatus forward path 1. The conveyance system 01 may also include the conveyance apparatus return path 2 and the carriage transfer apparatuses 3 and 4 aside from the conveyance apparatus forward path 1. The conveyance apparatus forward path 1, the conveyance apparatus return path 2, and the carriage transfer apparatuses 3 and 4 are included in the conveyance path of the conveyance carriage 10 that is a moving unit. In this specification document, the conveyance carriage 10 may be referred to as a moving unit, and the conveyance path of the conveyance carriage 10 as a fixed unit. In this specification document, the conveyance apparatus forward path 1 may be referred to as a conveyance apparatus return path 2, and the conveyance apparatus return path 2 may be referred to as a conveyance apparatus forward path 1.

Now, coordinate axes of an XYZ coordinate system that is an orthogonal coordinate system used in the following description, namely, X-, Y-, and Z-axes and the directions thereof will be defined. The X-axis extends in a conveyance direction of the conveyance carriage 10. A base 02 to be described below is placed in parallel with the X-axis (horizontally). An axis perpendicular to the base 02, i.e., an axis along a vertical direction is defined as the Z-axis. An axis orthogonal to the X- and Z-axes is defined as the Y-axis. In the XYZ coordinate system with the coordinate axes thus defined, a direction along the X-axis will be referred to as an X direction. An X direction that coincides with the conveyance direction of the conveyance carriage 10 will be referred to as a +X direction, and the direction opposite to the +X direction as a −X direction. A direction along the Y-axis will be referred to as a Y direction. A Y direction from right to left with respect to the +X direction will be referred to as a +Y direction, and the direction opposite to the +Y direction as a −Y direction. A direction along the Z-axis will be referred to as a Z direction. A Z direction from the conveyance path to the conveyance carriage 10, i.e., a vertically upward direction will be referred to as a +Z direction. A Z direction from the conveyance carriage 10 to the conveyance path, i.e., a vertically downward direction will be referred to as a −Z direction.

In the processing system 00 according to the present exemplary embodiment, the conveyance apparatus forward path 1 and the conveyance apparatus return path 2 included in respective linear conveyance paths for conveying the conveyance carriage 10 are laid in parallel with each other. However, this is not restrictive. The conveyance carriage 10 is conveyed along the conveyance apparatus forward path 1 and the conveyance apparatus return path 2. The carriage transfer apparatus 3 (first carriage transfer apparatus) for transferring the conveyance carriage 10 from the conveyance apparatus return path 2 to the conveyance apparatus forward path 1 may be installed at the most upstream position of the conveyance apparatus forward path 1. The carriage transfer apparatus 4 (second carriage transfer apparatus) for conveying the conveyance carriage 10 from the conveyance apparatus forward path 1 to the conveyance apparatus return path 2 may be installed at the most downstream position of the conveyance apparatus forward path 1. The conveyance carriage 10 conveyed along the conveyance apparatus forward path 1 may be transferred to the conveyance apparatus return path 2 by the carriage transfer apparatus 4. The conveyance carriage 10 conveyed along the conveyance apparatus return path 2 may be transferred to the conveyance apparatus forward path 1 by the carriage transfer apparatus 3. In other words, the conveyance carriage 10 may be conveyed to circulate along the conveyance apparatus forward path 1 and the conveyance apparatus return path 2. The processing system 00 may include one or a plurality of conveyance carriages 10.

The conveyance system 01 that is the carriage moving mechanism includes the conveyance apparatus forward path 1 and the conveyance apparatus return path 2. The conveyance forward and return paths 1 and 2 have a module configuration, and include a plurality of conveyance modules 11.

The work submission apparatus 5 is a work supply apparatus for supplying and mounting a work W on a conveyance carriage 10 moving on the conveyance apparatus forward path 1. The work submission apparatus 5 may be installed at a predetermined position upstream of and adjoining the conveyance apparatus forward path 1. The work discharge apparatus 6 for removing and discharging the work W from the conveyance carriage 10 moving along the conveyance apparatus forward path 1 may be installed at a predetermined position downstream of and adjoining the conveyance apparatus forward path 1.

The pre-processing inspection apparatus 7 for detecting the position of the work W on the conveyance carriage 10 moving along the conveyance apparatus forward path 1 may be installed at a predetermined position between the work submission apparatus 5 and the work discharge apparatus 6, adjoining the conveyance apparatus forward path 1. The processing apparatus 9 for performing processing such as coating, bonding, and assembly operations based on a result of the position detection made by the pre-processing inspection apparatus 7 may also be installed. The post-processing inspection apparatus 8 for inspecting a processing state after the processing to check whether the work W is processed as specified in advance may also be installed. The processing system 00 may include one or a plurality of processing apparatuses 9. A plurality of processing apparatuses 9 may be installed at regular distances or at any given distances. The pre- and post-processing inspection apparatuses 7 and 8 may be configured as an inspection apparatus for inspecting the work W mounted on the conveyance carriage 10.

The processing apparatus(es) 9 is/are not limited to any particular apparatus(es), and may be selected from among processing apparatuses for applying various processing operations to the work W.

The conveyance carriage 10 is a carriage to be sequentially conveyed between the work submission apparatus 5, the processing apparatus 9, and the work discharge apparatus 6 that are disposed at a predetermined distance from the conveyance apparatus forward path 1. The work submission apparatus 5 supplies and submits a work W to a conveyance carriage 10. After alignment and fixing of the work W onto the conveyance carriage 10, the processing apparatus 9 applies predetermined processing operations to the work W on the conveyance carriage 10. After the processing operations by the processing apparatus 9 are all completed, the work discharge apparatus 6 removes the work W from the conveyance carriage 10. An article is manufactured in the above-described manner.

First Exemplary Embodiment

Figure 2:
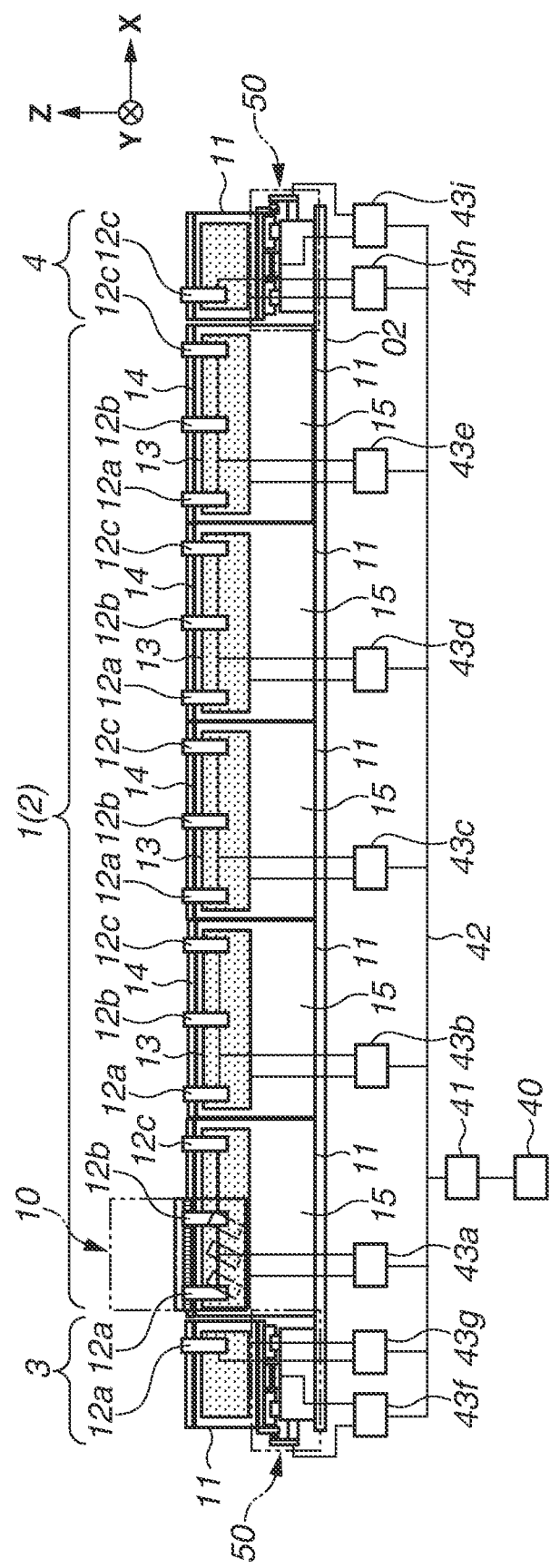
FIG. 2 is a schematic diagram illustrating a configuration of a conveyance system according to the first exemplary embodiment.
Figure 3:
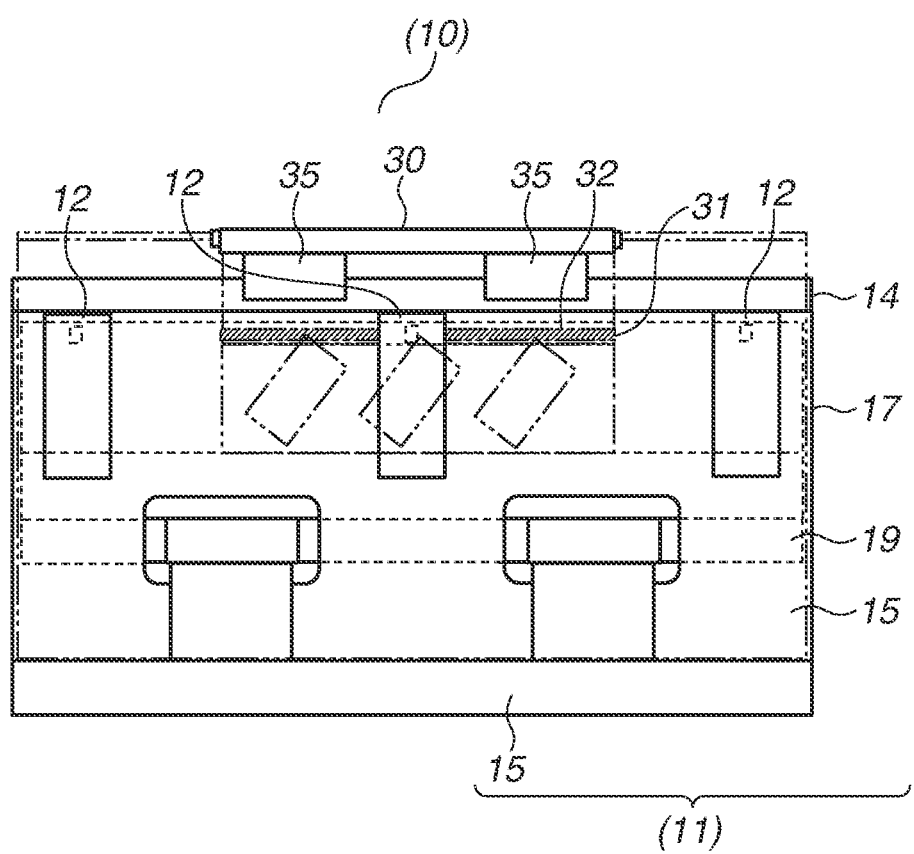
FIG. 3 is a front view illustrating the configuration of a conveyance module according to the first exemplary embodiment.
Figure 4:
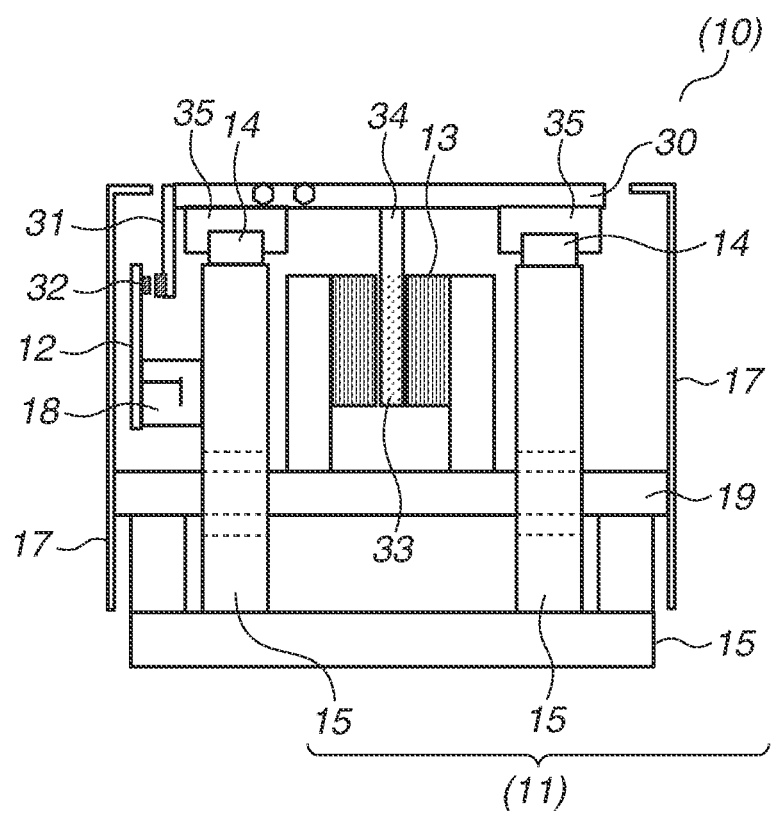
FIG. 4 is a sectional view illustrating the configuration of the conveyance module according to the first exemplary embodiment.

Next, a first exemplary embodiment of the configuration of the conveyance apparatus forward path 1, the conveyance apparatus return path 2, the carriage transfer apparatuses 3 and 4, and a conveyance carriage 10 in the conveyance system 01 will be outlined with reference to FIGS. 2 to 4.

FIG. 2 is a schematic diagram for describing the conveyance apparatus forward path 1. FIG. 3 is a schematic diagram for describing the conveyance carriage 10 and a conveyance module 11 that is a part of the conveyance path. FIG. 4 is a sectional view of the conveyance carriage 10 and the conveyance module 11.

The processing system 00 includes a plurality of lower controllers 43 that are connected to the plurality of conveyance modules 11 and the carriage transfer apparatuses 3 and 4 to communicate with each other. The lower controllers 43 control the connected conveyance modules 11 and carriage transfer apparatuses 3 and 4.

For ease of description, FIG. 2 illustrates five conveyance modules 11, and five lower controllers 43a, 43b, 43c, 43d, and 43e as the lower controllers 43 each connected to a different one of the conveyance modules 11. FIG. 2 also illustrates lower controllers 43f and 43g as the lower controllers 43 connected to the carriage transfer apparatus 3. FIG. 2 also illustrates lower controllers 43h and 43i as the lower controllers 43 connected to the carriage transfer apparatus 4. In the following description, the lower controllers 43a to 43i are referred to simply as "lower controllers 43" unless a specific distinction is intended. The plurality of lower controllers 43 is connected to a lower controller network 42.

The processing system 00 further includes an intermediate controller 41 and an upper controller 40. The intermediate controller 41 is connected to the plurality of lower controllers 43 via the lower controller network 42 to communicate with each other. The intermediate controller 41 controls the plurality of lower controllers 43. The intermediate controller 41 is also connected with the upper controller 40, which transmits operation commands to the intermediate controller 41. In the present exemplary embodiment, a description is given of a case where the lower controllers 43 are provided for the respective conveyance modules 11. However, this is not restrictive. All the conveyance modules 11 may be controlled by a controller (such as a central processing unit (CPU) (control unit) of a computer). Each several conveyance modules 11 may be controlled by a controller (such as a CPU (control unit) of a computer). The lower controllers 43 in the present exemplary embodiment may even be configured to be such a control unit. In the present exemplary embodiment, a description is given of a case where the intermediate and upper controllers 41 and 40 are different from the lower controllers 43. However, this is not restrictive. For example, the intermediate and upper controllers 41 and 40 may be controlled by the CPU (control unit) of the same computer as the lower controllers 43 are controlled. The intermediate and upper controllers 41 and 40 in the present exemplary embodiment may even be configured to be such a control unit.

As illustrated in FIG. 2, the conveyance modules 11 are installed on a horizontal installation surface of the base 02. The conveyance modules 11 each include a conveyance module housing 15, encoders 12a, 12b, and 12c, a coil group 13 for driving the carriage 10, and guide rails 14. A not-illustrated power supply is connected to the lower controllers 43.

The coil group 13 is attached to the conveyance module housing 15 along the X direction. The guide rails 14 are attached to above the conveyance module housing 15 along the X direction.

The conveyance carriage 10 includes a conveyance carriage base 30, a scale 32, and guide blocks 35 to be described below.

Next, the configuration of the conveyance carriage 10 and a conveyance module 11 will be described with reference to FIGS. 3 and 4. The conveyance module 11 is part of the conveyance path that is the fixed unit, and includes the conveyance module housing 15. The conveyance carriage 10 that is the moving unit includes a conveyance carriage base 30.

The conveyance module 11 according to the present exemplary embodiment includes an outer housing (conveyance module housing) 15, an inner housing 19, and carriage driving coils (coil group) 13. The conveyance module 11 includes an outer housing bottom portion 15c and two outer housing side portions 15a and 15b. The two outer housing side portions 15a and 15b are disposed on the outer housing bottom portion 15c so that the two outer housing side portions 15a and 15b are opposed to each other at a distance in a direction intersecting the outer housing bottom portion 15c. The inner housing (may be referred to as a carriage driving coil bracket) 19 includes an inner housing bottom portion 19c and two inner housing side portions 19a and 19b between the two outer housing side portions 15a and 15b disposed at a distance from each other. The two inner housing side portions 19a and 19b are disposed on the inner housing bottom portion 19c so that the two inner housing side portions 19a and 19b are opposed to each other at a distance in a direction perpendicular to the inner housing bottom portion 19c. A plurality of pairs of carriage driving coils 13 is arranged in the X direction between the two inner housing side portions 19a and 19b disposed at a distance from each other. Permanent magnets 33 and a permanent magnet bracket 34 disposed on the conveyance carriage 10 are configured to pass between the pairs of carriage driving coils 13 arranged in the X direction. In the present exemplary embodiment, the outer housing 15 and the inner housing 19 may be referred to collectively as a conveyance module housing.

The inner housing bottom portion 19c is attached to attachment portions 19d and 19e and heat radiation plates 17a and 17b via through holes 15aa, 15ab, 15ba, and 15bb (through hole 15ab is not illustrated) in the outer housing side portions 15a and 15b. Attachment portions 19ca, 19cb, 19cc, and 19cd (attachment portion 19cb is not illustrated) are disposed on the outer housing bottom portion 15c.

The encoders 12 are disposed on the outer housing side portion 15b via encoder brackets 18. FIG. 3 illustrates an example where a conveyance module 11 includes three encoders 12. However, this is not restrictive, and a conveyance module 11 may include at least one or more encoders 12.

The guide rails 14 are disposed in parallel on the top surfaces of the respective outer housing side portions 15a and 15b. In other words, there are two guide rails 14 extending in the X direction.

The guide blocks 35 and the permanent magnet bracket 34 are disposed on the bottom surface of the conveyance carriage base 30 to form a T-shaped structure. The permanent magnets 33 are embedded in the permanent magnet bracket 34. In this specification document, the permanent magnet bracket 34 and the permanent magnets 33 may be referred to collectively as a permanent magnet.

Application of a current to the carriage driving coils 13 generates an electromagnetic force for driving the conveyance carriage 10 between the plurality of permanent magnets 33 attached to the conveyance carriage base 30 and the carriage driving coils 13 attached to the conveyance module housing. The conveyance carriage 10 is driven by the electromagnetic force generated between the plurality of permanent magnets 33 and the carriage driving coils 13, and conveyed along the conveyance apparatus forward path 1 in the +X direction. In the present exemplary embodiment, the conveyance system 01 is thus configured to use moving magnet (MM) linear motors where the carriage driving coils 13 remain stationary and the permanent magnets 33 move.

The scale 32 is attached to a side surface of the conveyance carriage base 30 via a scale bracket 31 at a position detectable by the encoders 12. In other words, the scale 32 and the encoders 12 are attached opposite to each other. The scale 32 has a pattern that is used to detect the position of the conveyance carriage 10. The scale 32 may be directly attached to a side portion of the conveyance carriage base 30 without the scale bracket 31. In this specification document, the scale bracket 31 and the scale 32 may be referred to collectively as a scale.

The encoders 12 are disposed on the outer housing side portion 15b of the conveyance module housing 15 via the encoder brackets (sensor attachment members) 18. The encoders 12 are adjusted by the encoder brackets 18 so that scale reading parts, or encoder detection parts, of the encoders 12 are opposed to the scale 32. In the present exemplary embodiment, the conveyance module 11 is described to include three encoders 12. However, this is not restrictive. The encoders 12 may be directly attached without the encoder brackets 18. In this specification document, the encoder brackets 18 and the encoders 12 may be referred to collectively as encoders. In the present exemplary embodiment, the position of the moving unit is described to be detected by using the encoders 12 and the scale 32. However, such a configuration is not restrictive, and conventional sensors capable of detecting the positions of the fixed unit and the moving unit may be used. In this specification document, the member attached to the moving unit is referred to as a scale, and the members attached to the fixed unit as encoders or sensors. The heat radiation plates 17a and 17b (covers 17) are attached to protect the encoders 12 and the scale 32.

The distance between the encoders 12a and 12b and the distance between the encoders 12b and 12c are desirably smaller than the length of the scale 32 attached to the conveyance carriage 10. This enables detection of the position of the conveyance carriage 10 by any one of the encoders 12 regardless of what position the conveyance carriage 10 is on the conveyance module 11.

The encoders 12 of the conveyance module 11 are attached to the conveyance module housing 15 with a constant gap between the encoders 12 and the scale 32 attached to the conveyance carriage 10. The encoders 12 can detect the position of the conveyance carriage 10 in the X direction as a relative position from the encoders 12 by reading the pattern on the scale 32.

The lower controller 43 can calculate the position of the conveyance carriage 10 on the conveyance module 11 based on the outputs of the connected encoders 12 and the installation positions of the encoders 12. The lower controller 43 can control the amount of current applied to the carriage driving coils 13 based on the calculated position of the conveyance carriage 10. The lower controller 43 can thereby convey the conveyance carriage 10 to a predetermined position at a predetermined speed and stop the conveyance carriage 10.

The lower controller 43 can also detect that the conveyance carriage 10 enters the connected conveyance module 11 from the adjoining conveyance module 11 by using the encoders 12. To convey the conveyance carriage 10 entering the connected conveyance module 11 to a predetermined position at a predetermined speed and stop the conveyance carriage 10, the lower controller 43 controls the conveyance carriage 10 on the connected conveyance module 11.

The lower controller 43 has a communication function for exchanging information with the intermediate controller 41. The lower controller 43 communicates position information about the conveyance carriage 10 detected by the encoders 12 connected to the lower controller 43 with the intermediate controller 41.

The intermediate controller 41 can transmit commands for operating a conveyance carriage 10 to each of the lower controllers 43. The intermediate controller 41 can thereby control a plurality of conveyance carriages 10.

The conveyance apparatus return path 2 has a similar configuration to that of the conveyance apparatus forward path 1 described above, except that the conveyance direction of the conveyance carriage 10 is opposite to that on the conveyance apparatus forward path 1.

Next, the configuration of the carriage transfer apparatuses 3 and 4 will be described. As illustrated in FIG. 2, the carriage transfer apparatuses 3 and 4 each include a carriage transfer actuator 50 that can operate in the Y direction, and a module that is mounted on the carriage transfer actuator 50 and has a similar configuration to that of a conveyance module 11.

In the present exemplary embodiment, a description will be given of the case where the carriage transfer apparatuses 3 and 4 are configured to include a module having the configuration of the conveyance module 11. However, this is not restrictive, and other configurations may be used for transfer.

The lower controller 43f connected to the carriage transfer apparatus 3 controls the carriage transfer actuator 50 of the carriage transfer apparatus 3. The lower controller 43g connected to the carriage transfer apparatus 3 controls the module having a similar configuration to that of a conveyance module 11 in the carriage transfer apparatus 3 like the lower controllers 43a, 43b, 43c, 43d, and 43e. The lower controller 43h connected to the carriage transfer apparatus 4 controls the carriage transfer actuator 50 of the carriage transfer apparatus 4. The lower controller 43i connected to the carriage transfer apparatus 4 controls the module having a similar configuration to that of a conveyance module 11 in the carriage transfer apparatus 4 like the lower controllers 43a, 43b, 43c, 43d, and 43e.

The carriage transfer apparatuses 3 and 4 each transfer the conveyance carriage 10 by operating between the conveyance apparatus forward path 1 and the conveyance apparatus return path 2. The carriage transfer apparatus 4 transfers the conveyance carriage 10 conveyed along the conveyance apparatus forward path 1 from the conveyance apparatus forward path 1 to the conveyance apparatus return path 2. The carriage transfer apparatus 3 transfers the conveyance carriage 10 conveyed along the conveyance apparatus return path 2 from the conveyance apparatus return path 2 to the conveyance apparatus forward path 1.

The upper controller 40 controls the entire processing system 00. Controllers (not illustrated) intended for the work submission apparatus 5, the work discharge apparatus 6, the pre-processing inspection apparatus 7, the post-processing inspection apparatus 8, and the processing apparatus 9 are connected to the upper controller 40 aside from the intermediate controller 41 to communicate with each other. The upper controller 40 controls operations and operation order of the apparatuses in the processing system 00.

Figure 5:
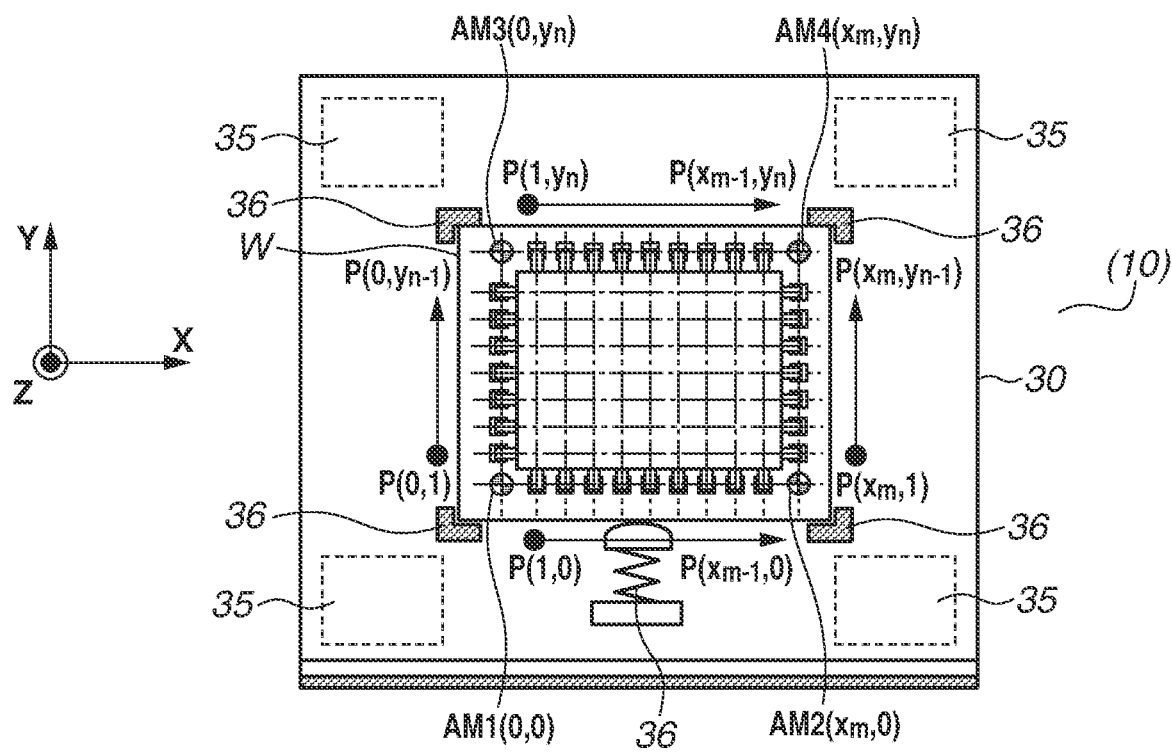
FIG. 5 is a top view illustrating a configuration of a carriage and a work according to the first exemplary embodiment.

Next, the configuration of the carriage 10 and a work W will be described with reference to FIG. 5. FIG. 5 is a top view of the conveyance carriage 10 and the work W. Work gripping mechanisms 36 are disposed on the conveyance carriage base 30. After the work W is supplied by the work submission apparatus 5, the work gripping mechanisms 36 fix the work W onto the conveyance carriage 10. The work gripping mechanisms 36 are configured so that the fixed work W will not be displaced by movement of the conveyance carriage 10 or external force during application of processing by the processing apparatus 9.

A plurality of processing points $P(1, 0)$ to $P(x_{m-1}, 0)$ and a plurality of processing points $P(1, y_n)$ to $P(x_{m-1}, y_n)$ are arranged on the work W in the X direction. A plurality of processing points $P(0, 1)$ to $P(0, y_{n-1})$ and a plurality of processing points $P(x_m, 1)$ to $P(x_m, y_{n-1})$ are arranged on the work W in the Y direction. In this specification document, such processing points will be referred to simply as processing points P unless a specific distinction is intended.

An alignment mark AM1 is at a coordinate point (0, 0) on the work W, an alignment mark AM2 is at a coordinate point $(x_m, 0)$, an alignment mark AM3 is at a coordinate point $(0, y_n)$, and an alignment mark AM4 is at a coordinate point $(x_m, y_n)$. The positions of the respective processing points P can be calculated by detecting the positions of the alignment marks AM1, AM2, AM3, and AM4. Specifically, the pre-processing inspection apparatus 7 measures the positions of the alignment marks AM1, AM2, AM3, and AM4. The positions of the processing points P where the processing apparatus 9 performs processing are corrected based on the measurement results. The post-processing inspection apparatus 8 inspects the result of the processing performed by the processing apparatus 9 based on the results of the measurement performed by the pre-processing inspection apparatus 7. In this specification document, the alignment marks AM1, AM2, AM3, and AM4 will be referred to simply as alignment marks AM unless a specific distinction is intended.

Figure 6:
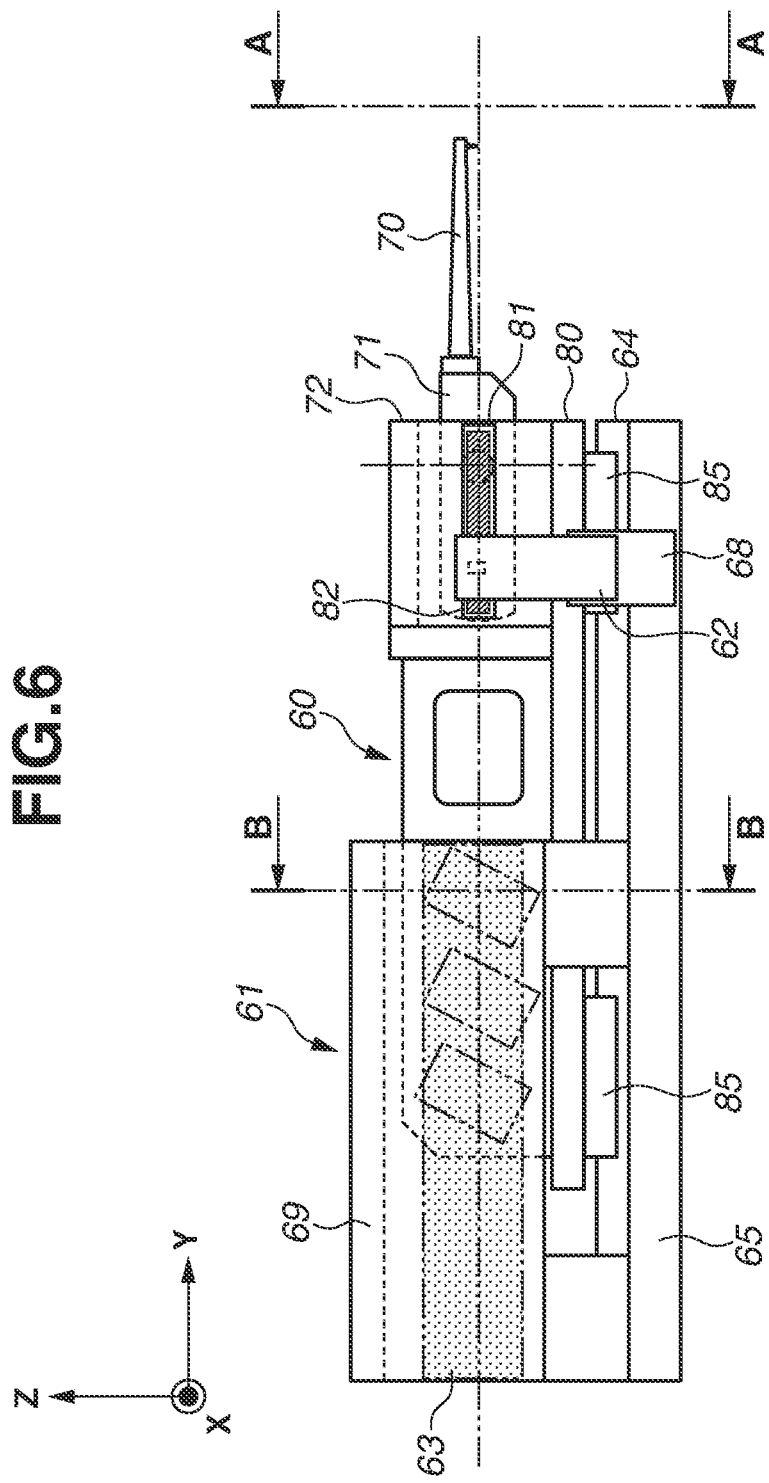
FIG. 6 is a front view illustrating a configuration of a processing apparatus according to the first exemplary embodiment.

Next, the processing apparatus 9 (see FIG. 1) will be described with reference to FIGS. 6 and 7. FIG. 6 is a front view of the processing apparatus 9, a view of the processing apparatus 9 seen in the −X direction. FIG. 7 is a sectional view illustrating a section A-A and a section B-B of the processing apparatus 9 in FIG. 6. For example, the processing apparatus 9 is a bonding apparatus that performs bonding at the processing points P on the work W.

The processing apparatus 9 includes a processing tool driving carriage 60 and a processing tool driving module 61 that is a processing tool conveyance path. In a case where, for example, the processing apparatus 9 is a bonding apparatus, the processing tool driving carriage 60 may be referred to as a bonding head driving carriage 60, and the processing tool driving module 61 as a bonding head driving module 61.

The processing tool driving module 61 includes a processing tool driving module housing 65 and a carriage driving coil bracket 69 having an open-bottom trough structure. The carriage driving coil bracket 69 is disposed on the processing tool driving module housing 65 to form a closed structure with the processing tool driving module housing 65. A pair of opposed carriage driving coils 63 is attached to inner walls of the carriage driving coil bracket 69.

An encoder 62 is disposed on the processing tool driving module housing 65 via an encoder bracket 68.

Two guide rails 64 are laid in parallel on the top surface of the processing tool driving module housing 65 in a direction crossing the guide rails 14 (see FIG. 3) of the conveyance modules 11 included in the conveyance apparatus forward path 1 that is the conveyance path. In other words, the guide rails 64 are laid in a direction crossing the moving direction of the carriage 10 moved by the conveyance modules 11. In terms of ease of control, the crossing direction can be perpendicular to the moving direction of the carriage 10 moved by the conveyance modules 11.

The processing tool driving carriage 60 includes a driving carriage base 80 and guide blocks 85 attached to the bottom surface of the driving carriage base 80. The processing tool driving carriage 60 moves along the guide rails 64, being guided by the guide blocks 85. A permanent magnet bracket 84 is disposed on the top surface of the processing tool driving carriage 60. A plurality of permanent magnets 83 is embedded in the permanent magnet bracket 84. In this specification document, the permanent magnet bracket 84 and the permanent magnets 83 may be referred to collectively as a permanent magnet. The permanent magnet bracket 84 is configured to pass between the pair of carriage driving coils 63 attached to the processing tool driving module housing 65 via the carriage driving coil bracket 69.

Application of a current to the carriage driving coils 63 attached to the processing tool driving module housing 65 via the carriage driving coil bracket 69 generates an electromagnetic force between the carriage driving coils 63 and the plurality of permanent magnets 83 attached to the processing tool driving carriage 60. With the generated electromagnetic force as the propelling force, the processing tool driving carriage 60 is moved along the guide rails 64 in the Y direction. In other words, in the bonding apparatus according to the present exemplary embodiment, the processing tool (bonding head) driving carriage 60 serves as a moving unit, and the processing tool (bonding head) driving module 61 as a fixed unit.

A magnetic attraction or repulsion force occurring between the carriage driving coils 63 and the permanent magnets 83 acts on the processing tool driving carriage 60. Since the permanent magnet bracket 84 is configured to pass between the pair of carriage driving coils 63, magnetic attraction and repulsion forces occurring on the side surfaces of the permanent magnet bracket 84 are cancelled out.

Magnetic forces also act on the processing tool driving module 61. Specifically, the carriage driving coils 63 undergo mutually attracting or repelling forces in the X direction. The closed structure including the processing tool driving module housing 65 and the carriage driving coil bracket 69 can structurally provide sufficient rigidity against such forces.

A processing tool actuator 72 is installed on the driving carriage base 80. The processing tool actuator 72 is configured to be movable in the Z direction. A processing tool 70 is installed on a movable part of the processing tool actuator 72 via a processing tool arm 71. The processing tool 70 can apply bonding processing to the processing points P on the work W.

The processing tool actuator 72 is disposed on a line of action of the electromagnetic force generated by the carriage driving coils 63 and the permanent magnets 83. The processing tool actuator 72 is coupled to the permanent magnet bracket 84 on the driving carriage base 80 in the Y direction, and disposed so that the electromagnetic force generated by the carriage driving coils 63 and the permanent magnets 83 is directly transmitted thereto on the line of action. The processing tool actuator 72 and the permanent magnet bracket 84 may be coupled via a structure.

The center of gravity of the processing tool driving carriage 60 is on the line of action of the electromagnetic force generated by the carriage driving coils 63 and the permanent magnets 83. This configuration may include an adjustment mechanism.

A scale 82 is attached to a side surface of the driving carriage base 80 via a scale bracket 81. The scale 82 is disposed at a position that is detectable by the encoder 62 and coincides with the height of the center of gravity of the processing tool driving carriage 60. This can reduce the effect of rotation of the processing tool driving carriage 60 about the Y-axis due to driving inertia. The scale 82 has a pattern that is used to detect the position of the processing tool driving carriage 60. The scale 82 may be directly attached to the driving carriage base 80 without the scale bracket 81. In this specification document, the scale bracket 81 and the scale 82 may be referred to collectively as a scale. The scale 82 may be attached to both side surfaces of the driving carriage base 80. Reading the scales 82 on both side surfaces by two encoders 62 enables detection of the rotation of the processing tool driving carriage 60 about the Z-axis due to driving inertia. The scale 82 may be attached to positions other than the above-described position.

The encoder 62 is adjusted by the encoder bracket 68 so that an encoder detection part or scale reading part of the encoder 62 is opposed to the scale 82. The encoder 62 may be directly attached to the processing tool driving module housing 65 without the encoder bracket 68. In this specification document, the encoder bracket 68 and the encoder 62 may be referred to collectively as an encoder.

The encoder 62 is attached to the processing tool driving module housing 65 with a constant gap between the encoder 62 and the scale 82 attached to the processing tool driving carriage 60. The encoder 62 can detect the position of the processing tool driving carriage 60 in the Y direction as a relative position to the encoder 62 by reading the position-detection pattern on the scale 82. The scale 82 has a sufficient length in the Y direction. The encoder 62 is disposed at an appropriate position in the Y direction so that the position of the processing tool driving carriage 60 can be constantly detected.

Like the conveyance modules 11, the processing tool driving module 61 is connected to a not-illustrated lower controller 43*a* disposed for the processing tool driving module 61, and can control the processing tool driving carriage 60. The lower controller 43a is connected to the intermediate controller 41 via the lower controller network 42 to communicate with each other.

The processing tool 70 and the processing tool actuator 72 are connected to the upper controller 40, and operate based on commands from the upper controller 40.

Figure 18:
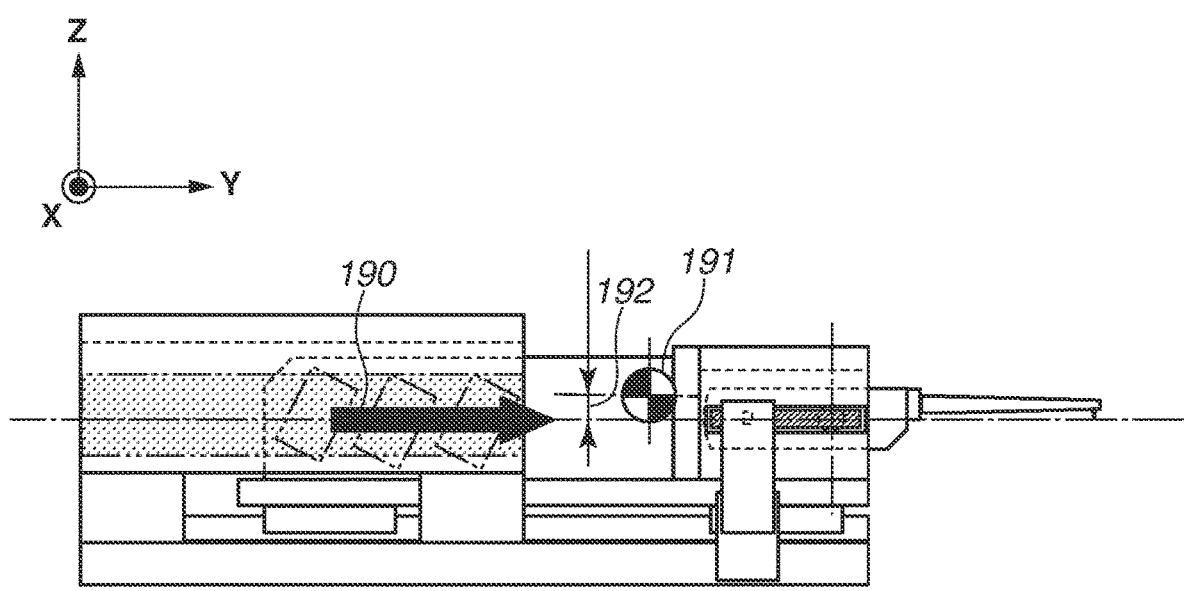
FIG. 18 is a diagram illustrating a relationship between forces acting on the processing apparatus according to the first exemplary embodiment.

Next, a relationship between forces acting on the processing apparatus 9 will be described with reference to FIG. 18. FIG. 18 is a front view of the processing apparatus 9, a view of the processing apparatus 9 seen in the −X direction.

Application of a current to the carriage driving coils 63 attached to the processing tool driving module housing 65 via the carriage driving coil bracket 69 generates an electromagnetic force 190 between the carriage driving coils 63 and the plurality of permanent magnets 83 attached to the processing tool driving carriage 60. With the generated electromagnetic force 190 as the propelling force, the processing tool driving carriage 60 is moved along the guide rails 64 in the Y direction.

In a case where the center of gravity 191 of the processing tool driving carriage 60 is off the line of action of the electromagnetic force 190, the moment represented by the following expression occurs on the processing tool driving carriage 60:

$$F \times \Delta L.$$

F represents the electromagnetic force 190, and $\Delta L$ represents a distance 192 from the line of action of the electromagnetic force 190 to the center of gravity 191. The distance 192 can be brought close to zero and the moment caused by the electromagnetic force 190 can be made substantially zero by disposing the center of gravity 191 at a position near the line of action of the electromagnetic force 190. The distance 192 from the line of action of the electromagnetic force 190 to the center of gravity 191 may desirably be within ±1 cm because the occurrence of vibrations can thereby be suppressed. This can reduce a force couple acting on the electromagnetic force 190 due to a moment of inertia and suppress occurrence of residual vibrations when the processing tool driving carriage 60 is accelerated, decelerated, or stopped. Speed, precision, and reliability can thereby be improved. Since guide rails 64 having a simple structure and low rigidity can be used, the apparatus cost can be reduced.

Figure 8:
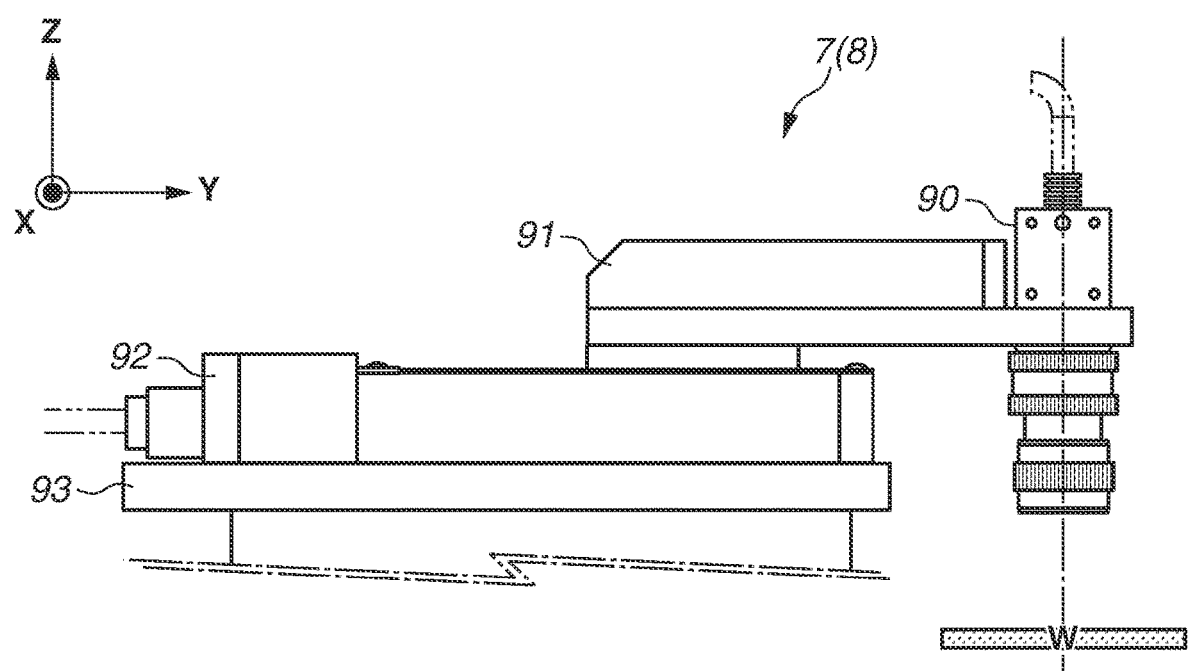
FIG. 8 is a front view illustrating a configuration of an inspection apparatus according to the first exemplary embodiment.

Next, the configuration of the pre-processing inspection apparatus (first inspection apparatus) 7 and the post-processing inspection apparatus (second inspection apparatus) 8 will be described with reference to FIG. 8. A camera 90 for inspecting the alignment marks AM and the processing points P on the work W is installed on a movable part of a camera driving actuator 92 via a camera bracket 91. The camera driving actuator 92 is installed on an inspection apparatus base 93 so that the camera driving actuator 92 can operate in the Y direction.

The camera 90 and the camera driving actuator 92 are connected to the upper controller 40, and operate based on commands from the upper controller 40.

Figure 9:
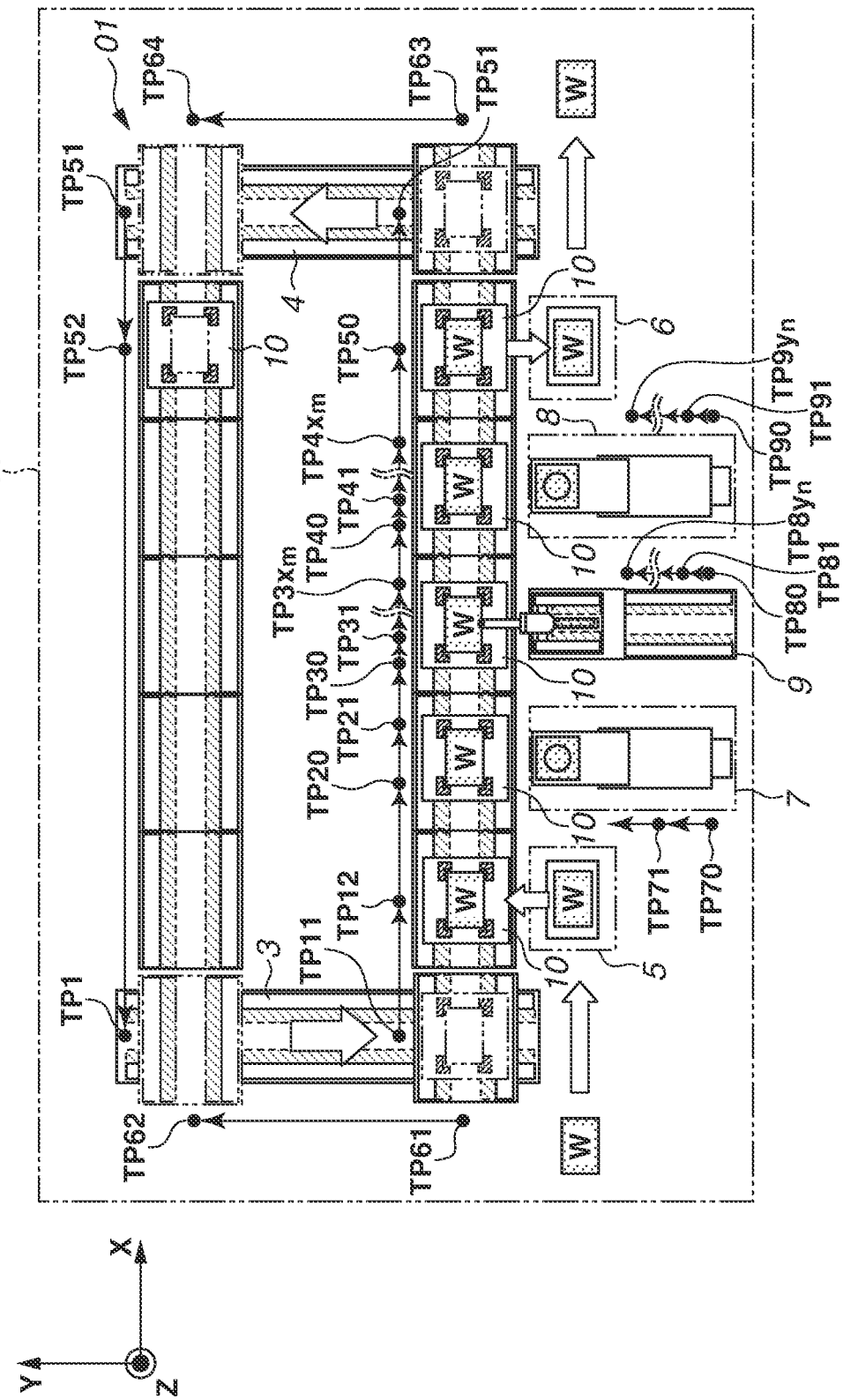
FIG. 9 is a teaching point layout diagram illustrating the layout of teaching points according to the first exemplary embodiment.

Next, teaching points for the conveyance carriage 10, the processing tool driving carriage 60, and the camera driving actuator 92 will be described with reference to FIG. 9.

The teaching points for the conveyance carriage 10 will initially be described. A teaching point TP11 is a teaching point on the carriage transfer apparatus 3. A teaching point TP12 is a teaching point for the work submission apparatus 5 to submit a work W. A teaching point TP50 is a teaching point for the work discharge apparatus 6 to discharge the work W. A teaching point TP51 is a teaching point on the carriage transfer apparatus 4. A teaching point TP52 is a teaching point on the conveyance apparatus return path 2 near the carriage transfer apparatus 4.

A teaching point TP20 is a teaching position (teaching point) for the pre-processing inspection apparatus 7 to inspect the alignment marks AM1 and AM3 on the work W. A teaching point TP21 is a teaching position for the pre-processing inspection apparatus 7 to inspect the alignment marks AM2 and AM4 on the work W.

A teaching point TP30 is a teaching position for the processing apparatus 9 to perform processing on a processing point P at a position having an X coordinate of 0 on the work W. A teaching point TP31 is a teaching position for the processing apparatus 9 to perform processing on a processing point P at a position having an X coordinate of 1 on the work W. A teaching point TP3$x_m$ is a teaching position for the processing apparatus 9 to perform processing on a processing point P at a position having an X coordinate of $x_m$ on the work W.

A teaching point TP40 is a teaching position for the post-processing inspection apparatus 8 to inspect a processing point P at a position having an X coordinate of 0 on the work W. A teaching point TP41 is a teaching position for the post-processing inspection apparatus 8 to inspect a processing point P at a position having an X coordinate of 1 on the work W. A teaching point TP4$x_m$ is a teaching position for the post-processing inspection apparatus 8 to inspect a processing point P at a position having an X coordinate of $x_m$ on the work W.

The conveyance carriage 10 operates to circulate through the conveyance system 01 by sequentially moving to the foregoing teaching positions. In a case where there is a plurality of conveyance carriages 10, the foregoing teaching points are shared by the plurality of conveyance carriages 10, and the conveyance carriages 10 to use each teaching point are sequentially switched.

Next, the teaching points for the camera driving actuator 92 of the pre-processing inspection apparatus 7 will be described. A teaching point TP70 is a teaching point to inspect the alignment marks AM1 and AM2 on the work W. A teaching point TP71 is a teaching point to inspect the alignment marks AM3 and AM4 on the work W.

Next, the teaching points for the processing tool driving carriage 60 of the processing apparatus 9 will be described. A teaching point TP80 is a teaching position for the processing apparatus 9 to perform processing on a processing point P at a position having a Y coordinate of 0 on the work W. A teaching point TP81 is a teaching position for the processing apparatus 9 to perform processing on a processing point P at a position having a Y coordinate of 1 on the work W. A teaching point TP8$y_n$ is a teaching point for the processing apparatus 9 to perform processing on a processing point P at a position having a Y coordinate of $y_n$ on the work W.

Next, the teaching points for the camera driving actuator 92 of the post-processing inspection apparatus 8 will be described. A teaching point TP90 is a teaching position for the post-processing inspection apparatus 8 to inspect a processing point P at a position having a Y coordinate of 0 on the work W. A teaching point TP91 is a teaching position for the post-processing inspection apparatus 8 to inspect a processing point P at a position having a Y coordinate of 1 on the work W. A teaching point TP9$y_n$ is a teaching point for the post-processing inspection apparatus 8 to inspect a processing point P at a position having a Y coordinate of $y_n$ on the work W.

The processing points P and the alignment marks AM on the work W are processed or inspected based on combinations of the foregoing teaching points for the conveyance carriage 10 with those for the camera driving actuators 92 and the processing tool driving carriage 60.

The work submission apparatus 5, the work discharge apparatus 6, the pre-processing inspection apparatus 7, the post-processing inspection apparatus 8, and the processing apparatus 9 are desirably disposed so that the foregoing teaching points do not arranged on a border between conveyance modules 11. This can prevent the influence of vibrations caused by the operation of the conveyance carriage 10 for such purposes as processing in the apparatuses from propagating to other conveyance modules 11. Such an effect can be further enhanced by dividing the base 02 on which the conveyance modules 11 are installed by each conveyance module 11.

Next, the operation of the conveyance carriage 10 going around the circulation path (circulating conveyance path) of the conveyance system 01 will be described with reference to FIG. 10.

Figure 10:
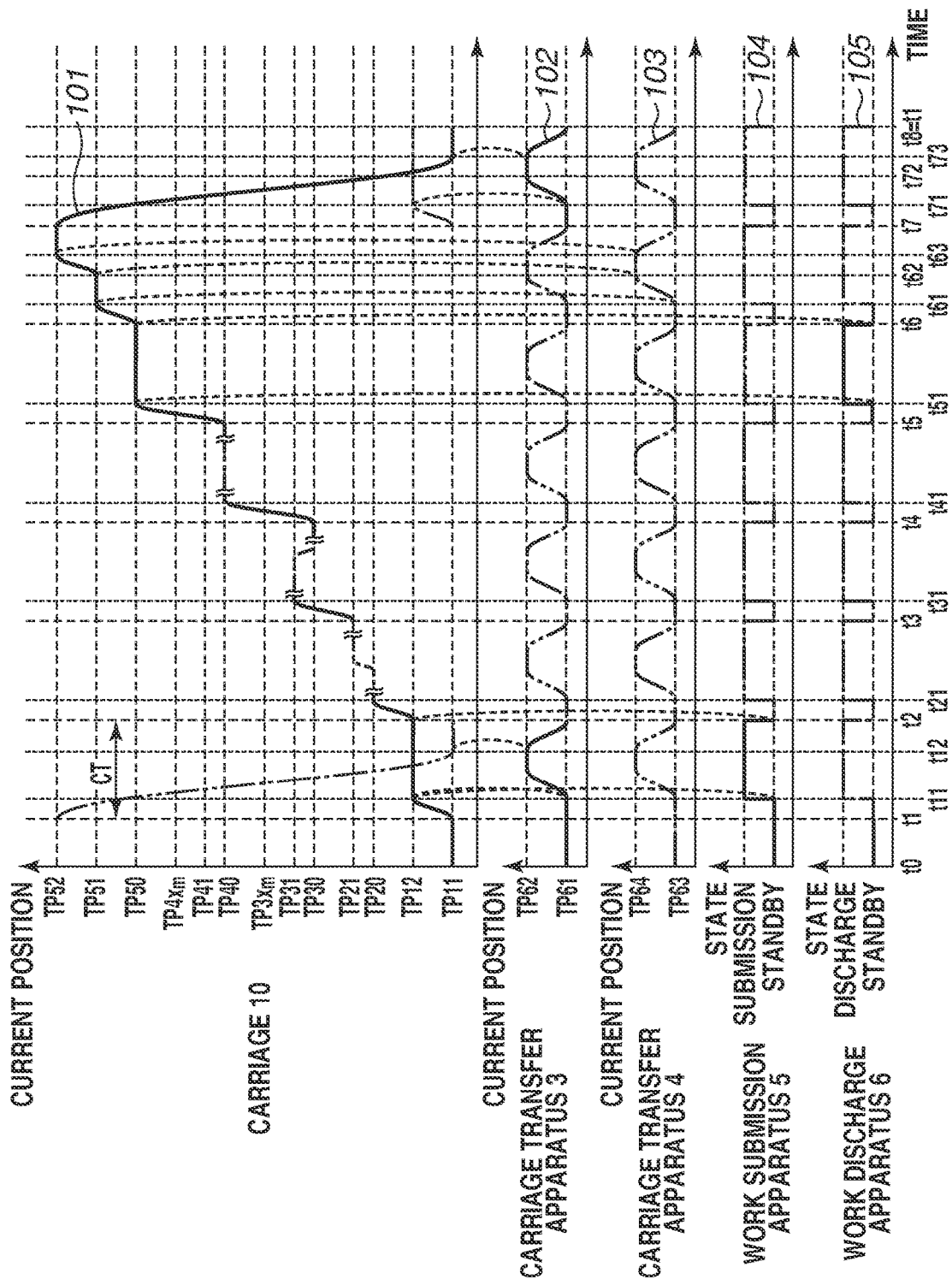
FIG. 10 is a timing chart illustrating an operation of a conveyance carriage according to the first exemplary embodiment disclosure.

FIG. 10 illustrates the positions of the conveyance carriage 10, the carriage transfer apparatus 3, and the carriage transfer apparatus 4, and the operating states of the work submission apparatus 5 and the work discharge apparatus 6 at each time. Specifically, FIG. 10 illustrates a position 101 of the carriage 10, a position 102 of the carriage transfer apparatus 3, and a position 103 of the carriage transfer apparatus 4. FIG. 10 also illustrates an operating state 104 of the work submission apparatus 5, and an operating state 105 of the work discharge apparatus 6.

For the carriage 10, the carriage transfer apparatus 3, and the carriage transfer apparatus 4, the vertical axes indicate teaching points. For the work submission apparatus 5 and the work discharge apparatus 6, the vertical axes indicate the operating states whether the respective apparatuses are submitting or discharging a work W or on standby.

The horizontal axes indicate time. The horizontal axes indicate an initial time t0, a first cycle start time t1, and second to eighth cycle start times t2 to t8. At the eighth cycle start time t8, the conveyance carriage 10 finishes going around the circulating conveyance path on the conveyance system 01 and returns to the same position as at the first cycle start time t1. A cycle time is denoted by CT.

The conveyance carriage 10 at the teaching point TP11 on the carriage transfer apparatus 3 starts to move at the first cycle start time t1, and reaches the teaching point TP12 at time t11. When the conveyance carriage 10 reaches the teaching point TP12, the work submission apparatus 5 enters a submission state and submits a work W onto the conveyance carriage 10. The operation of the first cycle is completed by the work submission apparatus 5 completing the work submission operation and returning to a standby state, and the second cycle starts at the second cycle start time t2.

The conveyance carriage 10 at the teaching point TP12 starts to move at the second cycle start time t2, and reaches the teaching point TP20 at time t21. When the conveyance carriage 10 reaches the teaching point TP20, the pre-processing inspection apparatus 7 starts inspection. The operation of the pre-processing inspection apparatus 7 will be described below. The operation of the second cycle is completed by the pre-processing inspection apparatus 7 completing the inspection, and the third cycle starts at the third cycle start time t3.

The conveyance carriage 10 at the teaching point TP21 starts to move at the third cycle start time t3, and reaches the teaching point TP31 at time t31. When the conveyance carriage 10 reaches the teaching point TP31, the processing apparatus 9 starts a processing operation. The operation of the processing apparatus 9 will be described below. The operation of the third cycle is completed when the processing apparatus 9 has completed the processing operation, and the fourth cycle starts at the fourth cycle start time t4.

The conveyance carriage 10 resting at the teaching point TP30 starts to move at the fourth cycle start time t4, and reaches the teaching point TP40 at time t41. When the conveyance carriage 10 reaches the teaching point TP40, the post-processing inspection apparatus 8 starts inspection. The operation of the post-processing inspection apparatus 8 will be described below. The operation of the fourth cycle is completed when the post-processing inspection apparatus 8 has completed the inspection, and the fifth cycle starts at the fifth cycle start time t5.

The conveyance carriage 10 resting at the teaching point TP40 starts to move at the fifth cycle start time t5, and reaches the teaching point TP50 at time t51. When the conveyance carriage 10 reaches the teaching point TP50, the work discharge apparatus 6 enters a discharge state and discharges the work W from the conveyance carriage 10. The operation of the fifth cycle is completed when the work discharge apparatus 6 has completed the work discharge operation and returned to the standby state, and the sixth cycle starts at the sixth cycle start time t6.

The conveyance carriage 10 resting at the teaching point TP50 starts to move at the sixth cycle start time t6, and reaches the teaching point TP51 on the carriage transfer apparatus 4 at time t61. When the conveyance carriage 10 reaches the teaching point TP51, the carriage transfer apparatus 4 starts to move from the teaching point TP63 to the teaching point TP64. The carriage transfer apparatus 4 reaches the teaching point TP64 at time t62, and the conveyance carriage 10 starts to move from the teaching point TP51 to the teaching point TP52. The conveyance carriage 10 reaches the teaching point TP52 at time t63, and the carriage transfer apparatus 4 starts to move from the teaching point TP64 to the teaching point TP63. The operation of the sixth cycle is completed by the carriage transfer apparatus 4 completing the movement, and the seventh cycle starts at the seventh cycle start time t7.

Another conveyance carriage 10 at the teaching point TP11 on the carriage transfer apparatus 3 other than the conveyance carriage 10 of which the operation has been described above starts to move at the seventh cycle start time t7, and reaches the teaching point TP12 at time t71. This operation is similar to that described as the operation of the first cycle from the first cycle start time t1 to the second cycle start time t2.

When the another conveyance carriage 10 reaches the teaching point TP12, the carriage transfer apparatus 3 starts to move from the teaching point TP61 to the teaching point TP62. The carriage transfer apparatus 3 reaches the teaching point TP62 at time t72.

Meanwhile, the conveyance carriage 10 at the teaching point TP52 starts to move to the teaching point TP11 on the carriage transfer apparatus 3 at the seventh cycle start time t7. While the conveyance carriage 10 is moving along the conveyance apparatus return path 2, the carriage transfer apparatus 3 reaches the teaching point TP62 at time t72. The conveyance carriage 10 then transfers from the conveyance apparatus return path 2 to the carriage transfer apparatus 3, and reaches the teaching point TP11 on the carriage transfer apparatus 3 at time t73. This transfer may be performed without the conveyance carriage 10 making a stop on the way from the teaching point TP52 to the teaching point TP11. An additional teaching point intended to wait for the carriage transfer apparatus 3 to complete moving to the teaching point TP62 may be provided on the conveyance apparatus return path 2 near the carriage transfer apparatus 3. In the foregoing description, the conveyance carriage 10 stops at the teaching point TP52 in a period between the time t63 and the seventh cycle start time t7. However, the conveyance carriage 10 may move to the teaching point TP11 without a stop. An additional teaching point may be provided at any point on the conveyance apparatus return path 2.

The conveyance carriage 10 completes moving to the teaching point TP11 at time t73, and the carriage transfer apparatus 3 starts to move from the teaching point TP62 to the teaching point TP61. The carriage transfer apparatus 3 reaches the teaching point TP61 at the eighth cycle start time t8. The conveyance carriage 10 finishes going around the circulation path of the conveyance system 01 and returns to the same position as at the initial time t0.

Next, detailed operations of the conveyance carriage 10 and the pre-processing inspection apparatus 7 between the second cycle start time t2 and the third cycle start time t3 in FIG. 10 will be described with reference to FIG. 11.

Figure 11:
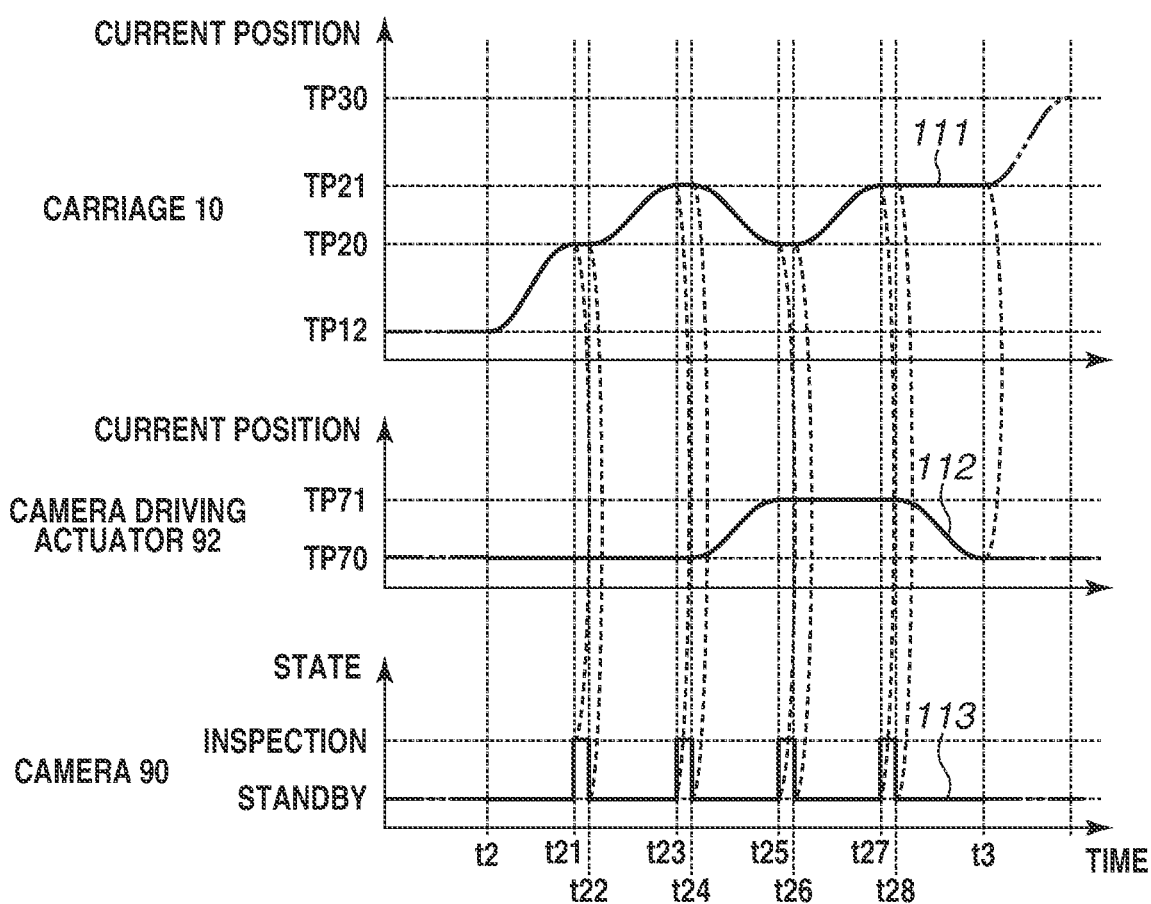
FIG. 11 is a timing chart illustrating an operation of a pre-processing inspection apparatus according to the first exemplary embodiment.

FIG. 11 illustrates the positions of the conveyance carriage 10 and the camera driving actuator 92 of the pre-processing inspection apparatus 7 and the operating state of the camera 90 at each time. Specifically, FIG. 11 illustrates a position 111 of the conveyance carriage 10, a position 112 of the camera driving actuator 92, and an operating state 113 of the camera 90.

The conveyance carriage 10 resting at the teaching point TP12 starts to move to the teaching point TP20 at the second cycle start time t2. The conveyance carriage 10 reaches the teaching point TP20 at time t21. When the conveyance carriage 10 reaches the teaching point TP20, the alignment of the camera 90 with the alignment mark AM1 of the work W on the conveyance carriage 10 is completed, and the camera 90 starts inspection.

The inspection method is not limited in particular. For example, a method for detecting the amount of deviation from a reference value by performing image processing on an image captured by the camera 90 may be used.

The camera 90 completes the inspection at time t22, and the conveyance carriage 10 starts to move to the teaching point TP21. The conveyance carriage 10 reaches the teaching point TP21 at time t23. When the conveyance carriage 10 reaches the teaching point TP21, the alignment of the camera 90 with the alignment mark AM2 of the work W on the conveyance carriage 10 is completed, and the camera 90 starts inspection.

The inspection method is not limited in particular. For example, a method for detecting the amount of deviation from a reference value by performing image processing on an image captured by the camera 90 may be used.

The camera 90 completes the inspection at time t24, and the conveyance carriage 10 starts to move to the teaching point TP20. The camera driving actuator 92 starts to move from the teaching point TP70 to the teaching point TP71 along with the movement of the conveyance carriage 10. The conveyance carriage 10 reaches the teaching point TP20 and the camera driving actuator 92 reaches the teaching point TP71 at time t25. When the conveyance carriage 10 reaches the teaching point TP20 and the camera driving actuator 92 reaches the teaching point TP71, the alignment of the camera 90 with the alignment mark AM3 of the work W on the conveyance carriage 10, is completed and the camera 90 starts inspection.

The inspection method is not limited in particular. For example, a method for detecting the amount of deviation from a reference value by performing image processing on an image captured by the camera 90 may be used.

When the camera 90 has completed the inspection at time t26, the conveyance carriage 10 starts to move to the teaching point TP21. The conveyance carriage 10 reaches the teaching point TP21 at time t27. When the conveyance carriage 10 reaches the teaching point TP21, the alignment of the camera 90 with the alignment mark AM4 of the work W on the conveyance carriage 10 is completed, and the camera 90 starts inspection.

The inspection method is not limited in particular. For example, a method for detecting the amount of deviation from a reference value by performing image processing on an image captured by the camera 90 may be used.

When the camera 90 has completed the inspection at time t28, the camera driving actuator 92 starts to move to the teaching point TP70. The camera driving actuator 92 reaches the teaching point TP70 to complete the operation of the second cycle and the third cycle starts at the third cycle start time t3.

By the foregoing operations, inspections of the alignment marks AM1, AM2, AM3, and AM4 are completed. The position of the work W held on the conveyance carriage 10 is calculated from the inspection results.

The amounts of correction to the respective teaching points are then determined from the calculated position of the work W. An example of the method for determining the amounts of correction in a case where the work W is misaligned as illustrated in FIG. 28 will be described. In this example, the positions of the alignment marks AM in FIG. 28 deviate by ±1 from their respective reference values. The values of deviation in the positions of the respective teaching points from the reference values are calculated, and the calculations are added to the reference values to correct the positions of the teaching points. Specifically, the alignment mark AM1 normally having a reference position of (0, 0) is detected at (−1, +1). The alignment mark AM2 normally having a reference position of $(x_m, 0)$ and is detected at $(x_m-1, -1)$. The alignment mark AM3 normally having a reference position of $(0, y_n)$ and is detected at $(1, y_n+1)$. The alignment mark AM4 normally having a reference position of $(x_m, y_n)$ and is detected at $(x_m+1, y_n, -1)$. In such a case, for example, the position of the processing point P(1, 0) $(P(x_1, 0))$ is corrected into $P(x_1-1, +1-((1-(-1)/n)\times 1))$. The position of the processing point $P(x_{m-1}, 0)$ is corrected into $P(x_{m-1}-1, +1-((1-(-1)/n)\times(n-1)))$.

Next, detailed operations of the conveyance carriage 10 and the processing apparatus 9 between the third cycle start time t3 and the fourth cycle start time t4 in FIG. 10 will be described with reference to FIGS. 1, 7, and 12.

Figure 12:
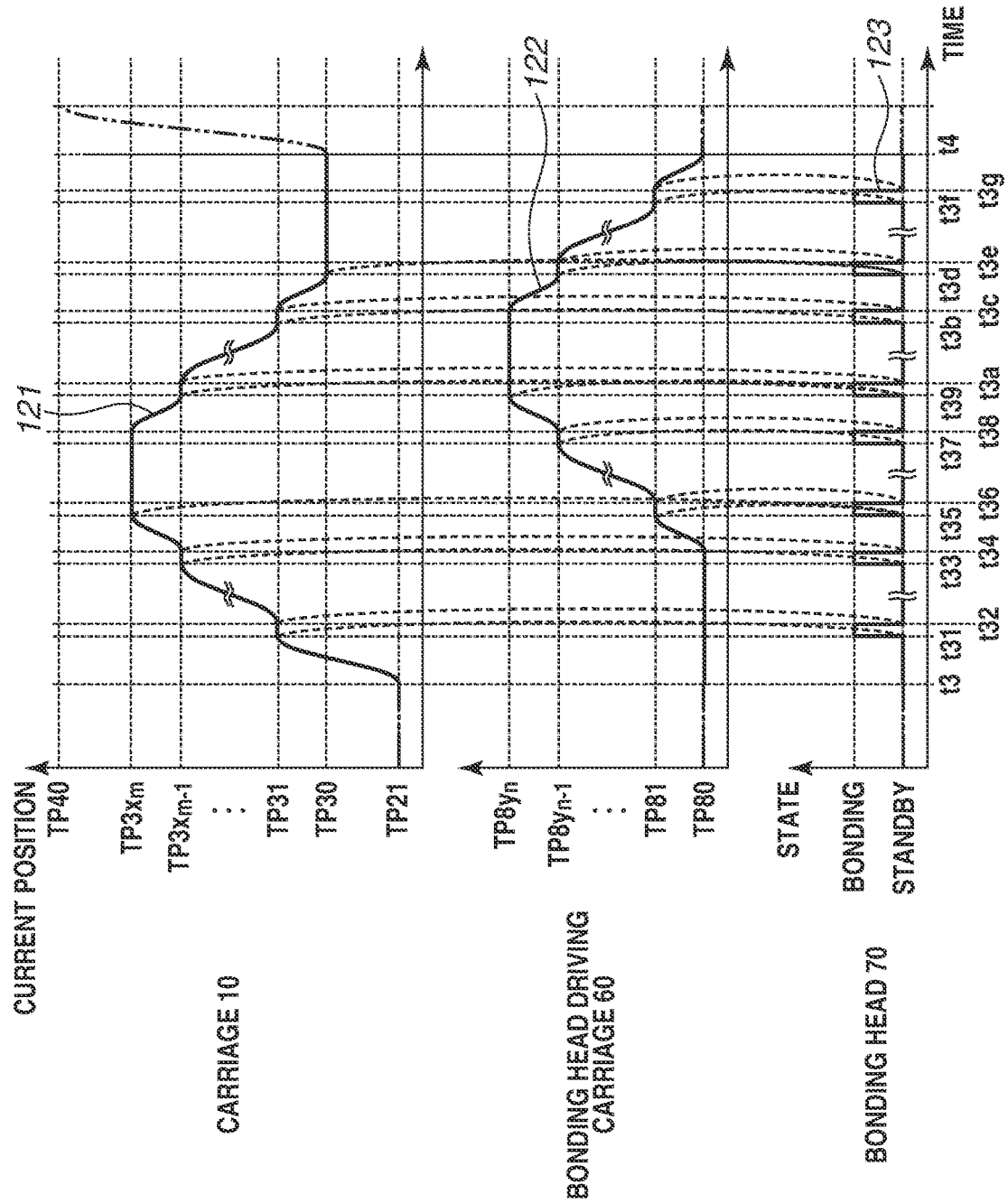
FIG. 12 is a timing chart illustrating an operation of the processing apparatus according to the first exemplary embodiment.

FIG. 12 illustrates the positions of the conveyance carriage 10 and the bonding head driving carriage 60 of the processing apparatus 9 and the operating state of the bonding head (processing tool) 70 at each time. Specifically, FIG. 12 illustrates a position 121 of the conveyance carriage 10, a position 122 of the bonding head driving carriage 60, and an operating state 123 of the bonding head 70. Here, the operating state 123 of the bonding head 70 indicates the operation of the bonding head 70 and the bonding head actuator 72. In the operating state 123, "bonding" of the bonding head 70 represents a series of operations where the bonding head actuator 72 is lowered to contact the work W, the bonding head 70 performs bonding, and the bonding head actuator 72 is lifted and returns to the original position after the completion of the bonding. For ease of description, operations in a case where the alignment marks AM do not deviate from the reference positions will be described below. In other words, operations in a case where the carriage 10 holds the work W at the reference position will be described. In a case where there is a deviation in the work position, the work W is processed after moving the conveyance carriage 10 to the corrected positions of the teaching points described above.

The conveyance carriage 10 at the teaching point TP21 starts to move to the teaching point TP31 at the third cycle start time t3. The conveyance carriage 10 reaches the teaching point TP31 at time t31. When the conveyance carriage 10 reaches the teaching point TP31, the alignment of the bonding head 70 with the processing point P(1, 0) of the work W on the conveyance carriage 10 is completed, and the bonding head 70 starts bonding.

When the bonding of the processing point P(1, 0) is completed at time t32, the conveyance carriage 10 starts to move to the next teaching point. When the conveyance carriage 10 reaches the next teaching point, the bonding head 70 starts bonding. Such operations are repeated from the processing point P(1, 0) to the processing point $P(x_{m-1}, 0)$. The bonding of the processing point $P(x_{m-1}, 0)$ is completed at time t34.

When the bonding of the processing point $P(x_{m-1}, 0)$ is completed at time t34, the conveyance carriage 10 starts to move to the teaching point $TP3x_m$ and the bonding head driving carriage 60 starts to move from the teaching point TP80 to the teaching point TP81. When the conveyance carriage 10 reaches the teaching point $TP3x_m$ and the bonding head driving carriage 60 reaches the teaching point TP81 at time t35, the alignment of the bonding head 70 with the processing point $P(x_m, 1)$ of the work W on the conveyance carriage 10 is completed. The bonding head 70 starts bonding.

When the bonding of the processing point $P(x_m, 1)$ is completed at time t36, the bonding head driving carriage 60 starts to move to the next teaching point. When the bonding head driving carriage 60 reaches the next teaching point, the bonding head 70 starts bonding. Such operations are repeated from the processing point $P(x_m, 1)$ to the processing point $P(x_m, y_n-1)$. The bonding of the processing point $P(x_m, y_n-1)$ is completed at time t38.

When the bonding of the processing point $P(x_m, y_n-1)$ is completed at time t38, the conveyance carriage 10 starts to move to the teaching point $TP3x_{m-1}$ and the bonding head driving carriage 60 starts to move from the teaching point $TP8y_{n-1}$ to the teaching point $TP8y_n$. When the conveyance carriage 10 reaches the teaching point $TP3x_{m-1}$ and the bonding head driving carriage 60 reaches the teaching point $TP8y_n$ at time t39, the alignment of the bonding head 70 with the processing point $P(x_{m-1}, y_n)$ of the work W on the conveyance carriage 10 is completed. The bonding head 70 starts bonding.

When the bonding of the processing point $P(x_{m-1}, y_n)$ is completed at time t3a, the conveyance carriage 10 starts to move to the next teaching point. When the conveyance carriage 10 reaches the next teaching point, the bonding head 70 starts bonding. Such operations are repeated from the processing point $y_n$) to the processing point $P(1, y_n)$. The bonding of the processing point $P(1, y_n)$ is completed at time t3c.

When the bonding of the processing point $P(1, y_n)$ is completed at time t3c, the conveyance carriage 10 starts to move to the teaching point TP30 and the bonding head driving carriage 60 starts to move from the teaching point $TP8y_n$ to the teaching point $TP8y_{n-1}$. When the conveyance carriage 10 reaches the teaching point TP30 and the bonding head driving carriage 60 reaches the teaching point $TP8y_{n-1}$ at time t3d, the alignment of the bonding head 70 with the processing point $P(0, y_{n-1})$ of the work W on the conveyance carriage 10 is completed. The bonding head 70 starts bonding.

When the bonding of the processing point $P(0, y_{n-1})$ is completed at time t3e, the bonding head driving carriage 60 starts to move to the next teaching point. When the bonding head driving carriage 60 reaches the next teaching point, the bonding head 70 starts bonding. Such operations are repeated from the processing point $P(0, y_{n-1})$ to the processing point $P(0, 1)$. The bonding of the processing point $P(0, 1)$ is completed at time t3g.

When the bonding of the processing point $P(0, 1)$ is completed, the bonding head driving carriage 60 starts to move to the teaching point TP80. The bonding head driving carriage 60 reaches the teaching point TP80 to complete the operation of the third cycle and the fourth cycle starts at the fourth cycle start time t4.

As described above, the processing points P on the work W and the bonding head 70 can be aligned to perform processing by the combinations of the operations of the conveyance carriage 10 and the bonding head driving carriage 60.

Next, detailed operations of the conveyance carriage 10 and the post-processing inspection apparatus 8 between the fourth cycle start time t4 and the fifth cycle start time t5 in FIG. 10 will be described with reference to FIG. 13.

Figure 13:
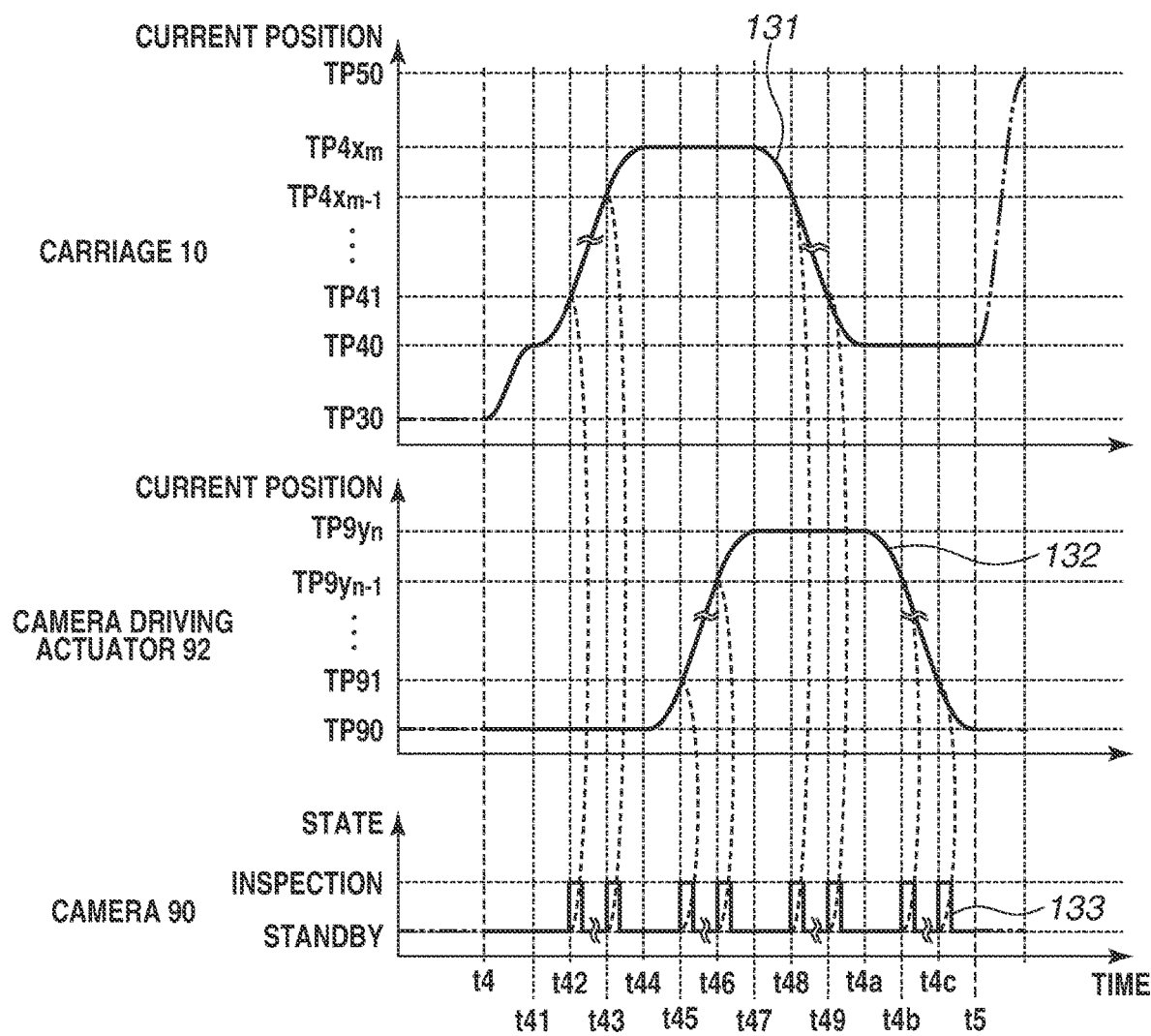
FIG. 13 is a timing chart illustrating an operation of a post-processing inspection apparatus according to the first exemplary embodiment.

FIG. 13 illustrates the positions of the conveyance carriage 10 and the camera driving actuator 92 of the post-processing inspection apparatus 8 and the operating state of the camera 90 at each time. Specifically, FIG. 13 illustrates a position 131 of the conveyance carriage 10, a position 132 of the camera driving actuator 92, and an operating state 133 of the camera 90.

The conveyance carriage 10 at the teaching point TP30 starts to move to the teaching point TP40 at the fourth cycle start time t4. The conveyance carriage 10 reaches the teaching point TP40 at time t41. After reaching the teaching point TP40, the conveyance carriage 10 starts to move to the teaching point $TP4x_m$. The conveyance carriage 10 accelerates for a predetermined acceleration time set in advance, and then moves at a constant speed.

The conveyance carriage 10 passes the teaching point TP41 at time t42, and the camera 90 passes a position where the processing point P(1, 0) on the work W can be inspected. When the conveyance carriage 10 passes the teaching point TP41, an inspection start command is issued to the camera 90 and the camera 90 performs inspection. The camera 90 similarly performs inspection when the conveyance carriage 10 passes the next teaching point. Such inspection is repeated from the processing point P(1, 0) to the processing point $P(x_{m-1}, 0)$. After the inspection on the processing point $P(x_{m-1}, 0)$ is completed, the conveyance carriage 10 reaches the teaching point $TP4x_m$ at time t44.

Simultaneously with the arrival of the conveyance carriage 10 at the teaching point $TP4x_m$ at time t44, the camera driving actuator 92 starts to move from the teaching point TP90 to the teaching point $TP9y_n$. The camera driving actuator 92 accelerates for a predetermined acceleration time set in advance, and then moves at a constant speed.

The camera driving actuator 92 passes the teaching point TP91 at time t45, and the camera 90 passes a position where the processing point $P(x_m, 1)$ on the work W can be inspected. When the camera driving actuator 92 passes the teaching point TP91, an inspection start command is issued to the camera 90 and the camera 90 performs inspection. The camera 90 similarly performs inspection when the camera driving actuator 92 passes the next teaching point. Such inspection is repeated from the processing point $P(x_m, 1)$ to the processing point $P(x_m, y_{n-1})$. After the inspection on the processing point $P(x_m, y_{n-1})$ is completed, the camera driving actuator 92 reaches the teaching point $TP9y_n$ at time t47.

Simultaneously with the arrival of the camera driving actuator 92 at the teaching point $TP9y_n$ at time t47, the conveyance carriage 10 starts to move from the teaching point $TP4x_m$ to the teaching point TP40. The conveyance carriage 10 accelerates for a predetermined acceleration time set in advance, and then moves at a constant speed.

The conveyance carriage 10 passes the teaching point $TP4x_{m-1}$ at time t48, and the camera 90 passes a position where the processing point $P(x_{m-1}, y_n)$ on the work W can be inspected. When the conveyance carriage 10 passes the teaching point $TP4x_{m-1}$, an inspection start command is issued to the camera 90 and the camera 90 performs inspection. The camera 90 similarly performs inspection when the conveyance carriage 10 passes the next teaching point. Such inspection is repeated from the processing point $P(x_{m-1}, y_n)$ to the processing point $P(1, y_n)$. After the inspection on the processing point $P(1, y_n)$ is completed, the conveyance carriage 10 reaches the teaching point TP40 at time t4a.

Simultaneously with the arrival of the conveyance carriage 10 at the teaching point TP40 at time t4a, the camera driving actuator 92 starts to move from the teaching point $TP9y_n$ to the teaching point TP90. The camera driving actuator 92 accelerates for a predetermined acceleration time set in advance, and then moves at a constant speed.

The camera driving actuator 92 passes the teaching point $TP9y_{n-1}$ at time t4b, and the camera 90 passes a position where the processing point $P(0, y_{n-1})$ on the work W can be inspected. When the camera driving actuator 92 passes the teaching point $TP9y_{n-1}$, an inspection start command is issued to the camera 90 and the camera 90 performs inspection. The camera 90 similarly performs inspection when the camera driving actuator 92 passes the next teaching point. Such inspection is repeated from the processing point $P(0, y_{n-1})$ to the processing point $P(0, 1)$. After the inspection on the processing point $P(0, 1)$ is completed, the camera driving actuator 92 reaches the teaching point TP90 to complete the operation of the fourth cycle and the fifth cycle starts at the fifth cycle start time t5.

As described above, the processing points P on the work W and the bonding head 70 can be aligned to perform inspection by the combinations of the operations of the conveyance carriage 10 and the camera driving actuator 92.

Other effects of the present exemplary embodiment include weight reduction of the moving bodies mounted on the conveyance carriage 10 or the processing tool driving carriage 60. This can reduce the occurrence of vibrations on the apparatuses when the conveyance carriage 10 or the processing tool driving carriage 60 is accelerated, decelerated, and stopped. This can also improve processing accuracy and enables installation of the apparatuses on a low-rigidity base.

The conveyance carriage 10 and the processing tool driving carriage 60 are configured as linear actuators that are run by permanent magnets or ferromagnetic bodies receiving an electromagnetic force from a coil group. The conveyance carriage 10 and the processing tool driving carriage 60 can thus be operated and stopped with higher precision. By using the permanent magnets or ferromagnetic bodies mounted on the conveyance carriage 10, power supply to the driven part can be omitted, and therefore a wireless conveyance apparatus can be configured. By a wireless conveyance apparatus, the conveyance carriage 10 is free of restrictions on the moving area and becomes capable of circulating operations.

As a comprehensive effect, the entire processing system can be reduced in size and the apparatus cost can be reduced.

Second Exemplary Embodiment

In the first exemplary embodiment, the pre-processing inspection apparatus (first inspection apparatus) 7, the post-processing inspection apparatus (second inspection apparatus) 8, and the processing apparatus 9 are described to include Y-direction driving actuators. However, Y-direction driving actuators may be included in conveyance modules. In the present exemplary embodiment, an example where some conveyance modules include Y-direction driving actuators will be described. In the present exemplary embodiment, configurations having similar operations to those of the first exemplary embodiment are denoted by the same reference numerals. Differences from the first exemplary embodiment will mainly be described, and a description of parts having similar operations to those of the first exemplary embodiment may be omitted.

Figure 14:
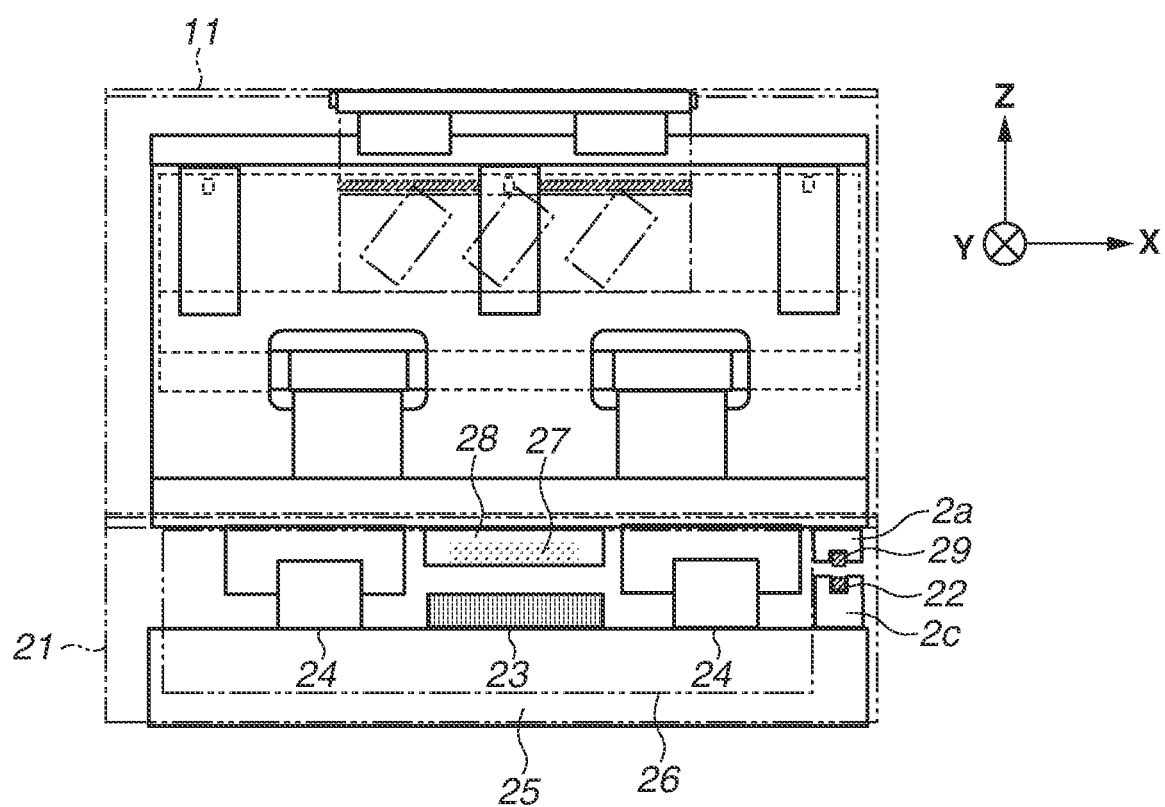
FIG. 14 is a schematic diagram illustrating a configuration of an interlocking conveyance module according to a second exemplary embodiment.

In this specification document, a conveyance module including a Y-direction driving actuator will be referred to as an interlocking conveyance module. A configuration of the interlocking conveyance module will be described with reference to FIG. 14. An interlocking conveyance module 21 includes a Y-direction driving actuator 26 that can operate a conveyance module 11 in the Y direction.

In the present exemplary embodiment, the configuration of the Y-direction driving actuator 26 will be described by using an MM linear motor like the conveyance module 11. However, this is not restrictive, and the Y-direction driving actuator 26 may be driven by other configurations.

The interlocking conveyance module 21 includes conveyance module driving coils 23 disposed on the top surface of an interlocking conveyance module base 25 along the Y direction. A plurality of permanent magnets 27 and a permanent magnet bracket 28 are installed on the bottom surface of the conveyance module 11 to be opposed to the conveyance module driving coils 23. Two guide rails 24 are laid in parallel on the top surface of the interlocking conveyance module base 25.

The permanent magnet bracket 28 is fixed to the conveyance module 11 via through holes in the bottom surface of the conveyance module 11. The permanent magnets 27 are adhesively bonded to the permanent magnet bracket 28.

A lower controller 43 applies a current to the conveyance module driving coils 23. The current application generates an electromagnetic force for driving the conveyance module 11 in the Y direction between the plurality of permanent magnets 27 and the conveyance module driving coils 23. The conveyance module 11 on the interlocking conveyance module 21 is electromagnetically driven over the conveyance apparatus forward path 1 or the conveyance apparatus return path 2 along the guide rails 24 in the Y direction.

An encoder 22 is installed on the top surface of the interlocking conveyance module base 25 via an encoder bracket 2c. A scale 29 is attached to the bottom surface of the conveyance module 11 via a scale bracket 2a to be opposed to the encoder 22. The encoder 22 of the interlocking conveyance module 21 can detect the position of the conveyance module 11 in the Y direction as a relative position to the encoder 22 by reading a pattern on the scale 29.

The lower controller 43 can calculate the position of the conveyance module 11 on the interlocking conveyance module base 25 based on the output of the connected encoder 22 and the installation position of the encoder 22.

The lower controller 43 can also calculate the Y-direction position of the conveyance carriage 10 on the interlocking conveyance module base 25 by using a positional relationship between the installation position of the encoder 22 and the conveyance carriage 10.

The lower controller 43 can control the amounts of the currents applied to the carriage driving coils 13 and the conveyance module driving coils 23 based on the calculated position of the conveyance carriage 10. The lower controller 43 can thereby convey the conveyance carriage 10 on the interlocking conveyance module 21 to a predetermined position in the X and Y directions at a predetermined speed and stop the conveyance carriage 10.

Such an interlocking conveyance module can be installed instead of a conveyance module 11 disposed at a position where the processing of at least any one of the pre-processing inspection apparatus 7, post-processing inspection apparatus 8, and processing apparatus 9 described in the first exemplary embodiment can be performed.

Figure 19:
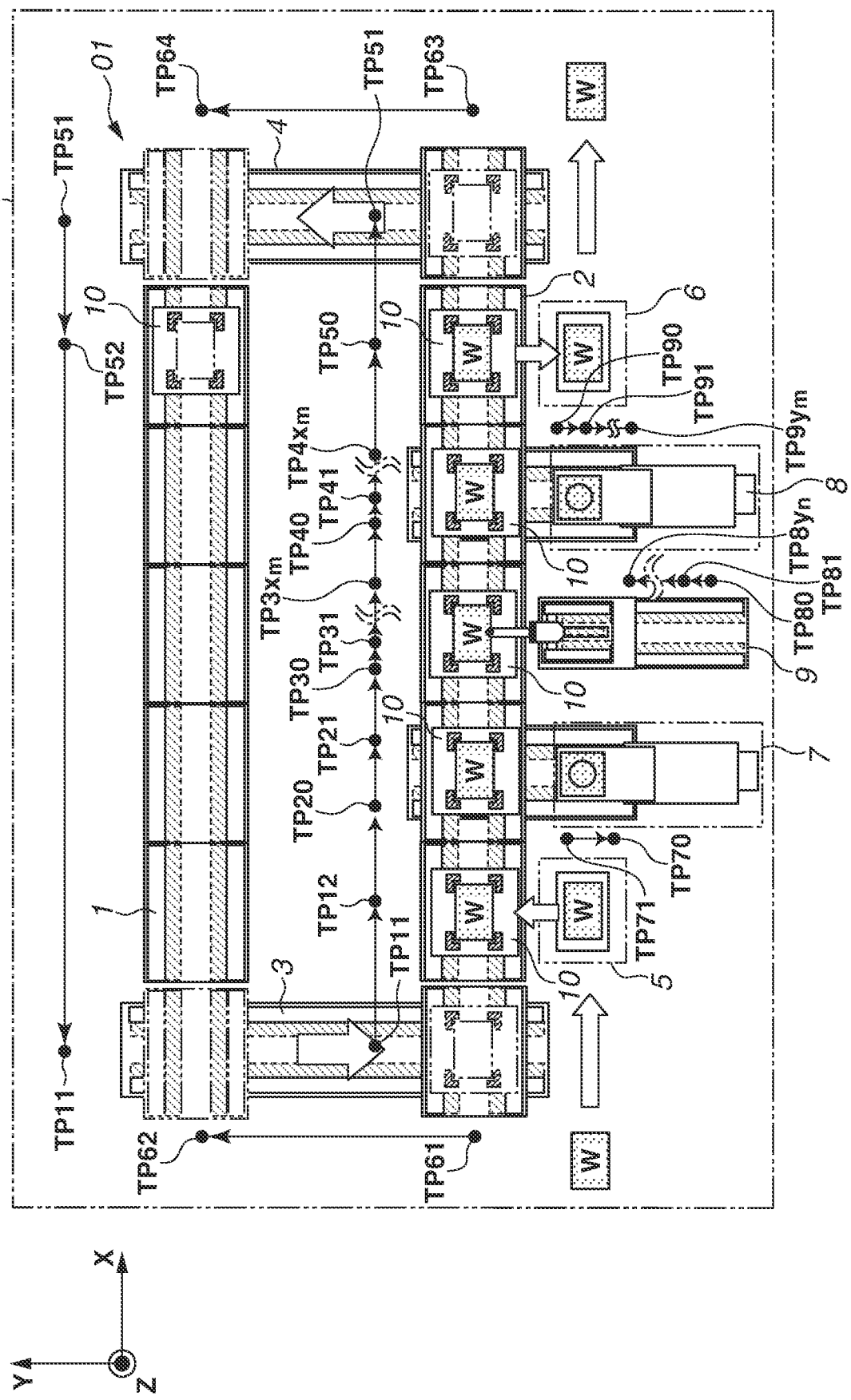
FIG. 19 is a teaching point layout diagram illustrating the layout of teaching points according to the second exemplary embodiment.

FIG. 19 illustrates an example where interlocking conveyance modules 21 are installed for the conveyance modules 11 disposed at the positions where the pre-processing inspection apparatus 7 and the post-processing inspection apparatus 8 can perform processing.

Next, teaching points for the conveyance carriage 10, the bonding head driving carriage 60, and the interlocking conveyance modules 21 will be described with reference to FIG. 19.

The teaching points for the conveyance carriage 10 will initially be described. A teaching point TP11 is a teaching point on the carriage transfer apparatus 3. A teaching point TP12 is a teaching point for the work submission apparatus 5 to submit a work W. A teaching point TP50 is a teaching point for the work discharge apparatus 6 to discharge the work W. A teaching point TP51 is a teaching point on the carriage transfer apparatus 4. A teaching point TP52 is a teaching point on the conveyance apparatus return path 2 near the carriage transfer apparatus 4.

A teaching point TP20 is a teaching position for the pre-processing inspection apparatus 7 to inspect the alignment marks AM1 and AM3 on the work W. A teaching point TP21 is a teaching position for the pre-processing inspection apparatus 7 to inspect the alignment marks AM2 and AM4 on the work W.

A teaching point TP30 is a teaching position for the processing apparatus 9 to perform processing on a processing point P at a position having an X coordinate of 0 on the work W. A teaching point TP31 is a teaching position for the processing apparatus 9 to perform processing on a processing point P at a position having an X coordinate of 1 on the work W. A teaching point TP3$x_m$ is a teaching position for the processing apparatus 9 to perform processing on a processing point P at a position having an X coordinate of $x_m$ on the work W.

A teaching point TP40 is a teaching position for the post-processing inspection apparatus 8 to inspect a processing point P at a position having an X coordinate of 0 on the work W. A teaching point TP41 is a teaching position for the post-processing inspection apparatus 8 to inspect a processing point P at a position having an X coordinate of 1 on the work W. A teaching point TP4$x_m$ is a teaching position for the post-processing inspection apparatus 8 to inspect a processing point P at a position having an X coordinate of $x_m$ on the work W.

The conveyance carriage 10 operates to circulate through the conveyance system 01 by sequentially moving to the foregoing teaching positions. In a case where there is a plurality of conveyance carriages 10, the foregoing teaching points are shared by the plurality of conveyance carriages 10, and the conveyance carriages 10 to use each teaching point are sequentially switched.

Next, the teaching points for the interlocking conveyance module 21 corresponding to the pre-processing inspection apparatus 7 will be described. A teaching point TP70 is a teaching point for inspecting the alignment marks AM1 and AM2 on the work W. A teaching point TP71 is a teaching point for inspecting the alignment marks AM3 and AM4 on the work W.

Next, the teaching points for the bonding head driving carriage 60 of the processing apparatus 9 will be described. In the present exemplary embodiment, for ease of description, operations in a case where the alignment marks AM do not deviate from their reference positions will be described below. In other words, operations in a case where the carriage 10 holds the work W at the reference position will be described. In a case where there is a deviation in the work position, processing is performed after the conveyance carriage 10 is moved to the corrected positions of the teaching points as described in the first exemplary embodiment.

A teaching point TP80 is a teaching point for the processing apparatus 9 to perform processing on a processing point P at a position having a Y coordinate of 0 on the work W. A teaching point TP81 is a teaching position for the processing apparatus 9 to perform processing on a processing point P at a position having a Y coordinate of 1 on the work W. A teaching point TP8$y_n$ is a teaching position for the processing apparatus 9 to perform processing on a processing point P at a position having a Y coordinate of $y_n$ on the work W.

Next, the teaching points for the interlocking conveyance module 21 corresponding to the post-processing inspection apparatus 8 will be described. A teaching point TP90 is a teaching position for the post-processing inspection apparatus 8 to inspect a processing point P at a position having a Y coordinate of 0 on the work W. A teaching point TP91 is a teaching position for the post-processing inspection apparatus 8 to inspect a processing point P at a position having a Y coordinate of 1 on the work W. A teaching point TP9$y_n$ is a teaching point for the post-processing inspection apparatus 8 to inspect a processing point P at a position having a Y coordinate of $y_n$ on the work W.

The processing points P and the alignment marks AM on the work W are processed or inspected based on combinations of the foregoing teaching points for the conveyance carriage 10 with those for the interlocking conveyance modules 21 and the bonding head driving carriage 60.

The work submission apparatus 5, the work discharge apparatus 6, the pre-processing inspection apparatus 7, the post-processing inspection apparatus 8, and the processing apparatus 9 are desirably disposed so that the foregoing teaching points do not disposed on a border between conveyance modules 11. This can prevent the influence of vibrations caused by the operation of the conveyance carriage 10 for such purposes as processing in the apparatuses from propagating to other conveyance modules 11. Such an effect can be further enhanced by separating the base 02 on which the conveyance modules 11 are installed by each conveyance module 11.

Next, the operation of the conveyance carriage 10 going around the circulation path of the conveyance system 01 will be described with reference to FIG. 20.

Figure 20:
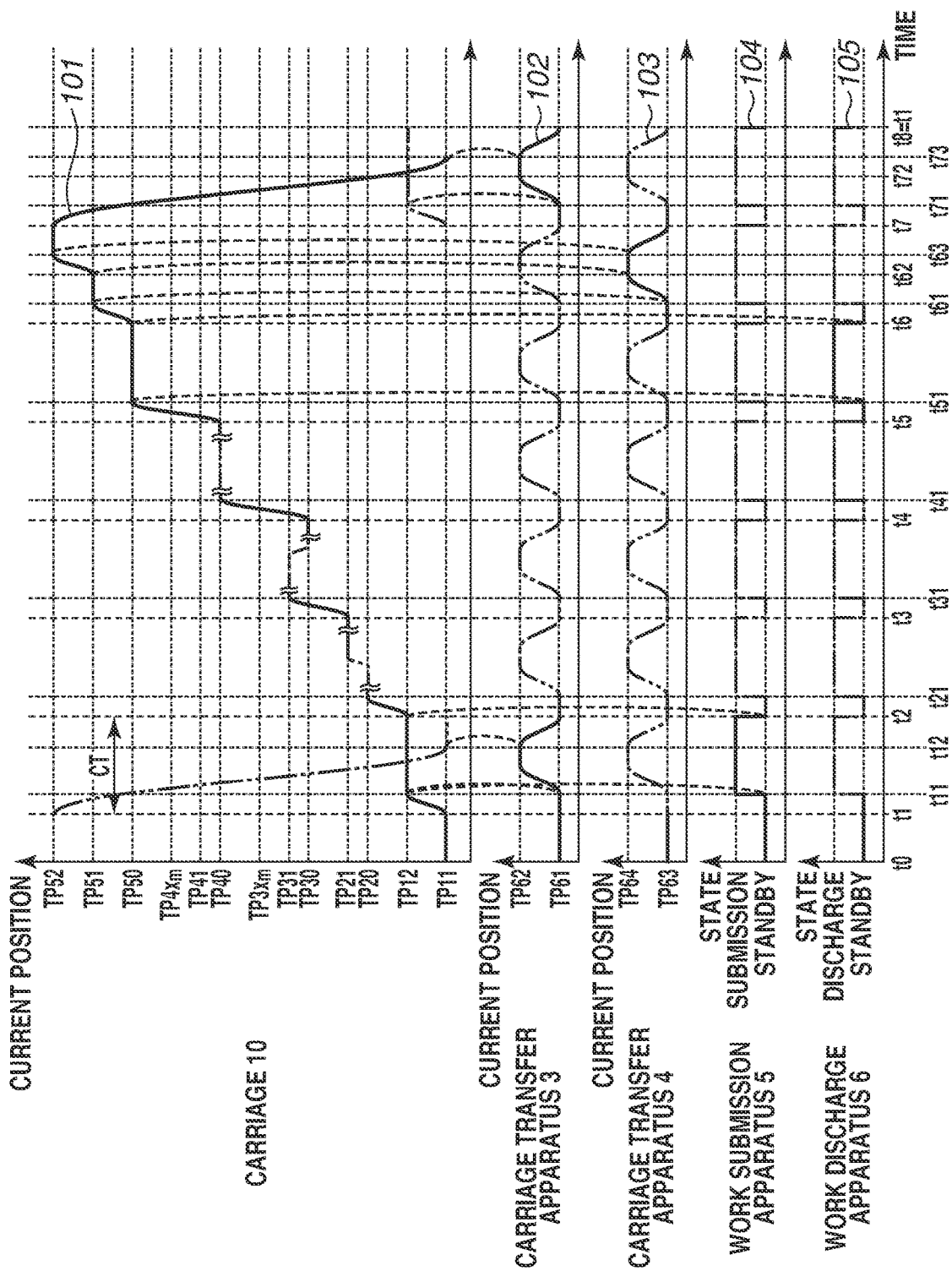
FIG. 20 is a timing chart illustrating an operation of a conveyance carriage according to the second exemplary embodiment.

FIG. 20 illustrates the positions of the conveyance carriage 10, the carriage transfer apparatus 3, and the carriage transfer apparatus 4, and the operating states of the work submission apparatus 5 and the work discharge apparatus 6 at each time. Specifically, FIG. 20 illustrates a position 101 of the conveyance carriage 10, a position 102 of the carriage transfer apparatus 3, and a position 103 of the carriage transfer apparatus 4. FIG. 20 also illustrates an operating state 104 of the work submission apparatus 5, and an operating state 105 of the work discharge apparatus 6.

For the carriage 10, the carriage transfer apparatus 3, and the carriage transfer apparatus 4, the vertical axes indicate teaching points. For the work submission apparatus 5 and the work discharge apparatus 6, the vertical axes indicate the operating states whether the respective apparatuses are submitting or discharging a work W or on standby.

The horizontal axes indicate time. The horizontal axes indicate an initial time t0, a first cycle start time t1, and second to eighth cycle start times t2 to t8. At the eighth cycle start time t8, the conveyance carriage 10 finishes going around the circulating conveyance path on the conveyance system 01 and returns to the same position as at the first cycle start time t1. A cycle time is denoted by CT.

The conveyance carriage 10 at the teaching point TP11 on the carriage transfer apparatus 3 starts to move at the first cycle start time t1, and reaches the teaching point TP12 at time t11. When the conveyance carriage 10 reaches the teaching point TP12, the work submission apparatus 5 enters a submission state and submits a work W onto the conveyance carriage 10. The operation of the first cycle is completed by the work submission apparatus 5 completing the work submission operation and returning to a standby state, and the second cycle starts at the second cycle start time t2.

The conveyance carriage 10 at the teaching point TP12 starts to move at the second cycle start time t2, and reaches the teaching point TP20 at time t21. When the conveyance carriage 10 reaches the teaching point TP20, the pre-processing inspection apparatus 7 starts inspection. The operation of the pre-processing inspection apparatus 7 will be described below. The operation of the second cycle is completed when the pre-processing inspection apparatus 7 has completed the inspection, and the third cycle starts at the third cycle start time t3.

The conveyance carriage 10 at the teaching point TP21 starts to move at the third cycle start time t3, and reaches the teaching point TP31 at time t31. When the conveyance carriage 10 reaches the teaching point TP31, the processing apparatus 9 starts a processing operation. The operation of the processing apparatus 9 will be described below. The operation of the third cycle is completed when the processing apparatus 9 has completed the processing operation, and the fourth cycle starts at the fourth cycle start time t4.

The conveyance carriage 10 at the teaching point TP30 starts to move at the fourth cycle start time t4, and reaches the teaching point TP40 at time t41. When the conveyance carriage 10 reaches the teaching point TP40, the post-processing inspection apparatus 8 starts inspection. The operation of the post-processing inspection apparatus 8 will be described below. The operation of the fourth cycle is completed when the post-processing inspection apparatus 8 has completed the inspection, and the fifth cycle starts at the fifth cycle start time t5.

The conveyance carriage 10 at the teaching point TP4$x_m$ starts to move at the fifth cycle start time t5, and reaches the teaching point TP50 at time t51. When the conveyance carriage 10 reaches the teaching point TP50, the work discharge apparatus 6 enters a discharge state and discharges the work W from the conveyance carriage 10. The operation of the fifth cycle is completed when the work discharge apparatus 6 has completed the work discharge operation and returned to a standby state, and the sixth cycle starts at the sixth cycle start time t6.

The conveyance carriage 10 at the teaching point TP50 starts to move at the sixth cycle start time t6, and reaches the teaching point TP51 on the carriage transfer apparatus 4 at time t61. When the conveyance carriage 10 reaches the teaching point TP51, the carriage transfer apparatus 4 starts to move from the teaching point TP63 to the teaching point TP64. The carriage transfer apparatus 4 reaches the teaching point TP64 at time t62, and the conveyance carriage 10 starts to move from the teaching point TP51 to the teaching point TP52. The conveyance carriage 10 reaches the teaching point TP52 at time t63, and the carriage transfer apparatus 4 starts to move from the teaching point TP64 to the teaching point TP63. The operation of the sixth cycle is completed when the carriage transfer apparatus 4 has completed the movement, and the seventh cycle starts at the seventh cycle start time t7.

Another conveyance carriage 10 at the teaching point TP11 on the carriage transfer apparatus 3 other than the conveyance carriage 10 of which the operation has been described above starts to move at the seventh cycle start time t7, and reaches the teaching point TP12 at time t71. This operation is similar to the above-described operation of the first cycle from the first cycle start time t1 to the second cycle start time t2.

When the another conveyance carriage 10 reaches the teaching point TP12, the carriage transfer apparatus 3 starts to move from the teaching point TP61 to the teaching point TP62. The carriage transfer apparatus 3 reaches the teaching point TP62 at time t72.

Meanwhile, the conveyance carriage 10 at the teaching point TP52 starts to move to the teaching point TP11 on the carriage transfer apparatus 3 at the seventh cycle start time t7. While the conveyance carriage 10 is moving along the conveyance apparatus return path 2, the carriage transfer apparatus 3 reaches the teaching point TP62 at time t72. The conveyance carriage 10 then transfers from the conveyance apparatus return path 2 to the carriage transfer apparatus 3, and reaches the teaching point TP11 on the carriage transfer apparatus 3 at time t73. This transfer may be performed without the conveyance carriage 10 making a stop on the way from the teaching point TP52 to the teaching point TP11. An additional teaching point intended to wait for the carriage transfer apparatus 3 to complete moving to the teaching point TP62 may be provided on the conveyance apparatus return path 2 near the carriage transfer apparatus 3. In the foregoing description, the conveyance carriage 10 stops at the teaching point TP52 in a period between the time t63 and the seventh cycle start time t7. However, the conveyance carriage 10 may move to the teaching point TP11 without a stop. An additional teaching point may be provided at any point on the conveyance apparatus return path 2.

The conveyance carriage 10 completes moving to the teaching point TP11 at time t73, and the carriage transfer apparatus 3 starts to move from the teaching point TP62 to the teaching point TP61. The carriage transfer apparatus 3 reaches the teaching point TP61 at the eighth cycle start time t8. The conveyance carriage 10 finishes going around the circulation path of the conveyance system 01 and returns to the same position as at the initial time t0.

Next, detailed operations of the conveyance carriage 10, the pre-processing inspection apparatus 7, and the interlocking conveyance module 21 between the second cycle start time t2 and the third cycle start time t3 in FIG. 20 will be described with reference to FIG. 21.

Figure 21:
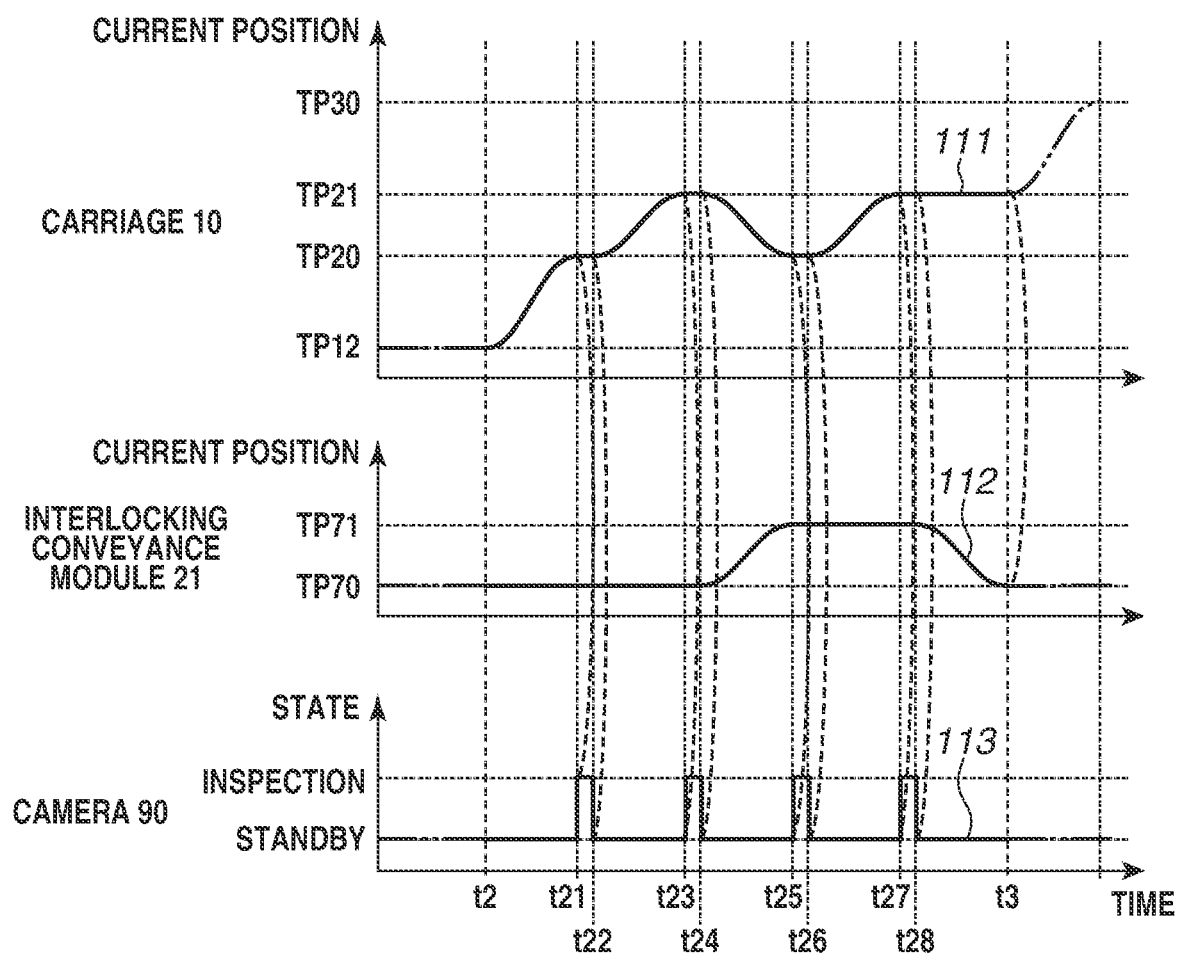
FIG. 21 is a timing chart illustrating an operation of a pre-processing inspection apparatus according to the second exemplary embodiment.

FIG. 21 illustrates the positions of the conveyance carriage 10 and the interlocking conveyance module 21 corresponding to the pre-processing inspection apparatus 7 and the operating state of the camera 90 at each time. Specifically, FIG. 21 illustrates a position 111 of the conveyance carriage 10, a position 112 of the interlocking conveyance module 21, and an operating state 113 of the camera 90.

The conveyance carriage 10 at the teaching point TP12 starts to move to the teaching point TP20 at the second cycle start time t2. The conveyance carriage 10 reaches the teaching point TP20 at time t21. The arrival of the conveyance carriage 10 at the teaching point TP20 completes the alignment of the camera 90 with the alignment mark AM1 of the work W on the conveyance carriage 10, and the camera 90 starts inspection.

The camera 90 completes the inspection at time t22, and the conveyance carriage 10 starts to move to the teaching point TP21. The conveyance carriage 10 reaches the teaching point TP21 at time t23. The arrival of the conveyance carriage 10 at the teaching point TP21 completes the alignment of the camera 90 with the alignment mark AM2 of the work W on the conveyance carriage 10, and the camera 90 starts inspection.

The camera 90 completes the inspection at time t24, and the conveyance carriage 10 starts to move to the teaching point TP20. The interlocking conveyance module 21 starts to move from the teaching point TP70 to the teaching point TP71 along with the movement of the conveyance carriage 10. The conveyance carriage 10 reaches the teaching point TP20 and the interlocking conveyance module 21 reaches the teaching point TP71 at time t25. The arrival of the conveyance carriage 10 at the teaching point TP20 and the arrival of the interlocking conveyance module 21 at the teaching point TP71 complete the alignment of the camera 90 with the alignment mark AM3 of the work W on the conveyance carriage 10, and the camera 90 starts inspection.

The camera 90 completes the inspection at time t26, and the conveyance carriage 10 starts to move to the teaching point TP21. The conveyance carriage 10 reaches the teaching point TP21 at time t27. The arrival of the conveyance carriage 10 at the teaching point TP21 completes the alignment of the camera 90 with the alignment mark AM4 of the work W on the conveyance carriage 10, and the camera 90 starts inspection.

The camera 90 completes the inspection at time t28, and the interlocking conveyance module 21 starts to move to the teaching point TP70. The interlocking conveyance module 21 reaches the teaching point TP70 to complete the operation of the second cycle and the third cycle starts at the third cycle start time t3.

By the foregoing operations, the inspection of the alignment marks AM1, AM2, AM3, and AM4 is completed. The position of the work W held on the conveyance carriage 10 is calculated from the inspection results. Next, detailed operations of the conveyance carriage 10 and the processing apparatus 9 between the third cycle start time t3 and the fourth cycle start time t4 in FIG. 20 will be described with reference to FIG. 22.

Figure 22:
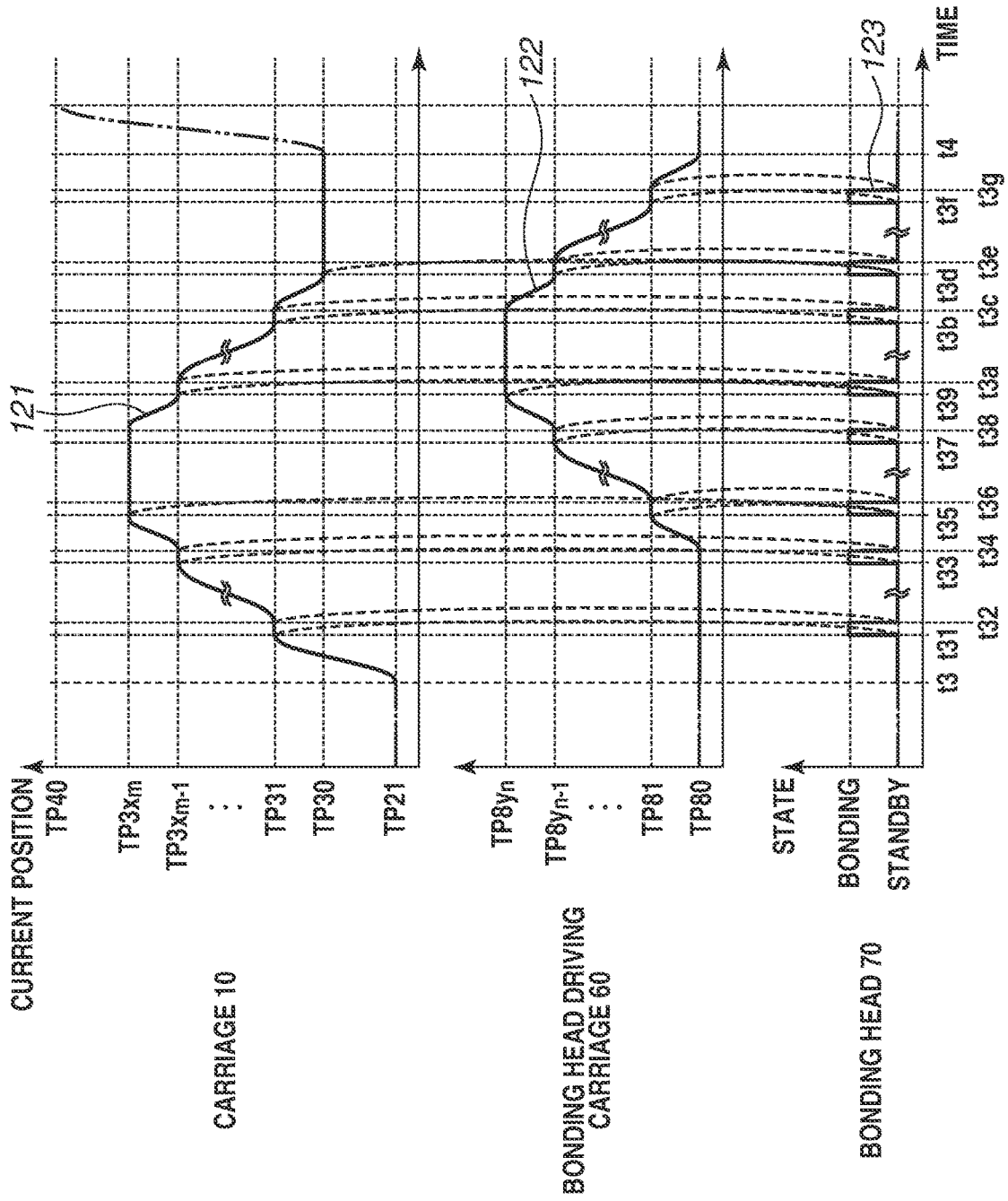
FIG. 22 is a timing chart illustrating an operation of a processing apparatus according to the second exemplary embodiment.

FIG. 22 illustrates the positions of the conveyance carriage 10 and the bonding head driving carriage 60 of the processing apparatus 9 and the operating state of the bonding head 70 at each time. Specifically, FIG. 22 illustrates a position 121 of the conveyance carriage 10, a position 122 of the bonding head driving carriage 60, and an operating state 123 of the bonding head 70. Here, the operating state 123 of the bonding head 70 indicates the operation of the bonding head 70 and the bonding head actuator 72. In the operating state 123, "bonding" of the bonding head 70 represents a series of operations where the bonding head actuator 72 is lowered to contact the work W, the bonding head 70 performs bonding, and the bonding head actuator 72 is lifted and returns to the original position after the completion of the bonding.

The conveyance carriage 10 at the teaching point TP21 starts to move to the teaching point TP31 at the third cycle start time t3. The conveyance carriage 10 reaches the teaching point TP31 at time t31. The arrival of the conveyance carriage 10 at the teaching point TP31 completes the alignment of the bonding head 70 with the processing point P(1, 0) of the work W on the conveyance carriage 10, and the bonding head 70 starts bonding.

The bonding of the processing point P(1, 0) is completed at time t32, and the conveyance carriage 10 starts to move to the next teaching point. When the conveyance carriage 10 reaches the next teaching point, the bonding head 70 starts bonding. Such operations are repeated from the processing point P(1, 0) to the processing point $P(x_{m-1}, 0)$. The bonding of the processing point $P(x_{m-1}, 0)$ is completed at time t34.

When the bonding of the processing point $P(x_{m-1}, 0)$ is completed at time t34, the conveyance carriage 10 starts to move to the teaching point $TP3x_m$ and the bonding head driving carriage 60 starts to move from the teaching point TP80 to the teaching point TP81. When the conveyance carriage 10 reaches the teaching point $TP3x_m$ and the bonding head driving carriage 60 reaches the teaching point TP81 at time t35, the alignment of the bonding head 70 with the processing point $P(x_m, 1)$ of the work W on the conveyance carriage 10 is completed. The bonding head 70 starts bonding.

The bonding of the processing point $P(x_m, 1)$ is completed at time t36, and the bonding head driving carriage 60 starts to move to the next teaching point. When the bonding head driving carriage 60 reaches the next teaching point, the bonding head 70 starts bonding. Such operations are repeated from the processing point $P(x_m, 1)$ to the processing point $P(x_m, y_{n-1})$. The bonding of the processing point $P(x_m, y_{n-1})$ is completed at time t38.

When the bonding of the processing point $P(x_m, y_{n-1})$ is completed at time t38, the conveyance carriage 10 starts to move to the teaching point $TP3x_{m-1}$ and the bonding head driving carriage 60 starts to move from the teaching point $TP8y_{n-1}$ to the teaching point $TP8y_n$. When the conveyance carriage 10 reaches the teaching point $TP3x_{m-1}$ and the bonding head driving carriage 60 reaches the teaching point $TP8y_n$ at time t39, the alignment of the bonding head 70 with the processing point $P(x_{m-1}, y_n)$ of the work W on the conveyance carriage 10 is completed. The bonding head 70 starts bonding.

The bonding of the processing point $P(x_{m-1}, y_n)$ is completed at time t3a, and the conveyance carriage 10 starts to move to the next teaching point. When the conveyance carriage 10 reaches the next teaching point, the bonding head 70 starts bonding. Such operations are repeated from the processing point $P(x_{m-1}, y_n)$ to the processing point $P(1, y_n)$. The bonding of the processing point $P(1, y_n)$ is completed at time t3c.

When the bonding of the processing point $P(1, y_n)$ is completed at time t3c, the conveyance carriage 10 starts to move to the teaching point TP30 and the bonding head driving carriage 60 starts to move from the teaching point $TP8y_n$ to the teaching point $TP8y_{n-1}$. When the conveyance carriage 10 reaches the teaching point TP30 and the bonding head driving carriage 60 reaches the teaching point $TP8y_{n-1}$ at time t3d, the alignment of the bonding head 70 with the processing point $P(0, y_{n-1})$ of the work W on the conveyance carriage 10 is completed. The bonding head 70 starts bonding.

The bonding of the processing point $P(0, y_{n-1})$ is completed at time t3e, and the bonding head driving carriage 60 starts to move to the next teaching point. When the bonding head driving carriage 60 reaches the next teaching point, the bonding head 70 starts bonding. Such operations are repeated from the processing point $P(0, y_{n-1})$ to the processing point $P(0, 1)$. The bonding of the processing point $P(0, 1)$ is completed at time t3g.

When the bonding of the processing point $P(0, 1)$ is completed, the bonding head driving carriage 60 starts to move to the teaching point TP80. The bonding head driving carriage 60 reaches the teaching point TP80 to complete the operation of the third cycle and the fourth cycle starts at the fourth cycle start time t4.

As described above, the processing points P on the work W and the bonding head 70 can be aligned to perform processing by the combinations of the operations of the conveyance carriage 10 and the bonding head driving carriage 60.

Next, detailed operations of the conveyance carriage 10, the post-processing inspection apparatus 8, and the interlocking conveyance module 21 between the fourth cycle start time t4 and the fifth cycle start time t5 in FIG. 20 will be described with reference to FIG. 23.

Figure 23:
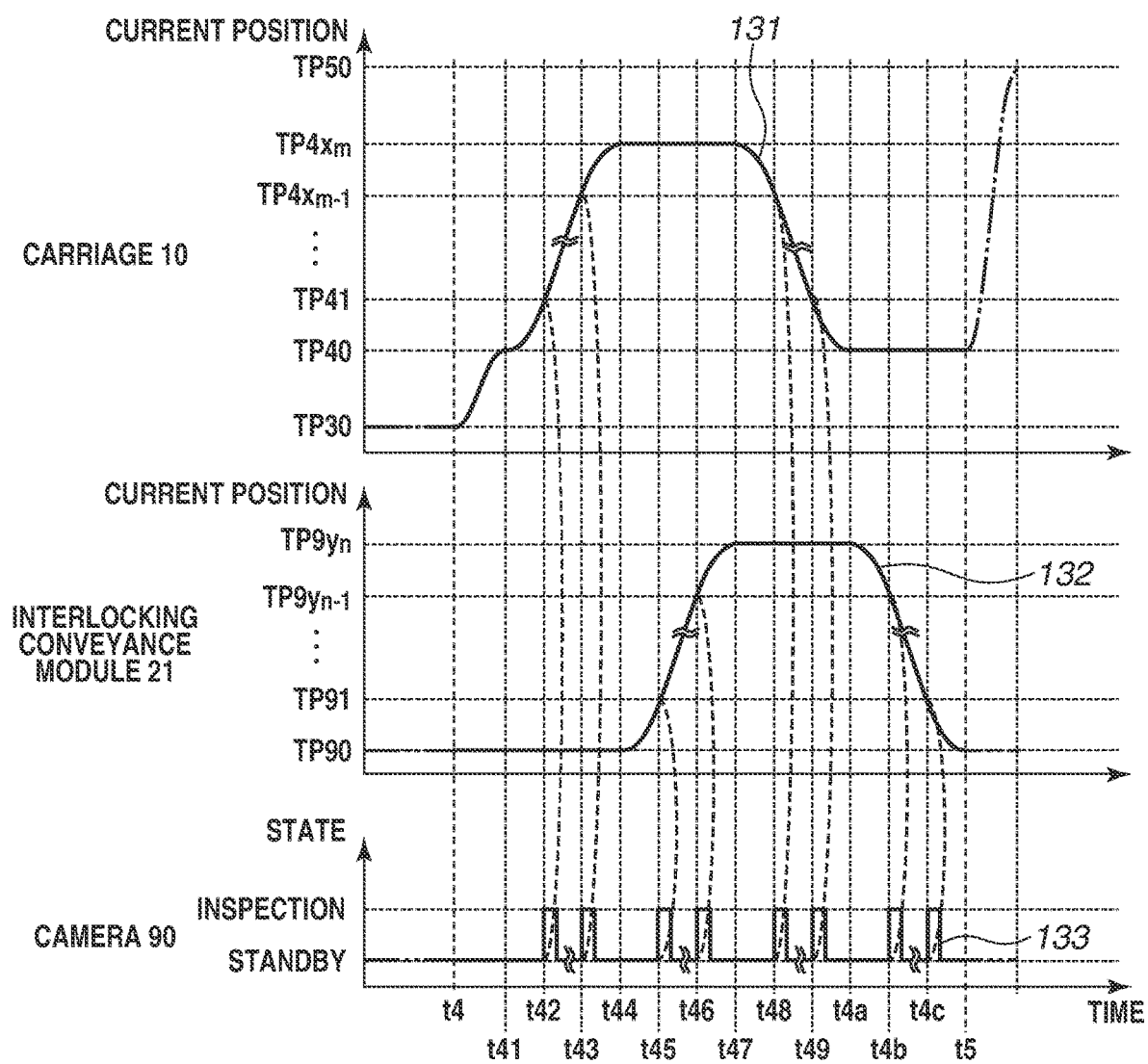
FIG. 23 is a timing chart illustrating an operation of a post-processing inspection apparatus according to the second exemplary embodiment.

FIG. 23 illustrates the positions of the conveyance carriage 10 and the interlocking conveyance module 21 corresponding to the post-processing inspection apparatus 8 and the operating state of the camera 90 at each time. Specifically, FIG. 23 illustrates a position 131 of the conveyance carriage 10, a position 132 of the interlocking conveyance module 21, and an operating state 133 of the camera 90.

The conveyance carriage 10 at the teaching point TP30 starts to move to the teaching point TP40 at the fourth cycle start time t4. The conveyance carriage 10 reaches the teaching point TP40 at time t41. After reaching the teaching point TP40, the conveyance carriage 10 starts to move to the teaching point $TP4x_m$. The conveyance carriage 10 accelerates for a predetermined acceleration time set in advance, and then moves at a constant speed.

The conveyance carriage 10 passes the teaching point TP41 at time t42, and the camera 90 passes a position where the processing point $P(1, 0)$ on the work W can be inspected. When the conveyance carriage 10 passes the teaching point TP41, an inspection start command is issued to the camera 90 and the camera 90 performs inspection. The camera 90 similarly performs inspection when the conveyance carriage 10 passes the next teaching point. Such inspections are repeated from the processing point $P(1, 0)$ to the processing point $P(x_{m-1}, 0)$. After the inspection on the processing point $P(x_{m-1}, 0)$ is completed, the conveyance carriage 10 reaches the teaching point $TP4x_m$ at time t44.

Simultaneously with the arrival of the conveyance carriage 10 at the teaching point $TP4x_m$ at time t44, the interlocking conveyance module 21 starts to move from the teaching point TP90 to the teaching point $TP9y_n$. The interlocking conveyance module 21 accelerates for a predetermined acceleration time set in advance, and then moves at a constant speed.

The interlocking conveyance module 21 passes the teaching point TP91 at time t45, and the camera 90 passes a position where the processing point $P(x_m, 1)$ on the work W can be inspected. When the interlocking conveyance module 21 passes the teaching point TP91, an inspection start command is issued to the camera 90 and the camera 90 performs inspection. The camera 90 similarly performs inspection when the interlocking conveyance module 21 passes the next teaching point. Such inspections are repeated from the processing point $P(x_m, 1)$ to the processing point $P(x_m, y_{n-1})$. After the inspection on the processing point $P(x_m, y_{n-1})$ is completed, the interlocking conveyance module 21 reaches the teaching point $TP9y_n$ at time t47.

Simultaneously with the arrival of the interlocking conveyance module 21 at the teaching point $TP9y_n$ at time t47, the conveyance carriage 10 starts to move from the teaching point $TP4x_m$ to the teaching point TP40. The conveyance carriage 10 accelerates for a predetermined acceleration time set in advance, and then moves at a constant speed.

The conveyance carriage 10 passes the teaching point $TP4x_{m-1}$ at time t48, and the camera 90 passes a position where the processing point $P(x_{m-1}, y_n)$ on the work W can be inspected. When the conveyance carriage 10 passes the teaching point $TP4x_{m-1}$, an inspection start command is issued to the camera 90 and the camera 90 performs inspection. The camera 90 similarly performs inspection when the conveyance carriage 10 passes the next teaching point. Such inspections are repeated from the processing point $P(x_{m-1}, y_n)$ to the processing point $P(1, y_n)$. After the inspection on the processing point $P(1, y_n)$ is completed, the conveyance carriage 10 reaches the teaching point TP40 at time t4a.

Simultaneously with the arrival of the conveyance carriage 10 at the teaching point TP40 at time t4a, the interlocking conveyance module 21 starts to move from the teaching point $TP9y_n$ to the teaching point TP90. The interlocking conveyance module 21 accelerates for a predetermined acceleration time set in advance, and then moves at a constant speed.

The interlocking conveyance module 21 passes the teaching point $TP9y_{n-1}$ at time t4b, and the camera 90 passes a position where the processing point $P(0, y_{n-1})$ on the work W can be inspected. When the interlocking conveyance module 21 passes the teaching point $TP9y_{n-1}$, an inspection start command is issued to the camera 90 and the camera 90 performs inspection. The camera 90 similarly performs inspection when the interlocking conveyance module 21 passes the next teaching point. Such inspections are repeated from the processing point $P(0, y_{n-1})$ to the processing point $P(0, 1)$. After the inspection on the processing point $P(0, 1)$ is completed, the interlocking conveyance module 21 reaches the teaching point TP90 to complete the operation of the fourth cycle and the fifth cycle starts at the fifth cycle start time t5.

According to the present exemplary embodiment, the conveyance carriage 10 can be moved in the X and Y directions by the conveyance modules 11 and the interlocking conveyance modules 21. Inspections can thus be made without driving the pre-processing inspection apparatus 7 or the post-processing inspection apparatus 8 in the X and Y directions. As a result, the support members of the inspection tools can be configured as a low-rigidity structure, and therefore the apparatus sizes and cost can be reduced.

Third Exemplary Embodiment

Figure 24:
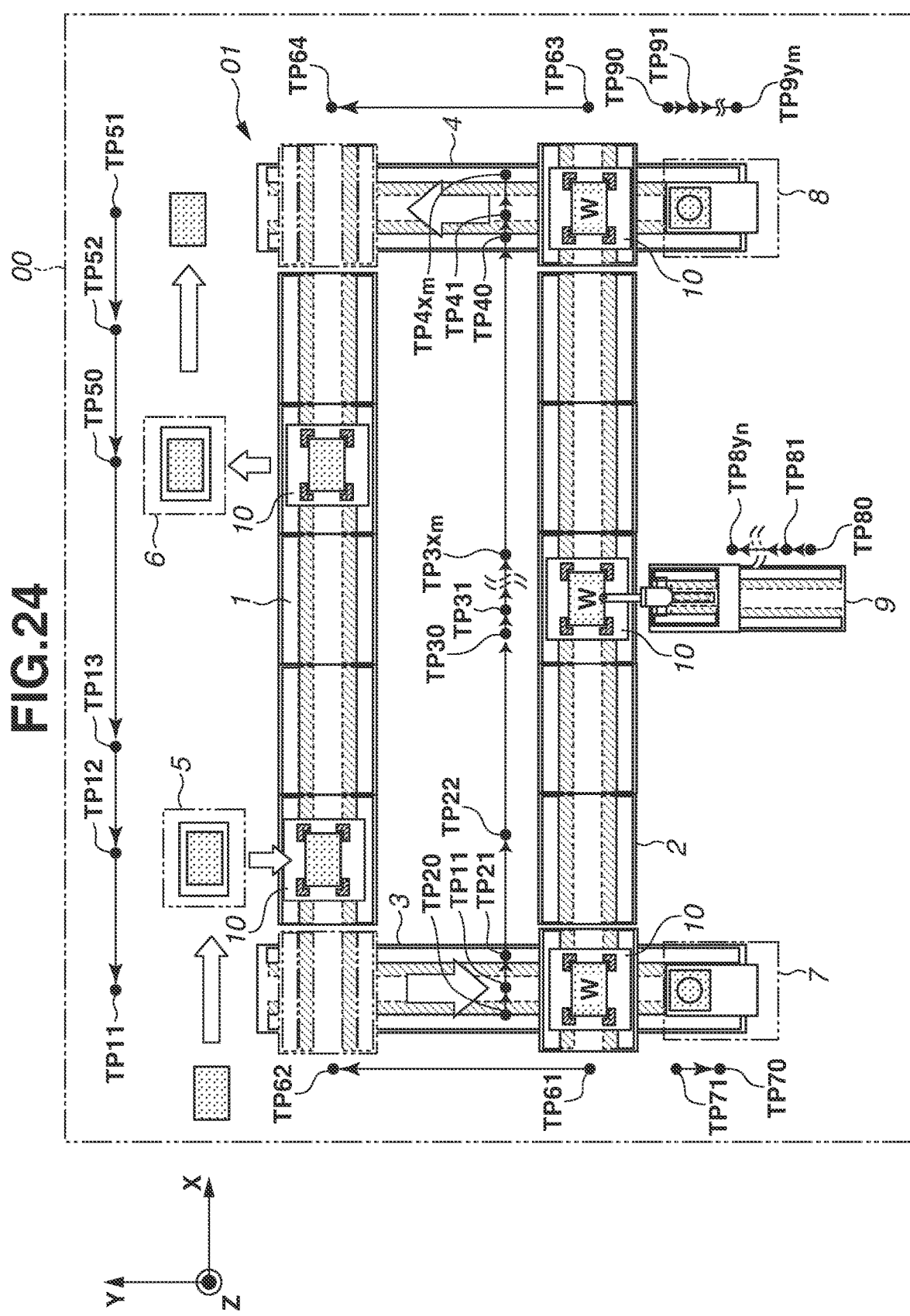
FIG. 24 is a schematic diagram illustrating an overall configuration and teaching points of a processing system according to a third exemplary embodiment.
Figure 25:
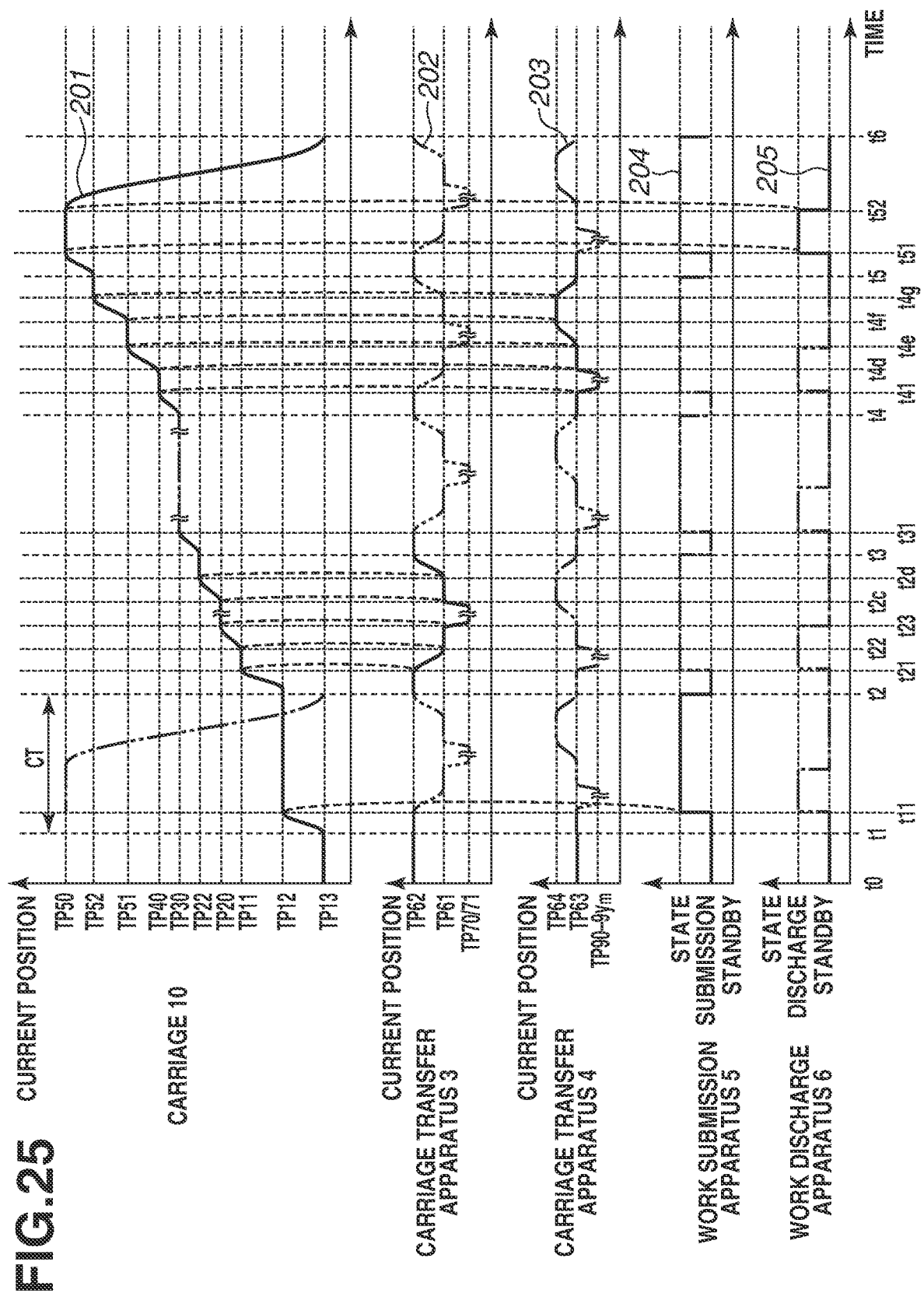
FIG. 25 is a timing chart illustrating an operation of a conveyance carriage according to the third exemplary embodiment.

Next, a third exemplary embodiment of a configuration of a conveyance apparatus forward path 1, a conveyance apparatus return path 2, carriage transfer apparatuses 3 and 4, a work submission apparatus 5, a work discharge apparatus 6, a pre-processing inspection apparatus 7, a post-processing inspection apparatus 8, and a processing apparatus 9 in a processing system 00 will be outlined with reference to FIGS. 24 and 25. In the second exemplary embodiment, the interlocking conveyance modules 21 are installed for the conveyance modules 11 disposed at the positions where the pre-processing inspection apparatus 7 and the post-processing inspection apparatus 8 according to the first exemplary embodiment can perform processing. In the present exemplary embodiment, an example where the carriage transfer apparatuses 3 and 4 are configured as interlocking conveyance modules will be described. The pre-processing inspection apparatus 7 is disposed at a position where processing by the Y-direction driving actuator of the carriage transfer apparatus 3 can be performed. The post-processing inspection apparatus 8 is disposed at a position where processing by the Y-direction driving actuator of the carriage transfer apparatus 4 can be performed. In the present exemplary embodiment, configurations having similar operations to those of the first exemplary embodiment are denoted by the same reference numerals. Differences from the first and second exemplary embodiments will mainly be described, and a description of parts having similar operations to those of the first and second exemplary embodiments may be omitted.

FIG. 24 is a schematic diagram illustrating an overall configuration and teaching points of the processing system 00. The work submission apparatus 5 and the work discharge apparatus 6 are disposed along the conveyance apparatus return path 2. The processing apparatus 9 is disposed along the conveyance apparatus forward path 1. The pre-processing inspection apparatus 7 is disposed along the conveyance apparatus forward path 1, downstream of the carriage transfer apparatus 3. The post-processing inspection apparatus 8 is disposed along the conveyance apparatus forward path 1, upstream of the carriage transfer apparatus 4.

FIG. 25 illustrates the positions of the conveyance carriage 10 and the carriage transfer apparatuses 3 and 4 and the operating states of the work submission apparatus 5 and the work discharge apparatus 6 at each time. More specifically, FIG. 25 illustrates a position 201 of the carriage 10, a position 202 of the carriage transfer apparatus 3, and a position 203 of the carriage transfer apparatus 4. FIG. 25 also illustrates an operating state 204 of the work submission apparatus 5, and an operating state 205 of the work discharge apparatus 6.

For the carriage 10, the carriage transfer apparatus 3, and the carriage transfer apparatus 4, the vertical axes indicate teaching points. For the work submission apparatus 5 and the work discharge apparatus 6, the vertical axes indicate the operating states whether the respective apparatuses are submitting or discharging a work W or on standby.

The horizontal axes indicate time. The horizontal axes indicate an initial time t0, a first cycle start time t1, and second to sixth cycle start times t2 to t6. At the sixth cycle start time t6, the conveyance carriage 10 finishes going around the circulating conveyance path on the conveyance system 01 and returns to the same position as at the first cycle start time t1. A cycle time is denoted by CT.

The conveyance carriage 10 at a teaching point TP13 on the conveyance apparatus return path 2 starts to move at the first cycle start time t1, and reaches the teaching point TP12 at time t11. When the conveyance carriage 10 reaches the teaching point TP12, the work submission apparatus 5 enters a submission state and submits a work W onto the conveyance carriage 10. When the operation of the first cycle is completed by the work submission apparatus 5 completing the work submission operation and returning to a standby state, the second cycle starts at the second cycle start time t2.

The conveyance carriage 10 at the teaching point TP12 starts to move at the second cycle start time t2, and reaches the teaching point TP11 at time t21. Next, the carriage transfer apparatus 3 starts to move from the teaching point TP62, and reaches the teaching point TP61 at time t22. The conveyance carriage 10 starts to move from the teaching point TP11, and reaches the teaching point TP20 at time t23. When the conveyance carriage 10 reaches the teaching point TP20, the pre-processing inspection apparatus 7 starts inspection (pre-processing inspection).

The pre-processing inspection is started at time t23 and completed by time t2c. The operation between times t23 and t2c according to the present exemplary embodiment is similar to that between times t21 to t3 illustrated in FIG. 21 according to the second exemplary embodiment.

When the pre-processing inspection is completed at time t2c, the conveyance carriage 10 starts to move and reaches the teaching point TP22 at time t2d. At time t2d, the carriage transfer apparatus 3 starts to move to the teaching point TP62. The operation of the second cycle is completed by the carriage transfer apparatus 3 completing moving to the teaching point TP62, and the third cycle starts at the third cycle start time t3.

The conveyance carriage 10 at a teaching point TP22 starts to move at the third cycle start time t3, and reaches the teaching point TP30 at time t31. When the conveyance carriage 10 reaches the teaching point TP30, the processing apparatus 9 starts a processing operation. The operation of the processing apparatus 9 according to the present exemplary embodiment is similar to that illustrated in FIG. 22 according to the second exemplary embodiment. The operation of the third cycle is completed by the processing apparatus 9 completing the processing operation, and the fourth cycle starts at the fourth cycle start time t4.

The conveyance carriage 10 at the teaching point TP30 starts to move at the fourth cycle start time t4, and reaches the teaching point TP40 at time t41. When the conveyance carriage 10 reaches the teaching point TP40, the post-processing inspection apparatus 8 starts inspection. The inspection is completed at time t4d. The operation between time t4 and time t4d according to the present exemplary embodiment is similar to that between time t4 and time t5 illustrated in FIG. 23 according to the second exemplary embodiment.

The conveyance carriage 10 starts to move at time t4d, and reaches the teaching point TP51 at time t4e. The carriage transfer apparatus 4 then starts to move, and reaches the teaching point TP64 at time t4f. The conveyance carriage 10 starts to move at time t4f, and reaches the teaching point TP52 at time t4g. The carriage transfer apparatus 4 starts to move to the teaching point TP63 at time t4g. The arrival of the carriage transfer apparatus 4 at the teaching point TP63 completes the operation of the fourth cycle and the fifth cycle starts at the fifth cycle start time t5.

The conveyance carriage 10 at the teaching point TP52 starts to move at the fifth cycle start time t5, and reaches the teaching point TP50 at time t51. When the conveyance carriage 10 reaches the teaching point TP50, the work discharge apparatus 6 enters a discharge state and discharges the work W from the conveyance carriage 10 (work discharge operation). The work discharge apparatus 6 completes the work discharge operation and returns to a normal state at time t52, and the conveyance carriage 10 starts to move to the teaching point TP13. The arrival of the conveyance carriage 10 at the teaching point TP13 completes the operation of the fifth cycle and the sixth cycle starts at the sixth cycle start time t6. At the sixth cycle start time t6, the conveyance carriage 10 finishes going around the circulation path of the conveyance system 01 and returns to the same position as at the initial time t0.

According to the present exemplary embodiment, the pre- and post-processing inspections can be performed by moving the conveyance carriage 10 in the X and Y directions, using the carriage transfer apparatuses 3 and 4. This can reduce the number of Y-direction driving actuators in the processing system 00.

Moreover, since the work submission apparatus 5 and the work discharge apparatus 6 are disposed on the conveyance apparatus return path 2, the apparatuses to be disposed along the conveyance path can be distributed between the conveyance apparatus forward path 1 and the conveyance apparatus return path 2. As a result, the entire length of the conveyance apparatus forward and return paths 1 and 2 can be reduced to further reduce the size of the processing system 00.

From such reasons, according to the present exemplary embodiment, the processing system 00 can be installed in a narrower space.

Fourth Exemplary Embodiment

Figure 26:
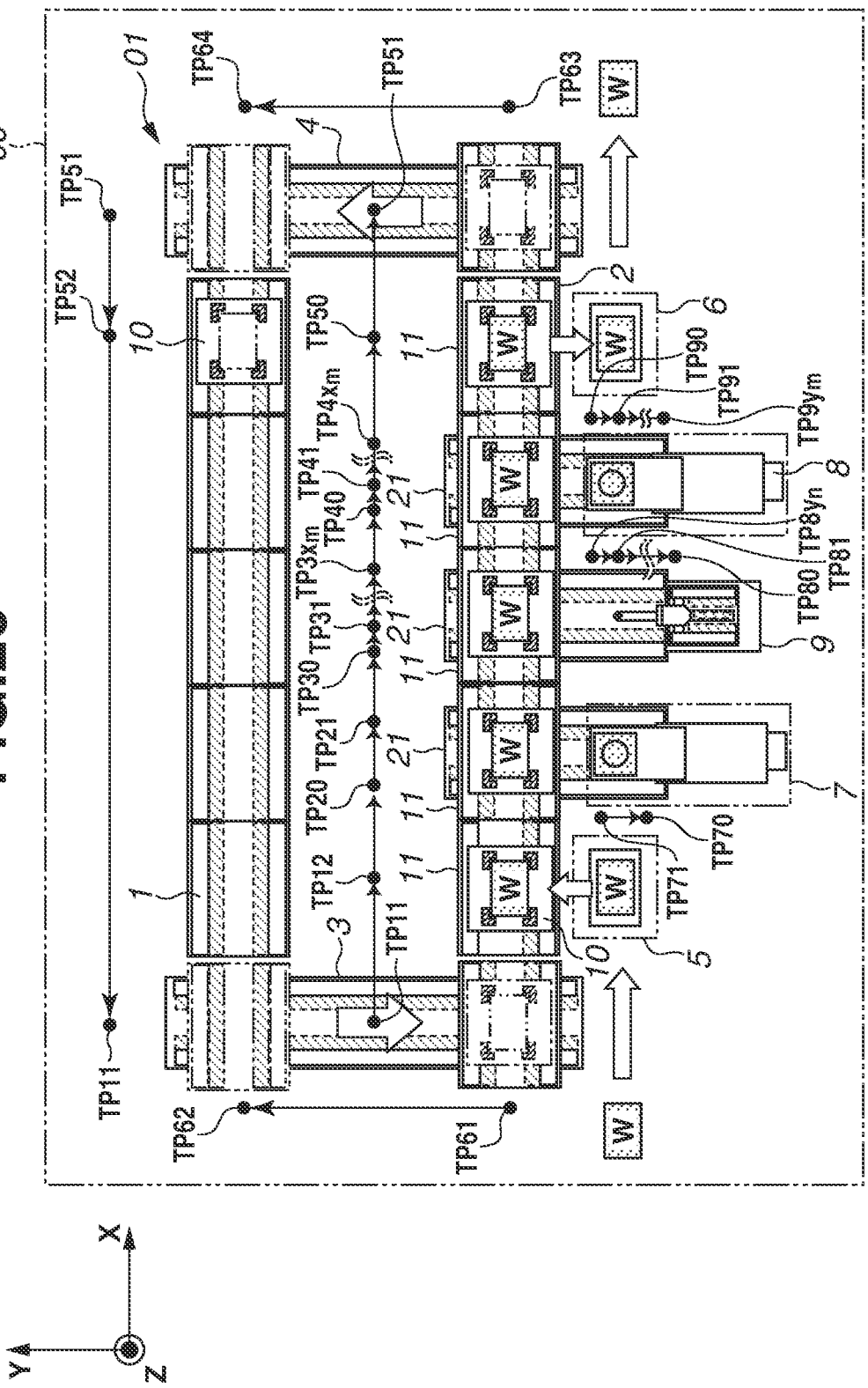
FIG. 26 is a schematic diagram illustrating an overall configuration and teaching points of a processing system according to a fourth exemplary embodiment.
Figure 27:
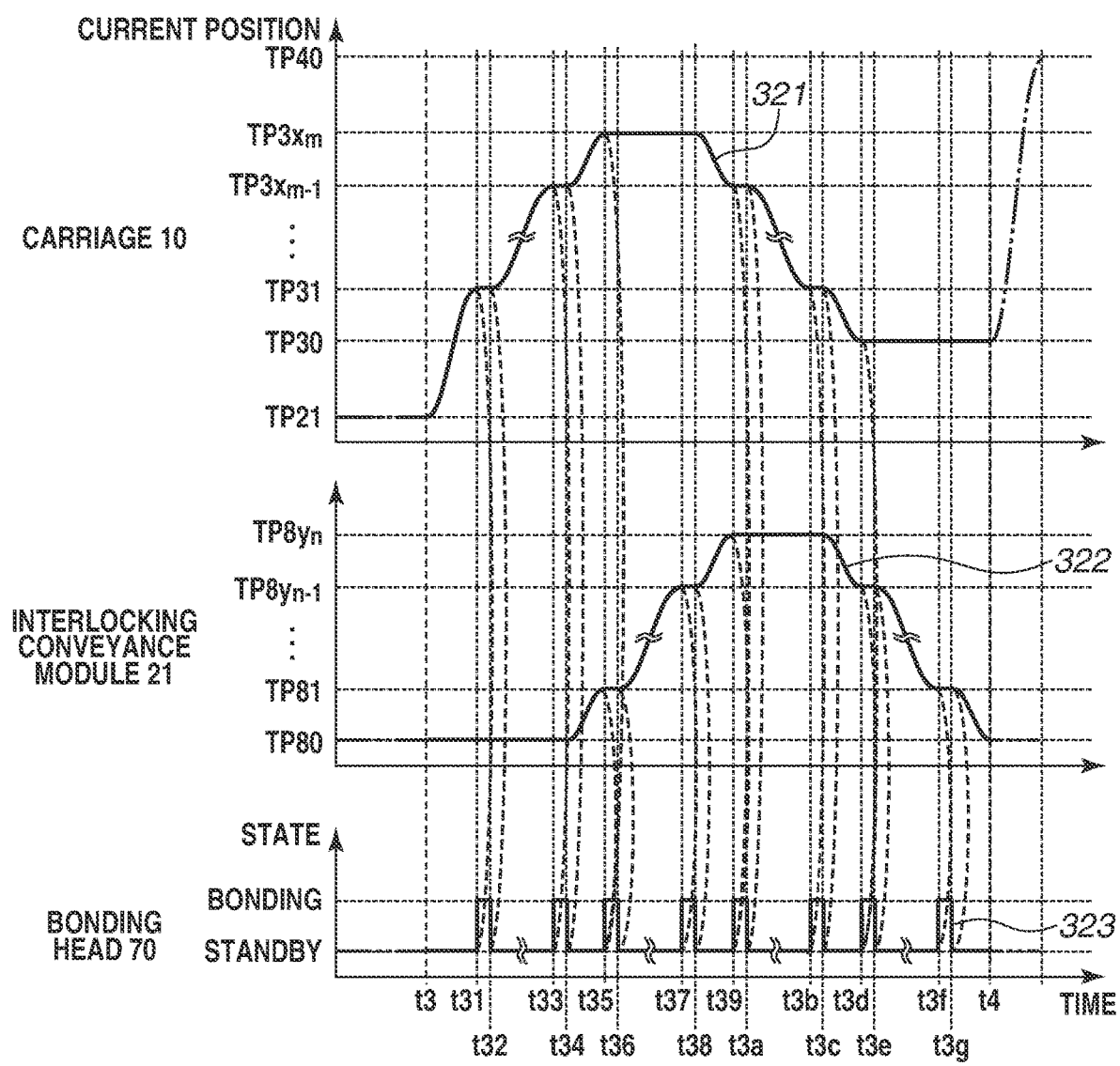
FIG. 27 is a timing chart illustrating an operation of a conveyance carriage according to the fourth exemplary embodiment.

Next, a fourth exemplary embodiment of a configuration of a conveyance apparatus forward path 1, a conveyance apparatus return path 2, carriage transfer apparatuses 3 and 4, a work submission apparatus 5, a work discharge apparatus 6, a pre-processing inspection apparatus 7, a post-processing inspection apparatus 8, and a processing apparatus 9 in a processing system 00 will be outlined with reference to FIGS. 26 and 27. In the second exemplary embodiment, the interlocking conveyance modules 21 are described to be installed for the conveyance modules 11 disposed at the positions where the pre-processing inspection apparatus 7 and the post-processing inspection apparatus 8 can perform processing in the first exemplary embodiment. In the present exemplary embodiment, an additional interlocking conveyance module 21 is disposed for the conveyance module 11 disposed at the position where the processing apparatus 9 can perform processing. In the present exemplary embodiment, configurations having similar operations to those of the first exemplary embodiment are denoted by the same reference numerals. Differences from the first, second, and third exemplary embodiments will mainly be described. A description of parts having similar operations to those of the first, second, and third exemplary embodiments may be omitted.

FIG. 26 is a schematic diagram illustrating an overall configuration and teaching points of the processing system 00. In the overall configuration of the processing system 00 in FIG. 26, the processing apparatus 9 is disposed at a position along the conveyance carriage 10 including an interlocking conveyance module 21. The processing apparatus 9 does not include a Y-direction driving actuator.

The teaching points of the processing system 00 illustrated in FIG. 26 are laid out so that the interlocking conveyance module 21 where the processing apparatus 9 is disposed has a plurality of teaching points TP30, TP31, . . . , TP3$x_m$ for the conveyance carriage 10. The interlocking conveyance module 21 where the processing apparatus 9 is disposed also has a plurality of teaching points TP80, TP81, . . . , TP8$y_m$. Using the combinations of such teaching points, a given processing point P on the work W can be conveyed to a position where the processing apparatus 9 can apply processing.

The overall configuration and the teaching points according to the present exemplary embodiment are similar to those of the second exemplary embodiment except those in the foregoing description related to FIG. 26.

The operation of the conveyance carriage 10 according to the present exemplary embodiment going around the circulation path of the conveyance system 01 is similar to that of the second exemplary embodiment except the operation between the third cycle start time t3 and the fourth cycle start time t4 illustrated in FIG. 20 according to the second exemplary embodiment.

The operation between the third cycle start time t3 and the fourth cycle start time t4 according to the present exemplary embodiment will be described with reference to FIG. 27. FIG. 27 is a detailed diagram illustrating processing operations between the third cycle start time t3 and the fourth cycle start time t4 according to the present exemplary embodiment. FIG. 27 illustrates the positions of the conveyance carriage 10 and the interlocking conveyance module 21 corresponding to the processing apparatus 9, and the operating state of the bonding head 70. Specifically, FIG. 27 illustrates a position 321 of the conveyance carriage 10, a position 322 of the interlocking conveyance module 21, and an operating state 323 of the bonding head 70.

In the following description, the operating state 323 of the bonding head 70 indicates the operation of the bonding head 70 and the bonding head actuator 72. In the operating state 323, "bonding" of the bonding head 70 represents a series of operations where the bonding head actuator 72 is lowered to contact the work W, the bonding head 70 performs bonding, and the bonding head actuator 72 is lifted and returns to the original position after the completion of the bonding.

The conveyance carriage 10 at the teaching point TP21 starts to move to the teaching point TP31 at the third cycle start time t3. The conveyance carriage 10 reaches the teaching point TP31 at time t31. The arrival of the conveyance carriage 10 at the teaching point TP31 completes the alignment of the bonding head 70 with the processing point P(1, 0) of the work W on the conveyance carriage 10, and the bonding head 70 starts bonding.

When the bonding of the processing point P(1, 0) is completed at time t32, the conveyance carriage 10 starts to move to the next teaching point. When the conveyance carriage 10 reaches the next teaching point, the bonding head 70 starts bonding. Such operations are repeated from the processing point P(1, 0) to the processing point P($x_{m-1}$, 0). The bonding of the processing point P($x_{m-1}$, 0) is completed at time t34.

When the bonding of the processing point P($x_{m-1}$, 0) is completed at time t34, the conveyance carriage 10 starts to move to the teaching point TP3$x_m$ and the interlocking conveyance module 21 starts to move from the teaching point TP80 to the teaching point TP81. When the conveyance carriage 10 reaches the teaching point TP3$x_m$ and the interlocking conveyance module 21 reaches the teaching point TP81 at time t35, the alignment of the bonding head 70 with the processing point P($x_m$, 1) of the work W on the conveyance carriage 10 is completed. The bonding head 70 starts bonding.

When the bonding of the processing point P($x_m$, 1) is completed at time t36, the interlocking conveyance module 21 starts to move to the next teaching point. When the interlocking conveyance module 21 reaches the next teaching point, the bonding head 70 starts bonding. Such operations are repeated from the processing point $P(x_m, 1)$ to the processing point $P(x_m, y_{n-1})$. The bonding of the processing point $P(x_m, y_{n-1})$ is completed at time t38.

When the bonding of the processing point $P(x_m, y_{n-1})$ is completed at time t38, the conveyance carriage 10 starts to move to the teaching point TP3$x_{m-1}$ and the interlocking conveyance module 21 starts to move from the teaching point TP8$y_{n-1}$ to the teaching point TP8$y_n$. When the conveyance carriage 10 reaches the teaching point TP3$x_{m-1}$ and the interlocking conveyance module 21 reaches the teaching point TP8$y_n$ at time t39, the alignment of the bonding head 70 with the processing point $P(x_{m-1}, y_n)$ of the work W on the conveyance carriage 10 is completed. The bonding head 70 starts bonding.

When the bonding of the processing point $P(x_{m-1}, y_n)$ is completed at time t3a, the conveyance carriage 10 starts to move to the next teaching point. When the conveyance carriage 10 reaches the next teaching point, the bonding head 70 starts bonding. Such operations are repeated from the processing point $P(x_{m-1}, y_n)$ to the processing point $P(1, y_n)$. The bonding of the processing point $P(1, y_n)$ is completed at time t3c.

When the bonding of the processing point $P(1, y_n)$ is completed at time t3c, the conveyance carriage 10 starts to move to the teaching point TP30 and the interlocking conveyance module 21 starts to move from the teaching point TP8$y_n$ to the teaching point TP8$y_{n-1}$. When the conveyance carriage 10 reaches the teaching point TP30 and the interlocking conveyance module 21 reaches the teaching point TP8$y_{n-1}$ at time t3d, the alignment of the bonding head 70 with the processing point $P(0, y_{n-1})$ of the work W on the conveyance carriage 10 is completed. The bonding head 70 starts bonding.

When the bonding of the processing point $P(0, y_{n-1})$ is completed at time t3e, the interlocking conveyance module 21 starts to move to the next teaching point. When the interlocking conveyance module 21 reaches the next teaching point, the bonding head 70 starts bonding. Such operations are repeated from the processing point $P(0, y_{n-1})$ to the processing point $P(0, 1)$. The bonding of the processing point $P(0, 1)$ is completed at time t3g.

When the bonding of the processing point $P(0, 1)$ is completed, the interlocking conveyance module 21 starts to move to the teaching point TP80. The interlocking conveyance module 21 reaches the teaching point TP80 to complete the operation of the third cycle and the fourth cycle starts at the fourth cycle start time t4.

As described above, the processing points P on the work W and the bonding head 70 can be aligned to perform processing by the combinations of the operations of the conveyance carriage 10 and the interlocking conveyance module 21.

According to the present exemplary embodiment, the conveyance carriage 10 can be moved in the X and Y directions by the conveyance module 11 and the interlocking conveyance module 21. Thus, processing can be performed without driving the processing apparatus 9 in the Y direction. As a result, the support members of the processing tool can be configured as a low-rigidity structure, and therefore the apparatus size and cost can be reduced.

Fifth Exemplary Embodiment

Figure 15:
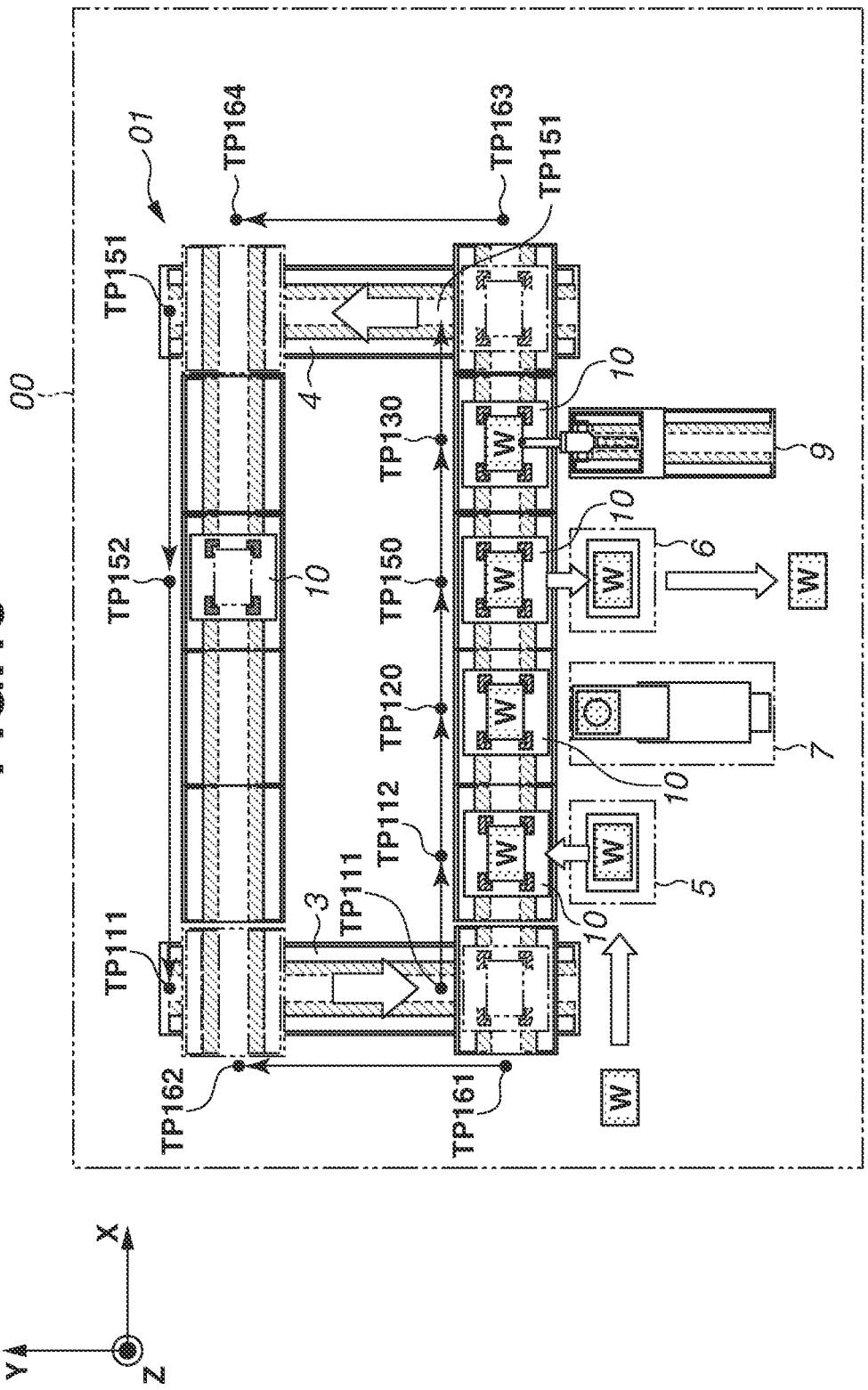
FIG. 15 is a schematic diagram illustrating an overall configuration of a processing system according to a fifth exemplary embodiment.
Figure 16:
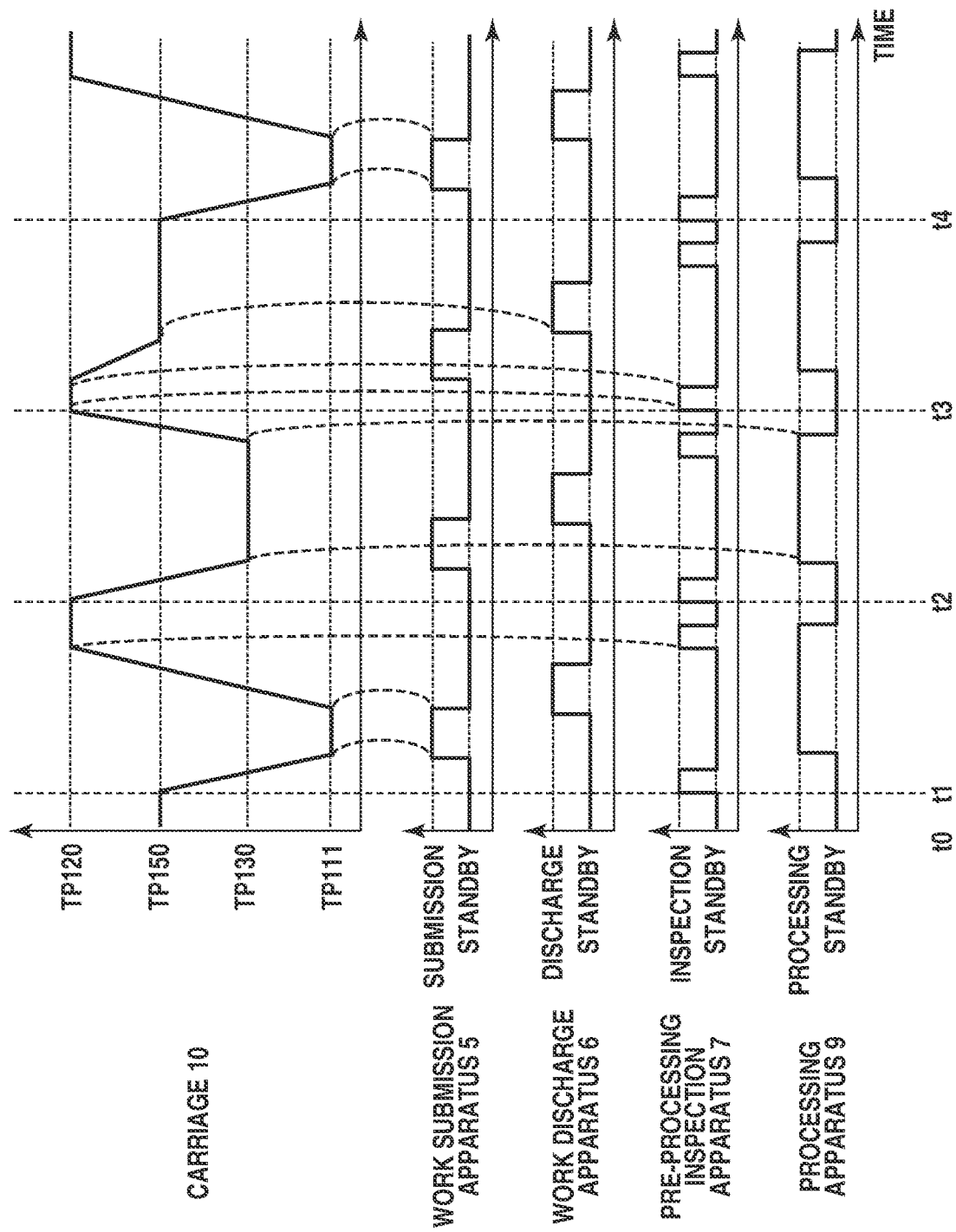
FIG. 16 is a timing chart illustrating an operation of a conveyance carriage according to the fifth exemplary embodiment.

Next, a fifth exemplary embodiment will be outlined with reference to FIGS. 15 and 16.

FIG. 15 is a schematic diagram illustrating an overall configuration of a processing system 00. A work submission apparatus 5, a work discharge apparatus 6, a pre-processing inspection apparatus 7, and a processing apparatus 9 are disposed along a circulating conveyance path formed by a conveyance apparatus forward path 1, a conveyance apparatus return path 2, and carriage transfer apparatuses 3 and 4. The work submission apparatus 5, the pre-processing inspection apparatus 7, the work discharge apparatus 6, and the processing apparatus 9 are arranged in this order along the circulating conveyance path.

FIG. 16 illustrates the operating states of the work submission apparatus 5, the work discharge apparatus 6, the pre-processing inspection apparatus 7, and the processing apparatus 9, and the position of a conveyance carriage 10 at each time. The operating states of the work submission apparatus 5 and the work discharge apparatus 6 indicate whether the respective apparatuses are submitting or discharging a work W or on standby. The operating state of the pre-processing inspection apparatus 7 indicates whether the pre-processing inspection apparatus 7 is inspecting the work W or on standby. The pre-processing inspection apparatus 7 is not limited to a pre-processing inspection operation, and can also perform inspection after processing. The operating state of the processing apparatus 9 indicates whether the processing apparatus 9 is processing the work W or on standby.

Disposing the work submission apparatus 5, the work discharge apparatus 6, the pre-processing inspection apparatus 7, and the processing apparatus 9 along the circulating conveyance path as illustrated in FIG. 15 enables a single pre-processing inspection apparatus 7 to perform both a pre-processing inspection and a post-processing inspection. The pre- and post-processing inspections can thus be performed by one inspection apparatus without providing a plurality of inspection apparatuses.

Moreover, the conveyance carriage 10 can move between the work submission apparatus 5, the work discharge apparatus 6, the pre-processing inspection apparatus 7, and the processing apparatus 9 without waiting for the work submission apparatus 5, the work discharge apparatus 6, the pre-processing inspection apparatus 7, and the processing apparatus 9 to complete operation. The cycle time can thus be reduced.

Sixth Exemplary Embodiment

Figure 17:
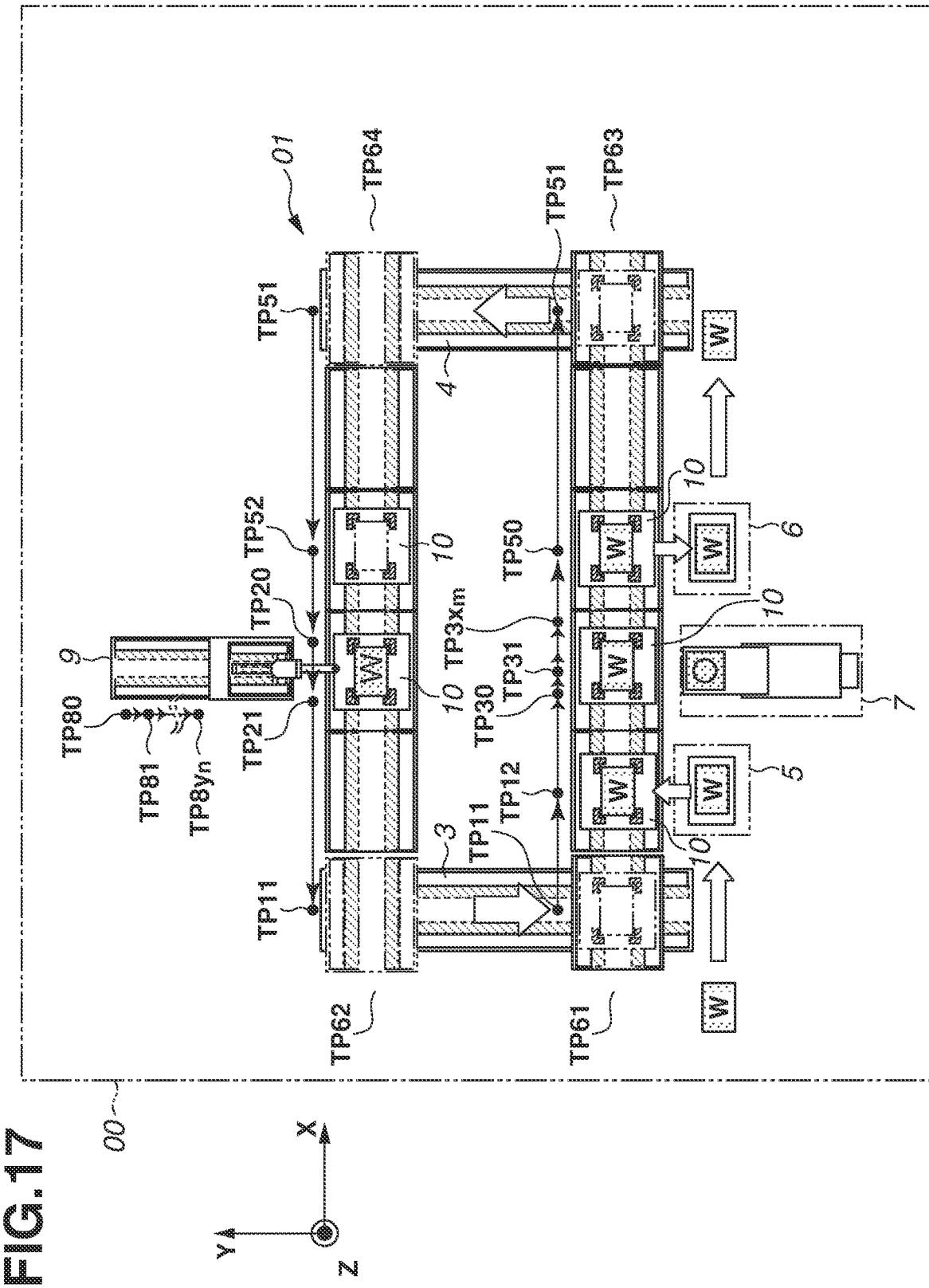
FIG. 17 is a schematic diagram illustrating an overall configuration of a processing system according to a sixth exemplary embodiment.

Next, a sixth exemplary embodiment of a configuration of a conveyance apparatus forward path 1, a conveyance apparatus return path 2, carriage transfer apparatuses 3 and 4, a work submission apparatus 5, a work discharge apparatus 6, a pre-processing inspection apparatus 7, and a processing apparatus 9 in a processing system 00 will be outlined with reference to FIG. 17.

FIG. 17 is a schematic diagram illustrating an overall configuration of the processing system 00. The work submission apparatus 5, the work discharge apparatus 6, the pre-processing inspection apparatus 7, and the processing apparatus 9 are disposed along a circulating conveyance path formed by the conveyance apparatus forward path 1, the conveyance apparatus return path 2, and the carriage transfer apparatuses 3 and 4. The work submission apparatus 5, the pre-processing inspection apparatus 7, the work discharge apparatus 6, and the processing apparatus 9 are arranged in this order along the circulating conveyance path. The work submission apparatus 5, the pre-processing inspection apparatus 7, and the work discharge apparatus 6 are arranged along the conveyance apparatus forward path 1 including the circulating conveyance path. The processing apparatus 9 is disposed along the conveyance apparatus return path 2.

Disposing the work submission apparatus 5, the work discharge apparatus 6, the pre-processing inspection apparatus 7, and the processing apparatus 9 along the circulating conveyance path as illustrated in FIG. 17 enables a single pre-processing inspection apparatus 7 to perform both a pre-processing inspection and a post-processing inspection. The pre- and post-processing inspections can thus be performed by one inspection apparatus without providing a plurality of inspection apparatuses.

Moreover, the conveyance carriage 10 can move between the work submission apparatus 5, the work discharge apparatus 6, the pre-processing inspection apparatus 7, and the processing apparatus 9 without waiting for the work submission apparatus 5, the work discharge apparatus 6, the pre-processing inspection apparatus 7, and the processing apparatus 9 to complete operation. The cycle time can thus be reduced.

Furthermore, in a case where the result of the post-processing inspection performed by the pre-processing inspection apparatus 7 is a failure and the processing apparatus 9 performs reprocessing or corrective processing, the conveyance carriage 10 that carries the work W which has been subjected to the post-processing inspection by the pre-processing inspection apparatus 7 can move the work W to the processing apparatus 9 again. The work W moved to the processing apparatus 9 again can be given predetermined reprocessing or corrective processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-160755, filed on Sep. 3, 2019, which is hereby incorporated by reference herein in its entirety.

What is claimed is:

1. A processing system comprising:
a conveyance path including a plurality of conveyance modules configured to convey a carriage, the plurality of conveyance modules being disposed to convey the carriage to a plurality of positions;
a processing apparatus configured to perform processing on a work mounted on the carriage; and
a control unit configured to control the plurality of conveyance modules and the processing apparatus,
wherein the control unit is configured to, in performing the processing on the work at the plurality of positions by the processing apparatus, move the work to the plurality of positions by moving the carriage using the plurality of conveyance modules,
wherein the processing apparatus includes a processing tool, a processing tool driving carriage, and a processing tool conveyance path, the processing tool being configured to be moved by the processing tool driving carriage, and
wherein the processing tool conveyance path includes a coil group including a plurality of coils, the processing tool driving carriage including a permanent magnet or ferromagnetic body configured to receive electromagnetic force from the coil group of the processing tool conveyance path, the processing tool driving carriage being configured to be moved by the electromagnetic force that the permanent magnet or ferromagnetic body receives from the coil group of the processing tool conveyance path.

2. The processing system according to claim 1,
wherein the conveyance path includes a coil group including a plurality of coils, and
wherein the carriage includes a permanent magnet or ferromagnetic body configured to receive electromagnetic force from the coil group, the carriage being configured to be moved by the electromagnetic force that the permanent magnet or ferromagnetic body receives from the coil group.

3. The processing system according to claim 1,
wherein the processing apparatus includes a moving mechanism, and
wherein the processing apparatus is configured to be moved by the moving mechanism in a direction intersecting with a moving direction of the carriage.

4. The processing system according to claim 1, wherein a center of gravity of the processing tool driving carriage is disposed on a line of action of the electromagnetic force.

5. The processing system according to claim 1, wherein an encoder is disposed on the processing tool conveyance path, and a scale is attached to the processing tool driving carriage, the scale being attached to a position detectable by the encoder and coinciding with a height of the center of gravity of the processing tool driving carriage.

6. The processing system according to claim 1, wherein the plurality of positions is positions of teaching points set in advance.

7. The processing system according to claim 1, further comprising a mechanism configured to detect a position of the work mounted on the carriage.

8. The processing system according to claim 6, wherein the teaching points are adjustable based on a detection result of the position of the work.

9. The processing system according to claim 1, wherein at least one of the plurality of conveyance modules is an interlocking conveyance module including a moving mechanism configured to move the carriage in a direction crossing a moving direction of a carriage moving mechanism.

10. The processing system according to claim 1, further comprising an inspection apparatus configured to inspect a state of the work.

11. The processing system according to claim 1, wherein the processing is bonding.

12. The processing system according to claim 1, further comprising a work submission apparatus configured to mount the work on the carriage and a work discharge apparatus configured to remove the work from the carriage.

13. An article manufacturing method for manufacturing an article, comprising performing processing on a work a plurality of times while conveying the work by using the processing system according to claim 1.

14. A processing system comprising:
a conveyance path configured to convey a carriage to a plurality of positions by disposing a plurality of conveyance modules configured to convey the carriage;
a work submission apparatus configured to mount a work on the carriage;
an inspection apparatus configured to inspect the work mounted on the carriage;
a processing apparatus configured to perform a predetermined processing operation on the work;
a work discharge apparatus configured to remove the work; and
a control unit configured to control the plurality of conveyance modules and the processing apparatus,
wherein the control unit is configured to, in performing processing on a plurality of positions of the work by the processing apparatus, control the plurality of positions by moving the carriage using the plurality of conveyance modules,
wherein the conveyance path includes a conveyance apparatus forward path, a conveyance apparatus return path, a first carriage transfer apparatus configured to convey the carriage from the conveyance apparatus return path to the conveyance apparatus forward path, and a second carriage transfer apparatus configured to transfer the carriage from the conveyance apparatus forward path to the conveyance apparatus return path, and
wherein the inspection apparatus includes an apparatus configured to detect a position of the work mounted on the carriage and an apparatus configured to inspect a processing state of the work processed using the processing apparatus.

15. The processing system according to claim 14, wherein the conveyance path is a circulating conveyance path formed by the conveyance apparatus forward path, the conveyance apparatus return path, the first carriage transfer apparatus, and the second carriage transfer apparatus.

16. The processing system according to claim 15, wherein the work submission apparatus, the inspection apparatus, and the work discharge apparatus are disposed at predetermined positions adjoining the conveyance apparatus forward path, and the processing apparatus is disposed at a predetermined position adjoining the conveyance apparatus return path.

17. The processing system according to claim 14, wherein the apparatus configured to detect the position of the work mounted on the carriage is disposed at a position adjoining the first carriage transfer apparatus, and the apparatus configured to inspect the processing state of the work is disposed at a position adjoining the second carriage transfer apparatus.

18. The processing system according to claim 14,
wherein at least one of the plurality of conveyance modules is an interlocking conveyance module including a moving mechanism configured to move the carriage in a direction intersecting with a moving direction of a carriage moving mechanism, and
wherein the inspection apparatus is disposed at a position adjoining the interlocking conveyance module.

19. The processing system according to claim 18, wherein the processing apparatus is disposed at a position adjoining the interlocking conveyance module.

20. An article manufacturing method for manufacturing an article, comprising performing processing on a work a plurality of times while conveying the work by using the processing system according to claim 14.

21. A processing system comprising:
a conveyance path configured to convey a carriage to a plurality of positions by disposing a plurality of conveyance modules configured to convey the carriage;
a work submission apparatus configured to mount a work on the carriage;
an inspection apparatus configured to inspect the work mounted on the carriage;
a processing apparatus configured to perform a predetermined processing operation on the work;
a work discharge apparatus configured to remove the work; and
a control unit configured to control the plurality of conveyance modules and the processing apparatus,
wherein the control unit is configured to, in performing processing on a plurality of positions of the work by the processing apparatus, control the plurality of positions by moving the carriage using the plurality of conveyance modules,
wherein the conveyance path includes a conveyance apparatus forward path, a conveyance apparatus return path, a first carriage transfer apparatus configured to convey the carriage from the conveyance apparatus return path to the conveyance apparatus forward path, and a second carriage transfer apparatus configured to transfer the carriage from the conveyance apparatus forward path to the conveyance apparatus return path,
wherein the conveyance path is a circulating conveyance path formed by the conveyance apparatus forward path, the conveyance apparatus return path, the first carriage transfer apparatus, and the second carriage transfer apparatus, and
wherein the work submission apparatus and the work discharge apparatus are disposed at predetermined positions adjoining the conveyance apparatus return path, and the processing apparatus is disposed at a predetermined position adjoining the conveyance apparatus forward path.

22. The processing system according to claim 21, wherein the work submission apparatus, the inspection apparatus, and the work discharge apparatus are disposed at predetermined positions adjoining the conveyance apparatus forward path, and the processing apparatus is disposed at a predetermined position adjoining the conveyance apparatus return path.

23. An article manufacturing method for manufacturing an article, comprising performing processing on a work a plurality of times while conveying the work by using the processing system according to claim 21.

* * * * *